United States Patent
Sugio et al.

(10) Patent No.: US 9,066,109 B2
(45) Date of Patent: *Jun. 23, 2015

(54) MOVING PICTURE CODING METHOD, MOVING PICTURE CODING APPARATUS, MOVING PICTURE DECODING METHOD, AND MOVING PICTURE DECODING APPARATUS

(71) Applicant: Tagivan II LLC, Chevy Chase, MD (US)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: TAGIVAN II LLC, Chevy Chase, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/087,364

(22) Filed: Nov. 22, 2013

(65) Prior Publication Data

US 2014/0079130 A1    Mar. 20, 2014

Related U.S. Application Data

(62) Division of application No. 13/666,265, filed on Nov. 1, 2012, now Pat. No. 8,942,288.

(60) Provisional application No. 61/554,598, filed on Nov. 2, 2011.

(51) Int. Cl.
*H04B 1/66* (2006.01)
*H04N 7/12* (2006.01)
(Continued)

(52) U.S. Cl.
CPC ......... *H04N 19/56* (2014.11); *H04N 19/00684* (2013.01); *H04N 19/00721* (2013.01);
(Continued)

(58) Field of Classification Search
None
See application file for complete search history.

(56) References Cited

U.S. PATENT DOCUMENTS

| 6,438,254 B1 | 8/2002 | Kadono et al. |
| 2005/0053298 A1* | 3/2005 | Mukerjee et al. ............. 382/236 |

(Continued)

FOREIGN PATENT DOCUMENTS

JP    2009-290889    12/2009

OTHER PUBLICATIONS

First Action Interview Pilot Program Pre-Interview Communication issued Apr. 16, 2014 in U.S. Appl. No. 13/666,265.

(Continued)

*Primary Examiner* — Anner Holder
*Assistant Examiner* — Ellyar Y Barazesh
(74) *Attorney, Agent, or Firm* — Wenderoth, Lind & Ponack, L.L.P.

(57) ABSTRACT

Obtaining one or more motion vector predictor candidates includes: (a1) generating a motion vector predictor candidate, based on motion vectors of first adjacent blocks adjacent to a block to be processed in a first direction; and (a2) generating a motion vector predictor candidate, based on motion vectors of second adjacent blocks adjacent to the block to be processed in a second direction, and step (a2) (S500) includes: (S520) determining whether the first adjacent blocks include an inter-predicted block; and (S530) searching for a motion vector on which scaling processing can be performed from among the motion vectors of the second adjacent blocks when it is determined that the first adjacent blocks do not include an inter-predicted block, and executing, when the motion vector on which scaling processing can be performed is obtained in the search, scaling processing on the motion vector obtained in the search.

3 Claims, 47 Drawing Sheets mvLX = mvpLX + mvdLX

(51) Int. Cl.

| | | |
|---|---|---|
| *H04N 11/02* | (2006.01) | |
| *H04N 11/04* | (2006.01) | |
| *H04N 19/56* | (2014.01) | |
| *H04N 19/51* | (2014.01) | |
| *H04N 19/577* | (2014.01) | |
| *H04N 19/583* | (2014.01) | |
| *H04N 19/52* | (2014.01) | |
| *H04N 19/513* | (2014.01) | |
| *H04N 19/573* | (2014.01) | |

(52) U.S. Cl.
CPC ... *H04N19/00733* (2013.01); *H04N 19/00715* (2013.01); *H04N 19/0066* (2013.01); *H04N 19/52* (2014.11); *H04N 19/51* (2014.11); *H04N 19/513* (2014.11); *H04N 19/573* (2014.11); *H04N 19/577* (2014.11)

(56) References Cited

U.S. PATENT DOCUMENTS

| | | | |
|---|---|---|---|
| 2008/0063075 A1* | 3/2008 | Kondo et al. | 375/240.16 |
| 2010/0290527 A1 | 11/2010 | Park et al. | |
| 2011/0150088 A1 | 6/2011 | de Rivaz | |
| 2011/0150091 A1* | 6/2011 | Young | 375/240.16 |
| 2012/0008690 A1* | 1/2012 | Lee et al. | 375/240.16 |

OTHER PUBLICATIONS

International Search Report issued Feb. 5, 2013 in corresponding International Application No. PCT/JP2012/007006.

"8. 4. 1 Derivation process for motion vector components and reference indices", ITU-T Recommendation H. 264 (Advanced video coding for generic audiovisual services), Mar. 2010, Expressions (8-174) and (8-175).

"WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting: Torino, IT, JCTVC-F803_d2, Jul. 14-22, 2011.

Toshiyasu Sugio et al., "Non-CE9/Non-CE13: Simplification on AMVP/Merge", JCTVC-G542, Joint Collaborative Team on Video Coding (JCT-VC) of ITU-T SG16 WP3 and ISO/IEC JTC1/SC29/WG11, Nov. 21, 2011, pp. 1-11.

Benjamin Bross et al., "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, Jul. 14, 2011, pp. 112-117.

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d5, Ver.6, 6th Meeting: Torino, IT, Jul. 14-22, 2011.

\* cited by examiner mvLX = mvpLX + mvdLX

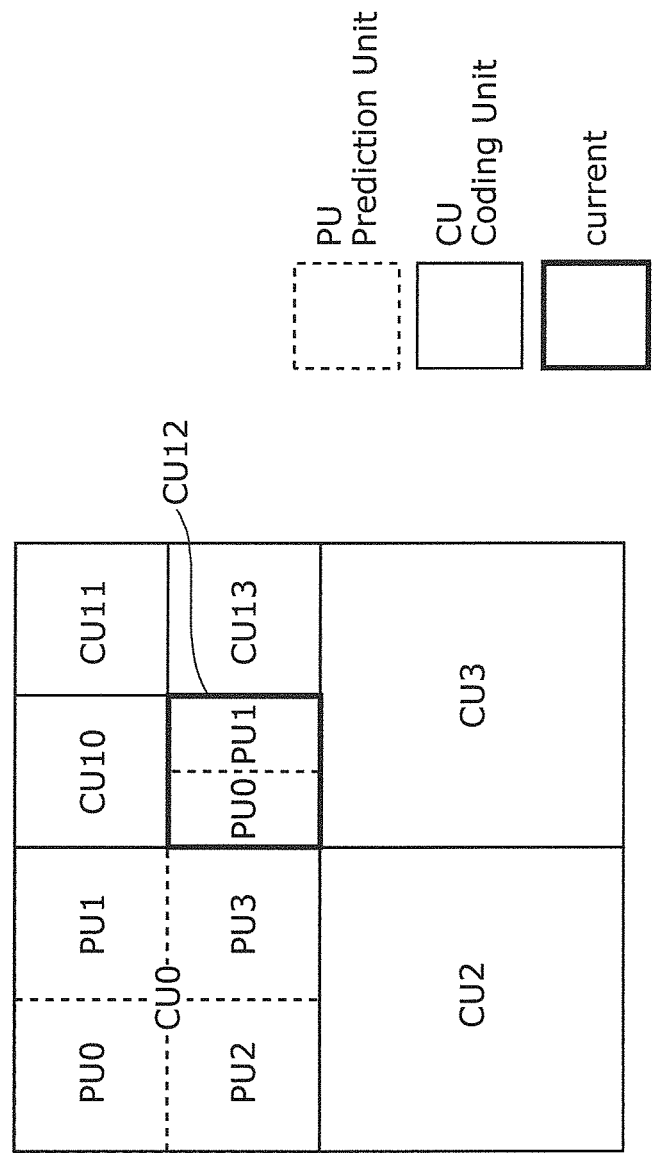

FIG. 4B
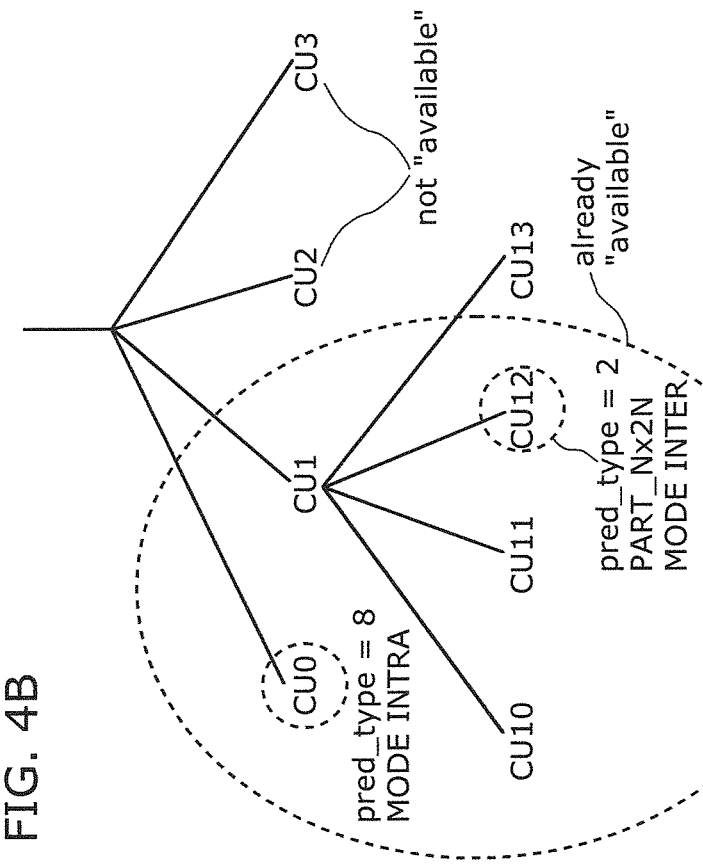
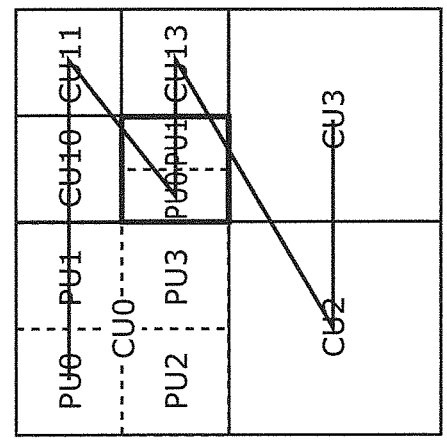

FIG. 4C

| slice_type | pred_type | predMode | partMode |
|---|---|---|---|
| I | 0 | MODE_INTRA | PART_2Nx2N |
| | 1 | MODE_INTRA | PART_NxN |
| P or B | 0 | MODE_INTER | PART_2Nx2N |
| | 1 | MODE_INTER | PART_2Nx2N |
| | 2 | MODE_INTER | PART_Nx2N |
| | 3 | MODE_INTER | PART_NxN |
| | 4 | MODE_INTER | PART_2NxnU |
| | 5 | MODE_INTER | PART_2NxnD |
| | 6 | MODE_INTER | PART_nLx2N |
| | 7 | MODE_INTRA | PART_nRx2N |
| | 8 | MODE_INTRA | PART_2Nx2N |
| | 9 | MODE_INTRA | PART_NxN |
| | inferred | MODE_SKIP | PART_2Nx2N | example CU12 example CU0

FIG. 6A (L0) mvpListL0
(List of motion vector predictor candidates)

| Value of mvp_idx_l0 | Value of mvpListL0 [mvp_idx_l0] | N |
|---|---|---|
| 0 | mvLXA, if availableFlagLXA is equal to 1 | A |
| 1 | mvLXB, if availableFlagLXB is equal to 1 | B |

FIG. 6B (L1) mvpListL1
(List of motion vector predictor candidates)

| Value of mvp_idx_l1 | Value of mvpListL1 [mvp_idx_l1] | N |
|---|---|---|
| na | na | A |
| 0 | mvLXB, if availableFlagLXB is equal to 1 | B |

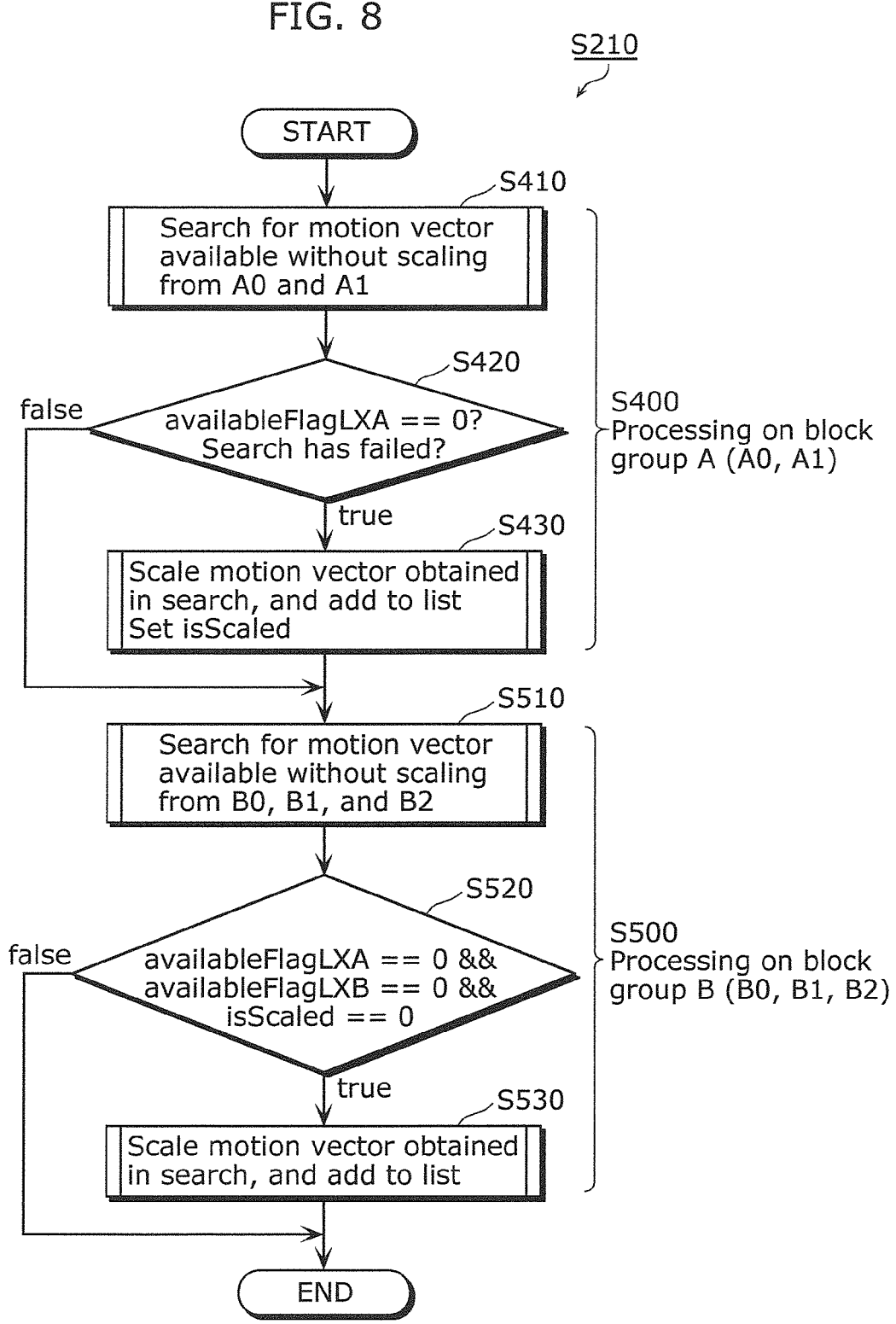

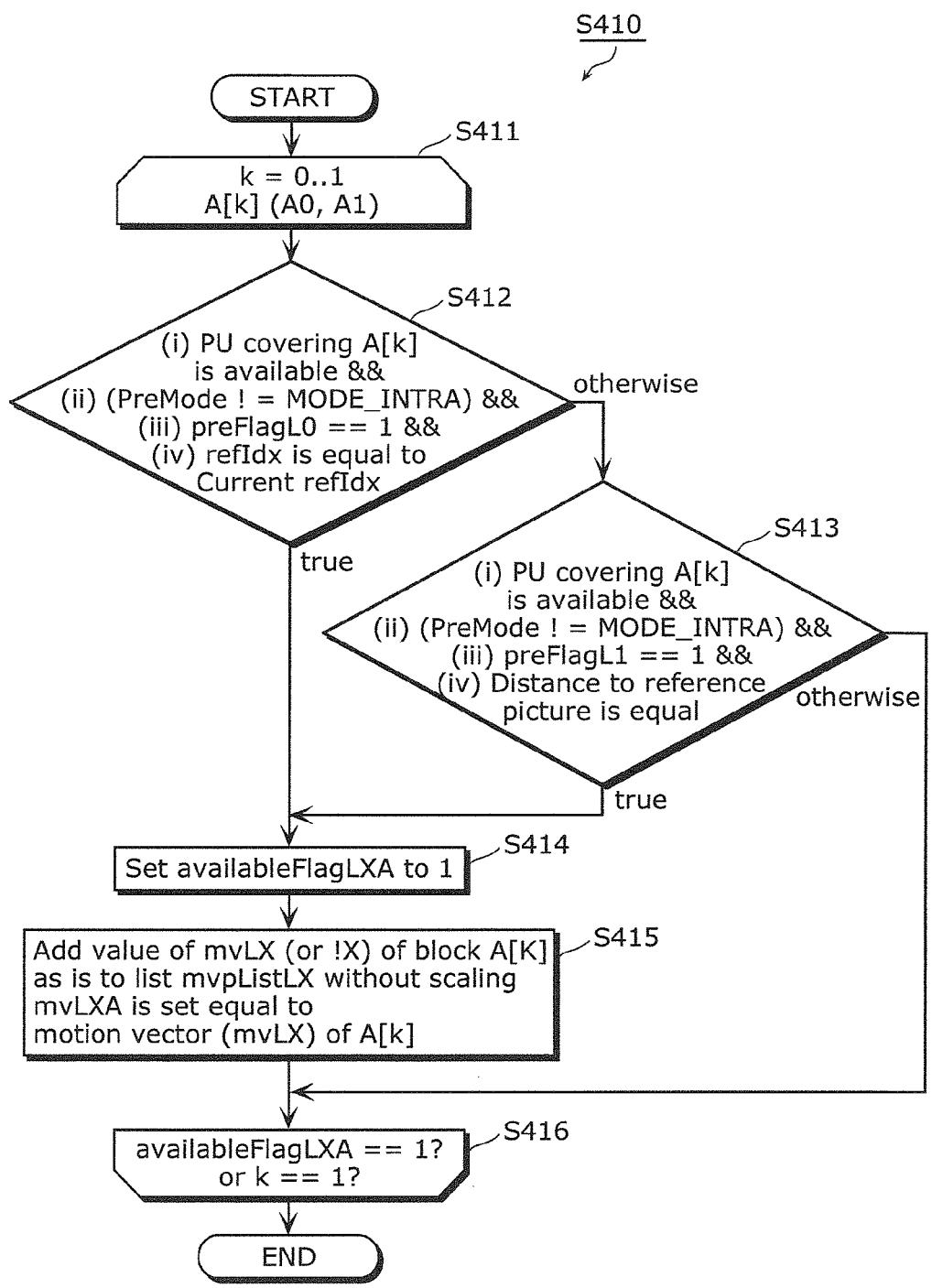

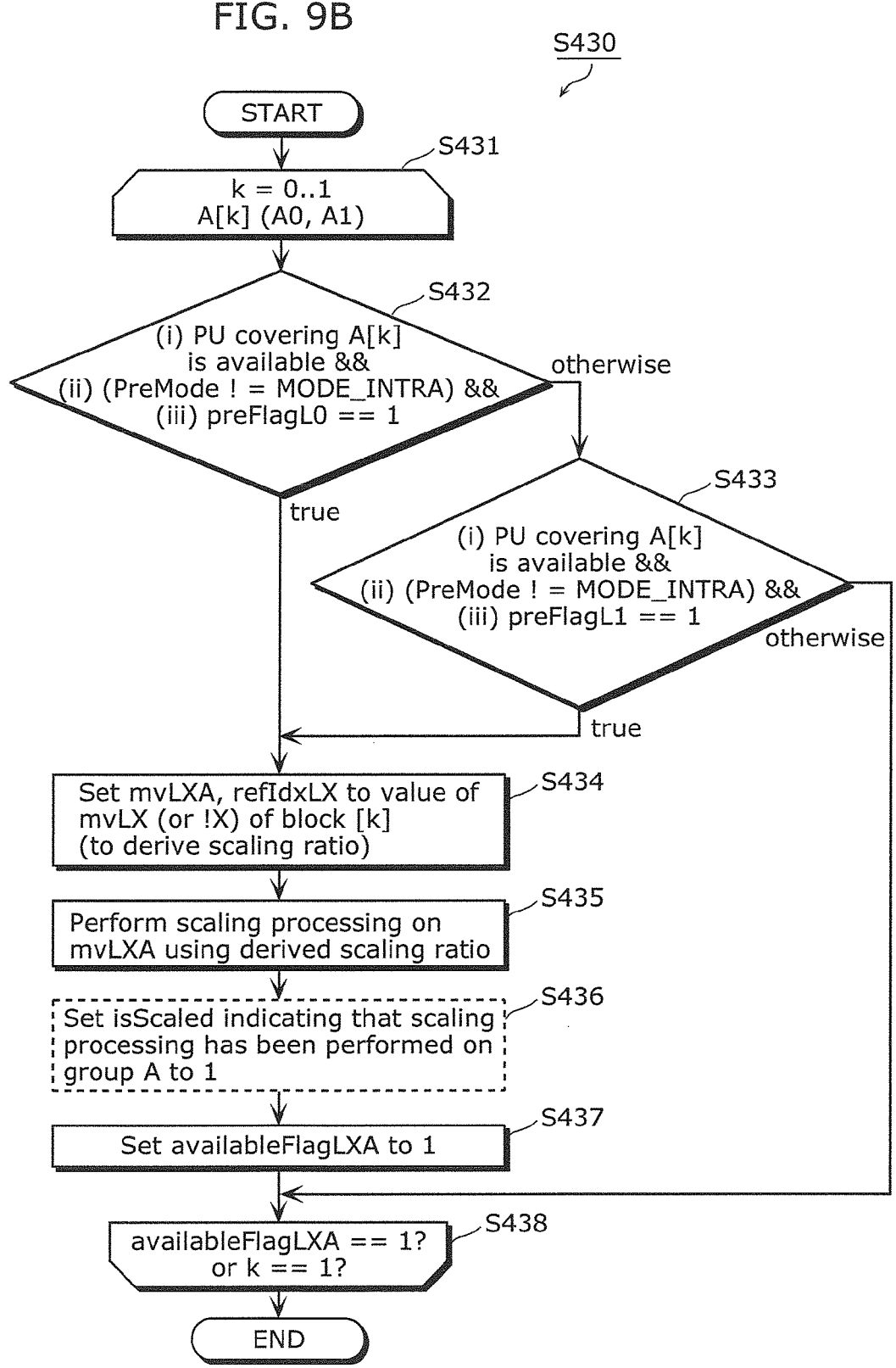

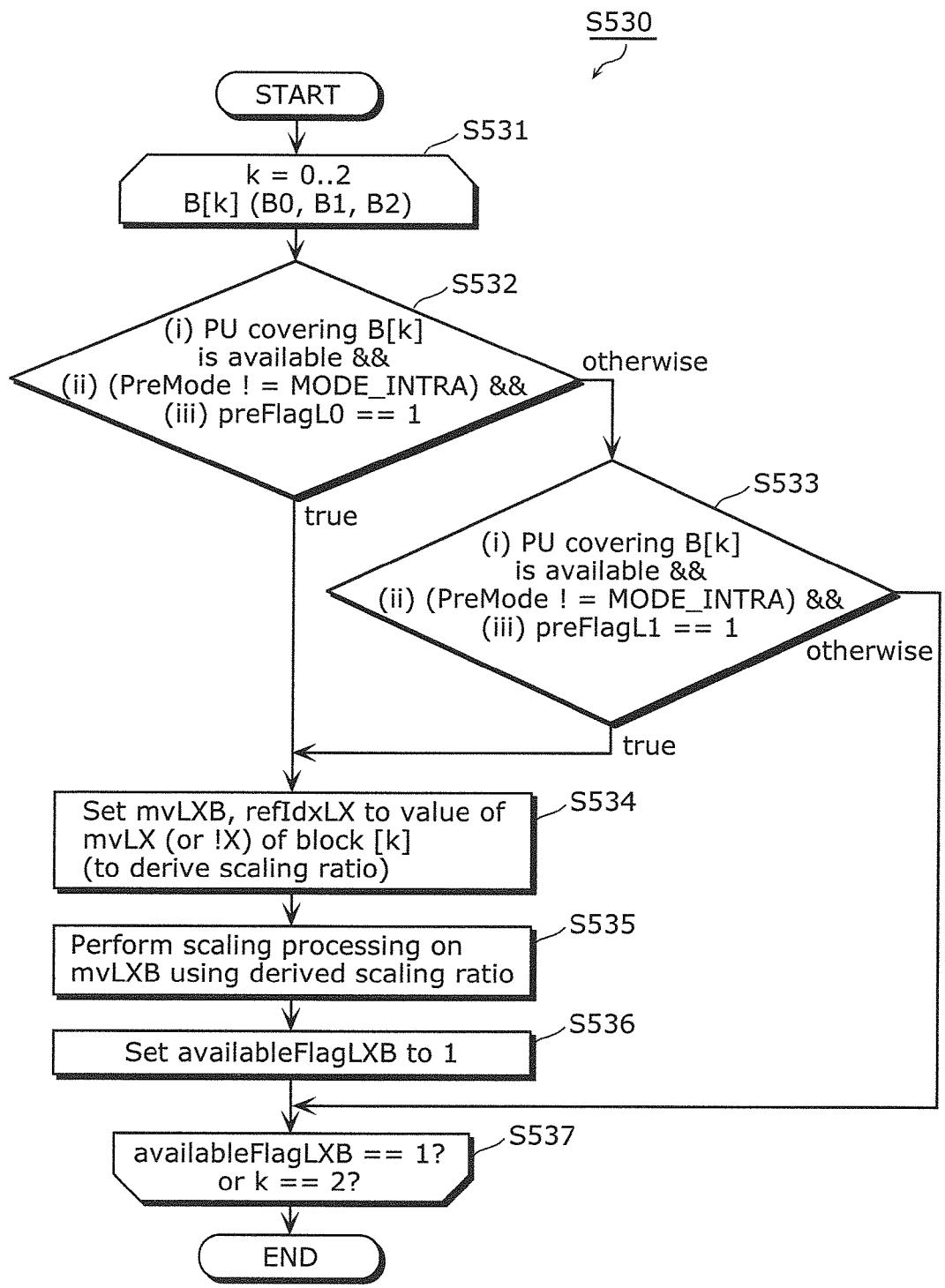

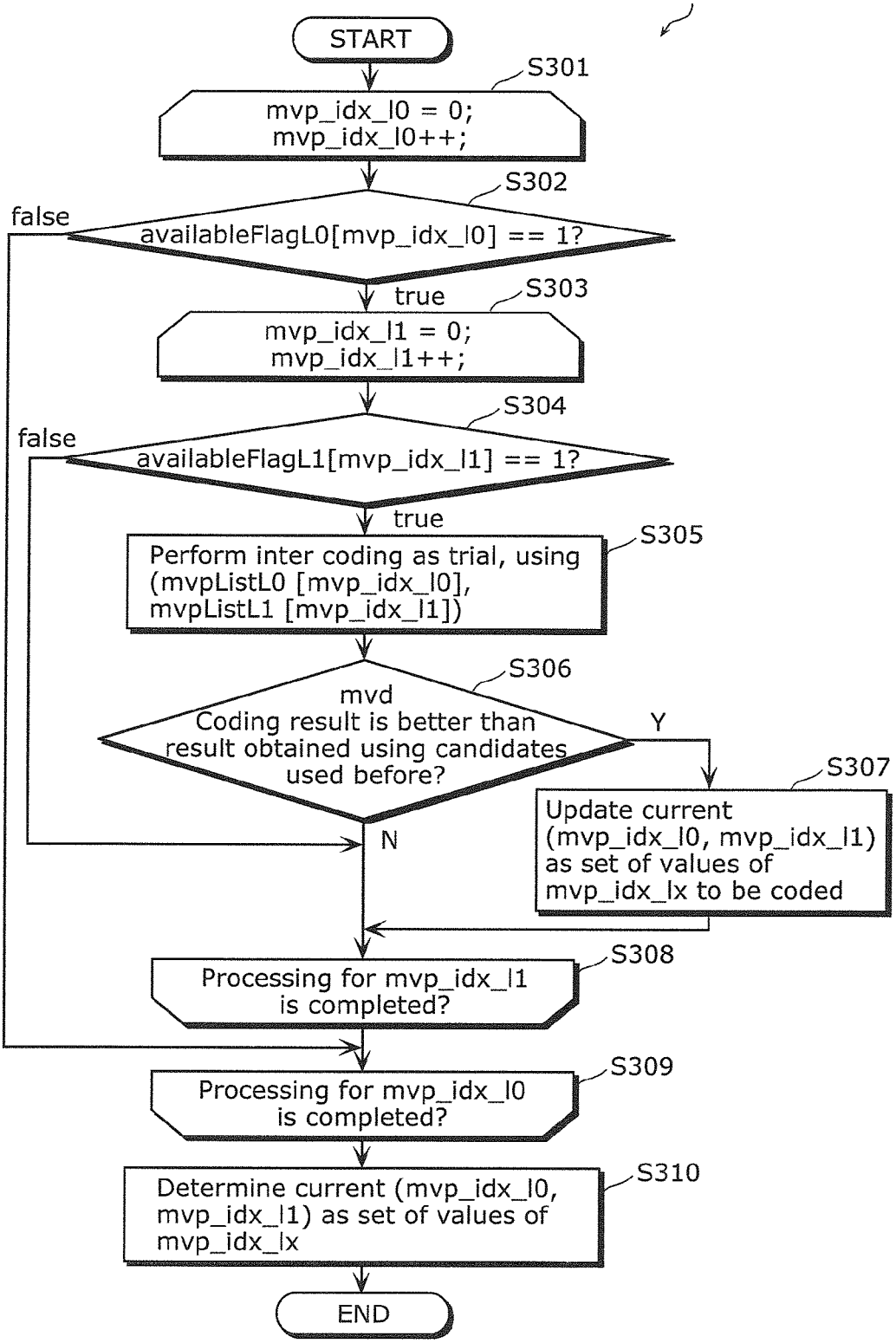

FIG. 30

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 33
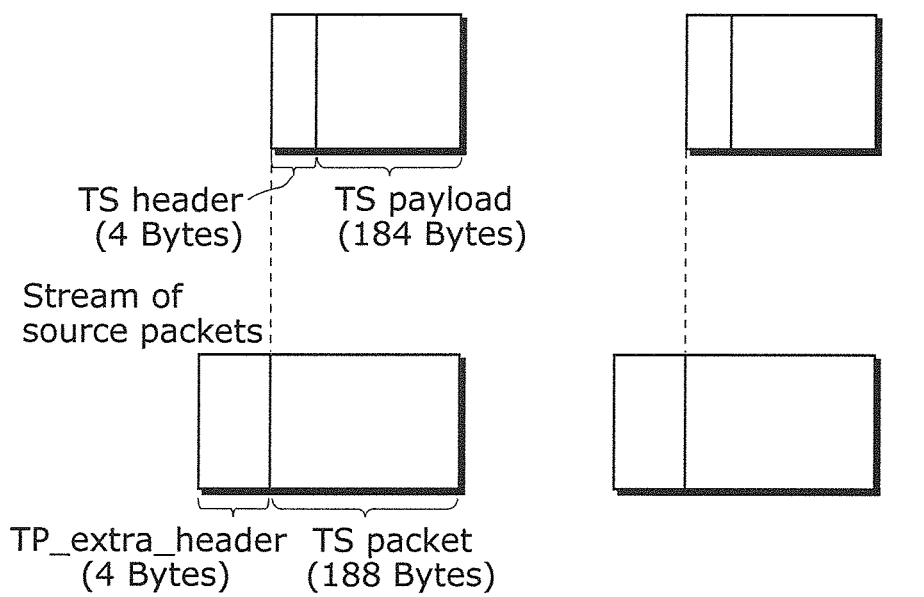
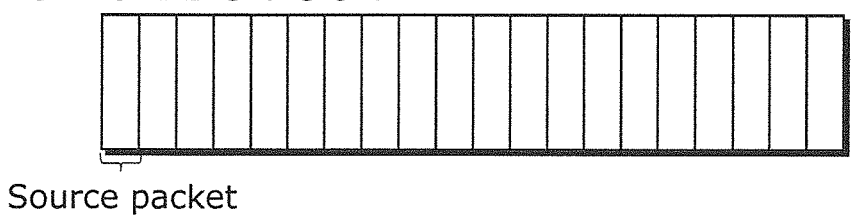

FIG. 41

| Corresponding standard | Driving frequency |
|---|---|
| MPEG-4 AVC | 500 MHz |
| MPEG-2 | 350 MHz |
| ⋮ | ⋮ |

MOVING PICTURE CODING METHOD, MOVING PICTURE CODING APPARATUS, MOVING PICTURE DECODING METHOD, AND MOVING PICTURE DECODING APPARATUS

CROSS REFERENCE TO RELATED APPLICATION

The present application is a divisional of application Ser. No. 13/666,265, filed Nov. 1, 2012, which claims the benefit of U.S. Provisional Patent Application No. 61/554,598 filed Nov. 2, 2011. The entire disclosures of the above-identified applications, including the specification, drawings and claims are incorporated herein by reference in their entirety.

FIELD

The present disclosure relates to a moving picture coding method, a moving picture coding apparatus, a moving picture decoding method, and a moving picture decoding apparatus.

BACKGROUND

In moving picture coding processing, in general, the amount of information is reduced by utilizing redundancy in the spatial direction and the temporal direction which moving pictures have. Here, in general, transform to a frequency domain is used as a method utilizing redundancy in the spatial direction. Further, inter-picture prediction (hereinafter, referred to as "inter prediction") coding processing is used as a method utilizing redundancy in the temporal direction. In inter prediction coding processing, when a picture is coded, a coded picture that appears before or after a current picture to be coded in the display time order is used as a reference picture. A motion vector is derived by performing motion detection on the current picture relative to the reference picture. Then, redundancy in the temporal direction is eliminated by calculating a difference between image data of the current picture and predicted image data obtained by motion compensation based on the derived motion vector.

CITATION LIST

Non Patent Literature

[NPL 1] ITU-T H.264 "8.4.1 Derivation process for motion vector components and reference indices" March, 2010, Expressions (8-174) and (8-175)

[NPL 2] JCTVC-F803_d2 "WD4: Working Draft 4 of High-Efficiency Video Coding", Joint Collaborative Team on Video Coding (JCT-VC) of ITU-T SG16 WP3 and ISO/IEC JTC1/SC29/WG11 6th Meeting, Torino, IT, 14 to 22 Jul. 2011

SUMMARY

Technical Problem

There is a demand, however, for the above conventional technique to achieve an increase in processing speed in coding and decoding a moving picture using inter prediction.

In view of this, an object of the present disclosure is to provide a moving picture coding method and a moving picture decoding method for allowing an increase in the processing speed of coding and decoding a moving picture using inter prediction.

Solution to Problem

A moving picture coding method according to an aspect of the present disclosure is a moving picture decoding method for decoding a current block included in a bitstream, using a motion vector predictor used when decoding a motion vector of the current block, the method including: (a) obtaining one or more motion vector predictor candidates which are candidates for the motion vector predictor; (b) decoding a coded index for identifying one of the one or more motion vector predictor candidates, the coded index being added to the bitstream; and (c) selecting, based on the decoded index, the motion vector predictor to be used for decoding the current block from among the one or more motion vector predictor candidates, wherein step (a) includes: (a1) generating a motion vector predictor candidate, based on plural motion vectors of plural first adjacent blocks adjacent to the current block in a first direction; and (a2) generating a motion vector predictor candidate, based on plural motion vectors of plural second adjacent blocks adjacent to the current block in a second direction, and step (a2) includes: (i) determining whether the plural first adjacent blocks include one or more inter-predicted blocks; and (ii) searching for a motion vector to be made available by scaling processing from among the plural motion vectors of the plural second adjacent blocks when it is determined in step (i) that the plural first adjacent blocks do not include an inter-predicted block, and generating, when the motion vector is obtained in the search, one of the one or more motion vector predictor candidates by executing scaling processing on the motion vector obtained in the search.

It should be noted that these general and specific aspects may be implemented using a system, a method, an integrated circuit, a computer program, a computer-readable recording medium such as a CD-ROM, or any combination of systems, methods, integrated circuits, computer programs or recording media.

Further benefits and advantages provided by the disclosed embodiments become clear from the specification and the drawings. Those benefits and advantages may be individually achieved by the features of various embodiments, the specification, and the drawings, and all the features do not necessarily need to be provided to obtain at least one benefit or advantage.

Advantageous Effects

Provided is a moving picture coding method and a moving picture decoding method for allowing an increase in the processing speed of coding and decoding a moving picture using inter prediction.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4A illustrates a relationship between coding block units CU (coding unit) and prediction block units PU (prediction unit).

FIG. 4B illustrates a relationship between a coding unit tree and pred_type.

FIG. 4C illustrates an interpretation table for values of pred_type.

FIG. 6A illustrates a candidate list mvpListL0 of motion vector predictors.

FIG. 6B illustrates a candidate list mvpListL1 of motion vector predictors.

FIG. 8 is a flowchart illustrating a procedure of creating a candidate list mvpListLX according to Comparative Example.

FIG. 9A is a flowchart illustrating a detailed processing procedure of step S410 in FIG. 8.

FIG. 9B is a flowchart illustrating a detailed processing procedure of step S430 in FIG. 8.

FIG. 10B is a flowchart illustrating a detailed procedure of step S530 in FIG. 8.

FIG. 11 is a flowchart illustrating a detailed procedure of step S240 in FIG. 3.

FIG. 30 illustrates a structure of multiplexed data.

FIG. 33 shows a structure of TS packets and source packets in the multiplexed data.

FIG. 41 shows an example of a look-up table in which video data standards are associated with driving frequencies.

DESCRIPTION OF EMBODIMENTS (Underlying Knowledge Forming Basis of the Present Disclosure)

In H.264, three picture types, namely, I-picture, P-picture, and B-picture are used to compress the amount of information.

An I-picture is not coded by inter prediction coding processing. Specifically, an I-picture is coded by intra-picture prediction (hereinafter, referred to as intra prediction) coding processing. A P-picture is coded by inter prediction coding by referring to one already coded picture that appears before or after a current picture to be coded in the display time order. A B-picture is coded by inter prediction coding by referring to two already coded pictures that appear before (e.g., in a prediction direction 0) or after (e.g., in a prediction direction 1) the current picture in the display time order.

Various considerations are being made regarding a motion vector deriving method used for inter prediction coding processing on a moving picture. Examples of the motion vector deriving method include the methods below.

The first motion vector deriving method is an H.264 direct mode for directly deriving a motion detection vector (motion vector) from coded (decoded) data, without obtaining information from a code string.

The second motion vector deriving method is a method for deriving a motion vector v (motion vector) to be used for inter prediction by adding a motion vector difference d obtained from a code string to a motion vector predictor p (see Expressions (8-174) and (8-175) in NPL 1, for instance). It should be noted that the motion vector difference d is a difference vector between the motion vector v and the motion vector predictor p.

Figure 1:
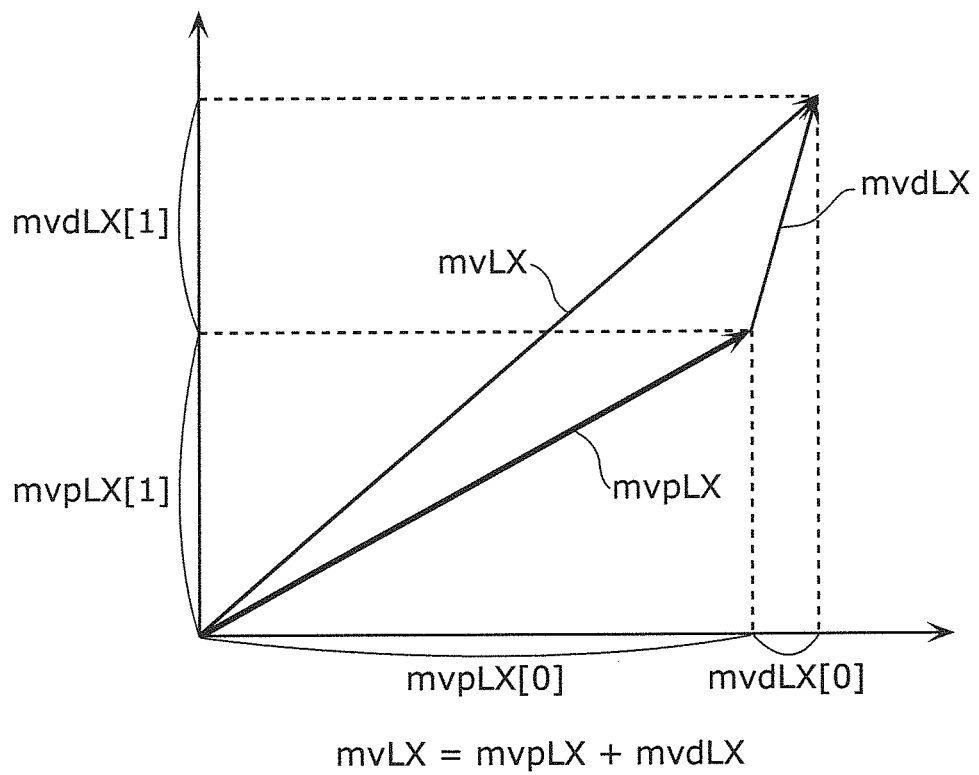
FIG. 1 is a conceptual diagram illustrating a relationship among a motion vector, a motion vector predictor, and a motion vector difference which are used to generate a predicted image.

Here, FIG. 1 is a conceptual diagram illustrating a relationship among the motion vector v (mvLX), the motion vector predictor p (mvpLX), and the motion vector difference d (mvdLX) in the second H.264 motion vector deriving method. It should be noted that calculation is performed separately for first components (e.g., horizontal components) and second components (e.g., vertical components) in the example illustrated in FIG. 1.

At the time of decoding, the motion vector mvLX is reconstructed by executing the calculation of Expressions 1 and 2 below for respective components.

For a first component:

$$mvLX[0]=mvpLX[0]+mvdLX[0] \quad \text{(Expression 1)}$$

For a second component:

$$mvLX[1]=mvpLX[1]+mvdLX[1] \quad \text{(Expression 2)}$$

At the time of coding, first, a motion vector mvLX (mvLX [0], mvLX [1]) is determined through search in view of coding efficiency (and also refIdxLX for identifying a reference image). Furthermore, calculations represented by Expressions 3 and 4 below are performed in order to obtain a motion vector difference mvdLX which is information necessary for reconstructing the motion detection vector mvLX.

For a first component:

$$mvdLX[0]=mvLX[0]-mvpLX[0] \quad \text{(Expression 3)}$$

For a second component:

$$mvdLX[1]=mvLX[1]-mvpLX[1] \quad \text{(Expression 4)}$$

At the time of coding, the two-dimensional motion vector difference mvdLX (mvdLX [0], mvdLX [1]) obtained by the above calculations is coded.

The following is a description of a moving picture coding method and a moving picture coding apparatus according to Comparative Example, based on FIGS. 2 to 5.

EX1

Figure 2:
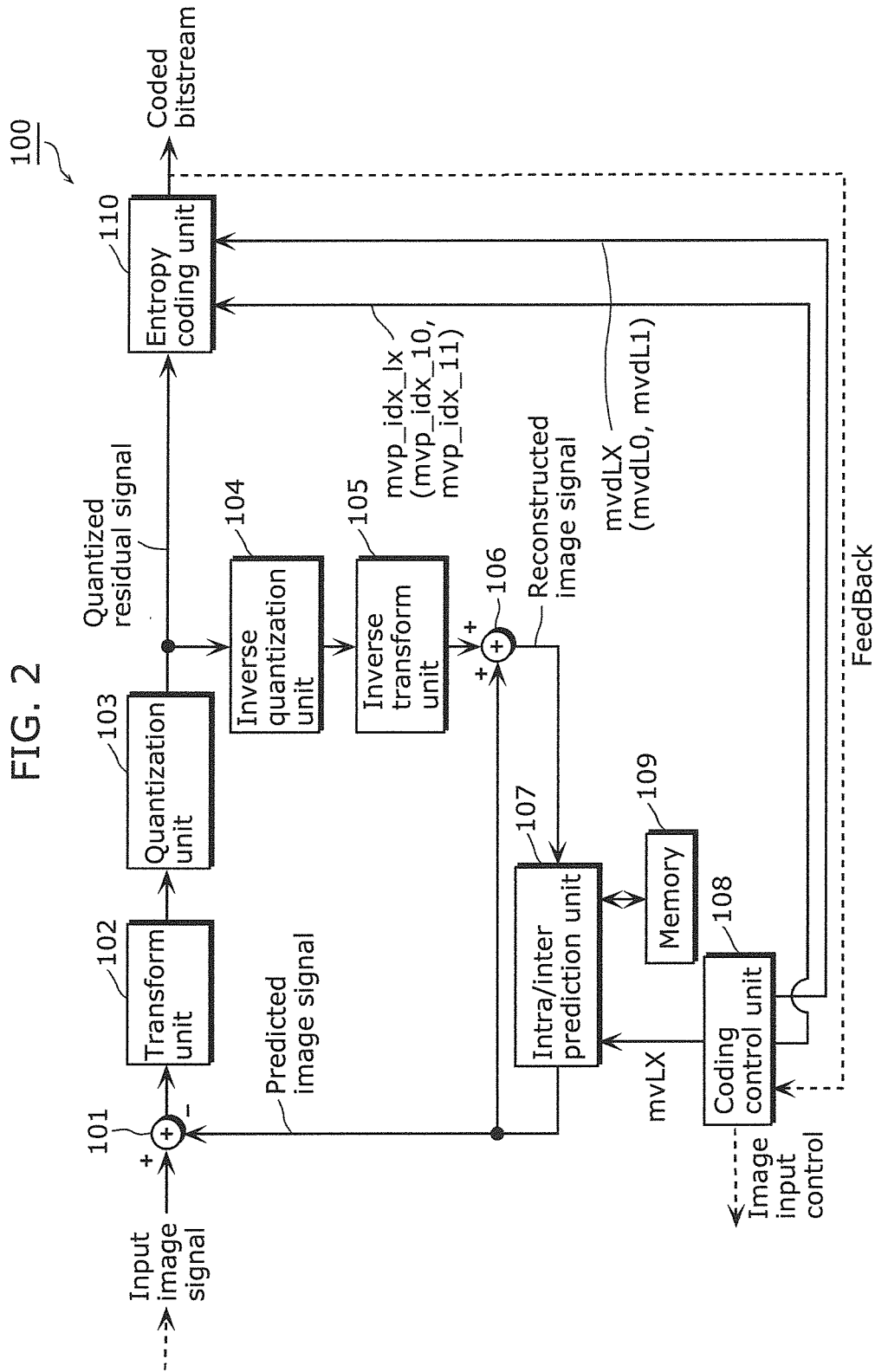
FIG. 2 is a block diagram illustrating an example of a configuration of a moving picture coding apparatus.

Configuration of Moving Picture Coding Apparatus According to Comparative Example FIG. 2 is a block diagram illustrating an example of a configuration of the moving picture coding apparatus according to Comparative Example.

As illustrated in FIG. 2, a moving picture coding apparatus 100 includes a difference unit 101, a transform unit 102, a quantization unit 103, an entropy coding unit 110, an inverse quantization unit 104, an inverse transform unit 105, an addition unit 106, a memory 109, an intra/inter prediction unit 107, and a coding control unit 108.

The difference unit 101 generates a residual signal by subtracting a predicted image signal from an input image signal for each block. The difference unit 101 outputs the residual signal to the transform unit 102.

The transform unit 102 transforms the residual signal from an image domain into a frequency domain. The quantization unit 103 performs quantization processing on the residual signal which has been transformed into the frequency domain. The quantization unit 103 outputs the quantized residual signal which is a residual signal on which quantization processing has been performed to the inverse quantization unit 104 and the entropy coding portion 110.

The entropy coding unit 110 performs entropy coding processing on the quantized residual signal, a decoding control signal, and the like, to generate a coded bitstream. A decoding control signal includes a prediction direction flag, picture type information, a control parameter such as a motion vector difference d, for example.

The inverse quantization unit 104 performs inverse quantization processing on the quantized residual signal on which quantization processing has been performed by the quantization unit 103. The inverse transform unit 105 transforms the quantized residual signal (residual signal) on which inverse quantization processing has been performed from the frequency domain into the image domain, and outputs a reconstructed residual signal.

The addition unit 106 adds a reconstructed residual signal and a predicted image signal for each block to be coded, thereby generating a reconstructed image signal.

A reconstructed image signal is stored on a frame-by-frame basis in the memory 109.

The intra/inter prediction unit 107 stores a reconstructed image signal in a memory in predetermined units, such as frame units and block units. In addition, the intra/inter prediction unit 107 generates a predicted image signal (a pixel value derived based on a reconstructed image signal and a motion vector), based on an instruction from the coding control unit 108 described below. The intra/inter prediction unit 107 outputs the generated predicted image signal to the difference unit 101 and the addition unit 106.

The coding control unit 108 determines which control parameter is to be used for coding a picture (input image signal), after making trials. The coding control unit 108 outputs, from among plural control parameters, a control parameter (coding control information) necessary for coding to the intra/inter prediction unit 107. More specifically, for example, as shown by the dotted lines in FIG. 1, the coding control unit 108 obtains a coded bitstream, determines plural control parameters (e.g., for distinguishing between inter prediction and intra prediction, etc.) so that the bit length of the obtained coded bitstream is shortened.

In addition, the coding control unit 108 extracts a control parameter (decoding control information) necessary for decoding from the plural control parameters, and outputs the extracted parameter to the entropy coding unit 110. Examples of decoding control information include pred_type, mvp_idx_lx, mvdLX, and the like. For each coding block unit CU, pred_type is set, and specifies a prediction mode (for distinguishing between inter prediction and intra prediction), and the partitioned shape of a coding block unit CU (partitioning type). The details of pred_type are described below. A motion vector predictor index for designating a candidate to be used as a motion vector predictor from a candidate list is indicated by mvp_idx_lx. A motion vector difference is indicated by mvdLX, as mentioned above.

EX2

Processing Operation of Moving Picture Coding Apparatus According to Comparative Example Next is a description of the moving picture coding method executed by the moving picture coding apparatus 100 described above, based on FIGS. 3 and 4A.

Figure 3:
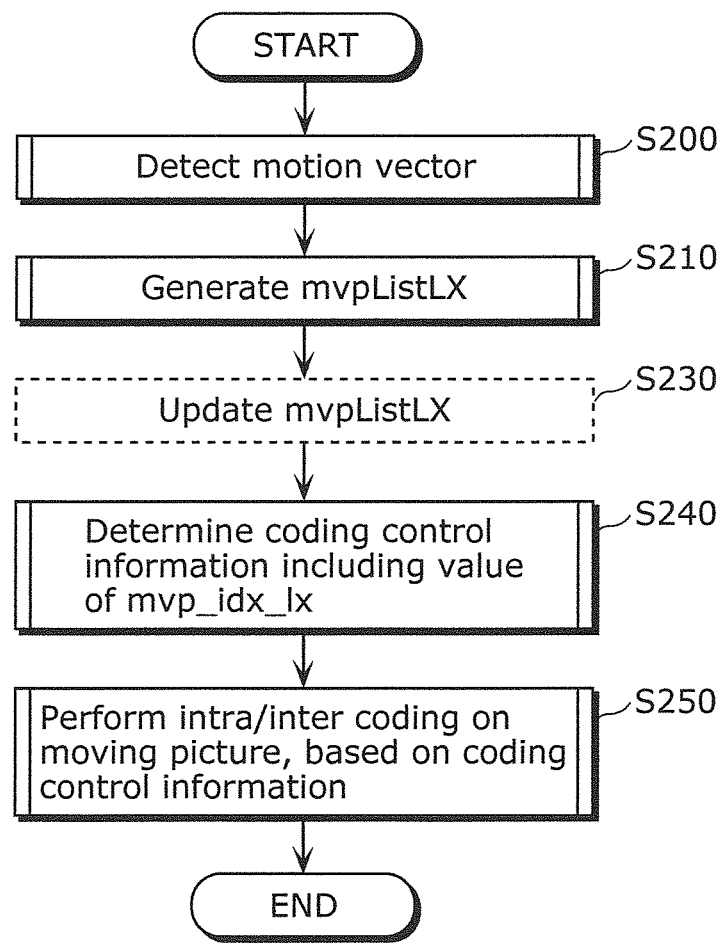
FIG. 3 is a flowchart illustrating an example of a moving picture coding method.

FIG. 3 is a flowchart showing a processing procedure of a method for generating a predicted image by inter prediction coding (moving picture coding method) executed by the moving picture coding apparatus 100 described above.

It should be noted that a predicted image is generated per prediction block unit PU. Here, a description is given of the case where the size of a prediction block unit PU is smaller than a coding block unit CU, as an example.

FIG. 4A illustrates a relationship between the prediction block unit PU and the coding block unit CU. In FIG. 4A, the solid line frame indicates the coding block unit CU, and the broken line frame indicates the prediction block unit PU. The slice (picture) type is B. One slice is divided into four blocks having the same size in FIG. 4A. Furthermore, the upper right block is further divided into four. These blocks are coding block units CU.

Furthermore, in FIG. 4A, the coding block units CU are numbered in the order 0, 1, 2, and so on for each depth level of a tree hierarchy called "coding tree". The numbers correspond to the coding processing order. Specifically, CU0, CU10 to CU13, CU2, and CU3 are given to the upper left block, the upper right blocks, the bottom left block, and the bottom right block, respectively.

FIG. 4B illustrates a relationship between pred_type and a coding unit tree obtained from a code string based on coding tree syntax, with regard to the coding block units CU illustrated in FIG. 4A. What pred_type indicates can be determined in accordance with the table illustrated in FIG. 4C, for example.

FIG. 4C is an interpretation table showing values of pred_type. For example, if the slice type is P or B, and the value of pred_type is 2, the prediction mode of the coding block unit CU is MODE_INTER, and the partitioned shape of the coding block unit CU is N×2N. The coding block unit CU12 in FIG. 4A corresponds to this unit, for example. In addition, for example, if the slice type is P or B, and the value of pred_type is 8, the prediction mode of the coding block unit CU is MODE_INTRA, and the partitioned shape of the coding block unit CU is 2N×2N. The coding block unit CU0 in FIG. 4A corresponds to this unit, for example.

The following is a description of the case where a current block to be coded is CU12, as an example. As mentioned above, the prediction mode of the current block CU12 is MODE_INTER, and the current block CU12 includes two prediction block units PU, namely, PU0 and PU1 (N×2N). It should be noted that in FIG. 4B, the area enclosed by the one-point dashed line is an area having information which is already "available" at the point in time when coding the prediction block unit PU0 of the current block CU12. As illustrated in FIG. 4B, in Comparative Example, the coding block units CU2 and CU3 are not "available" at the point in time when coding the current block CU12.

Now referring to FIG. 3, in step S200, the coding control unit 108 derives a motion vector mvLX of a current block to be predicted by motion detection.

In step S210, the coding control unit 108 generates motion vector predictor candidate lists (mvpListLX) for each prediction block unit (PU unit) included in a current block to be coded (Curr_Blk) (mvpListLX generation step). It should be noted that the candidate list mvpListLX is generated for each prediction block unit PU. In addition, two candidate lists, namely, a candidate list mvpListL0 corresponding to the prediction direction 0 and a candidate list mvpListL1 corresponding to the prediction direction 1 are generated for each prediction block unit PU.

Figure 5:
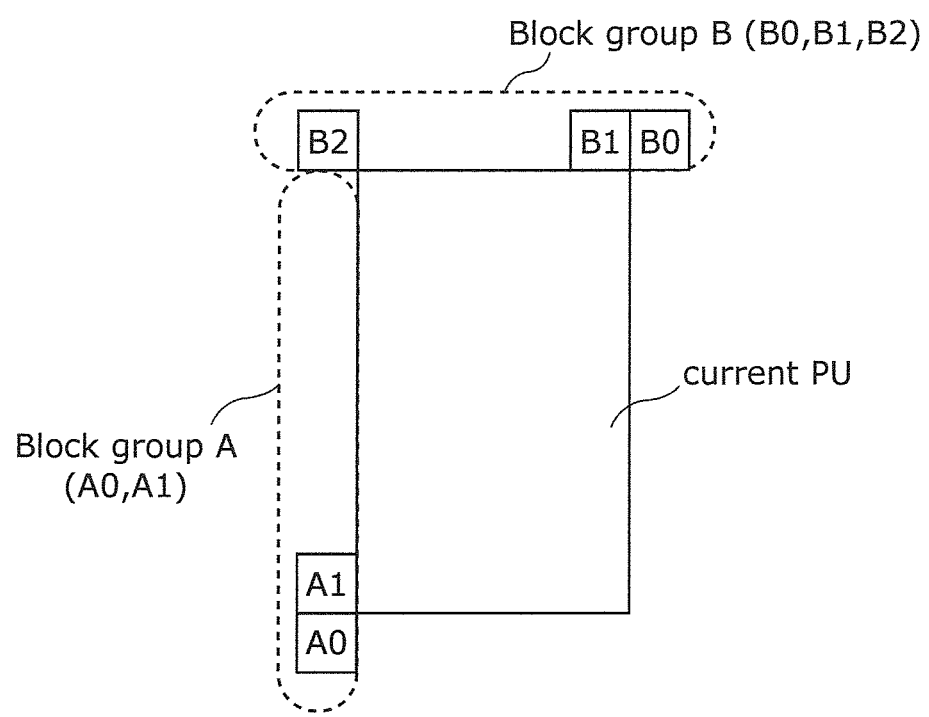
FIG. 5 illustrates a positional relationship between a current block to be predicted and adjacent blocks adjacent to the current block.

FIG. 5 illustrates the positional relationship of a current block to be predicted (currentPU, current prediction block unit PU) and adjacent blocks. In FIG. 5, plural adjacent blocks are divided into two block groups A and B (hereinafter, referred to as "group A" and "group B" for short in the drawings, as appropriate). The block group A includes an adjacent block A0 on the left of the current block, and an adjacent block A1 on the bottom-left of the current block. The block group B includes an adjacent block B2 on the upper left of the current block, an adjacent block B1 on the upper side of the current block, and an adjacent block B0 on the upper right of the current block.

It should be noted that in FIG. 4A, when the prediction block unit PU0 included in the coding block unit CU12 is a current block to be predicted, a block corresponding to the adjacent block A1 is the prediction block unit PU3 included in the coding block unit CU0, and the block corresponding to the adjacent block A0 is the prediction block unit PU included in the coding block unit CU2.

A description is given of motion vector predictor candidate lists generated by the coding control unit 108, with reference to FIGS. 6A and 6B. FIG. 6A illustrates the candidate list mvpListL0 for coding motion vector predictors in the prediction direction 0. FIG. 6B illustrates the candidate list mvpListL1 for coding motion vector predictors in the prediction direction 1. N is an index indicating a block group.

FIGS. 6A and 6B show the case where the size of the candidate lists is 2, and one candidate is derived from each of the block groups A and B illustrated in FIG. 5. It should be noted that the case where no candidate is derived from the block groups A and B is not intended to be excluded. A detailed description of a method for deriving the candidate lists will be given below.

Now, referring back to FIG. 3, in step S230, the coding control unit 108 performs update processing on mvpListLX (update step). The coding control unit 108 adds an entry, duplicates a candidate included in a list, deletes a candidate, and the like as the update processing, for example. The rule for the update processing is shared between the moving picture coding apparatus 100 and a moving picture decoding apparatus 300 described below.

In step S240, the coding control unit 108 determines coding control information including the value of mvp_idx_lx for each prediction block unit PU (determination step).

Figure 7:
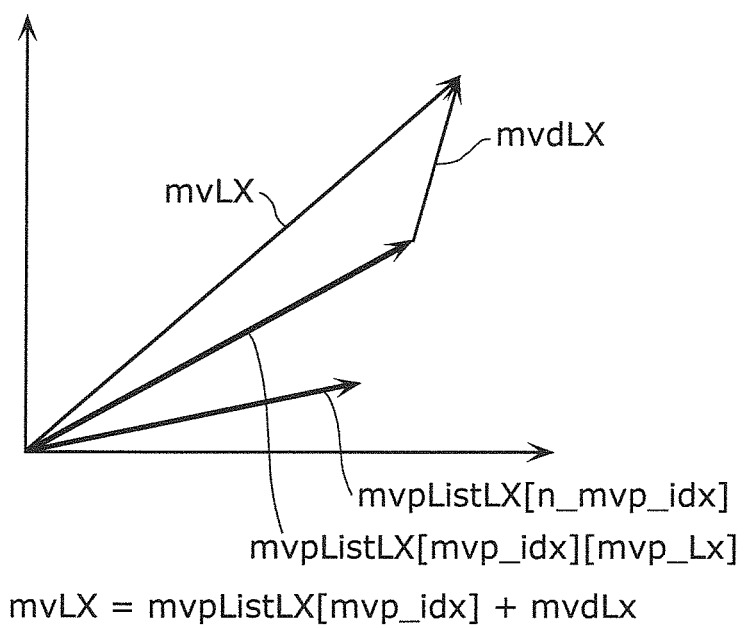
FIG. 7 is a conceptual diagram illustrating a relationship between motion vector predictor candidates included in a candidate list mvpListLX.

"mvp_idx_lx" is a motion vector predictor index which indicates a motion vector predictor candidate for coding a motion vector in the prediction direction X. Here, FIG. 7 illustrates a relationship among each candidate in the motion vector predictor candidate list mvpListLX, the motion vector mvLX, and the motion vector difference mvdLX. It should be noted that FIG. 7 shows mvpListLX [n_mvp_idx] which is not determined to be the motion vector predictor mvpLX, for reference. The motion vector mvLX is a motion vector derived through motion detection by the coding control unit 108 in step S200. In the present embodiment, the coding control unit 108 determines, as a motion vector predictor, one of two motion vector predictor candidates which has the smaller difference from the motion vector mvLX. The value of mvp_idx of mvpListLX [mvp_idx] is determined to be a value of index mvp_idx_1X.

In step S250, the intra/inter prediction unit 107 performs intra/inter coding on each prediction block unit PU, based on coding control information (prediction step).

EX2-1

Method for Generating Candidate List mvpListLX According to Comparative Example

Next is a detailed description of a method for generating the motion vector predictor candidate list mvpListLX, with reference to FIGS. 8 to 10B.

FIG. 8 is a flowchart showing a detailed processing procedure of mvpListLX generation step S210. The coding control unit 108 initializes flags (availableLXA, isScaled, availableLXB, and the like) to 0, prior to the processing below.

First, the coding control unit 108 performs processing of generating a first candidate for mvpListLX (S400). In step S400, the coding control unit 108 executes processing for deriving a candidate from blocks A0 and A1 included in the block group A. It should be noted that there may be a case where a candidate cannot be derived from the block group A if intra prediction is used for both of the blocks A0 and A1, for instance.

In step S410, the coding control unit 108 searches the block group A for a block having a motion vector which is available without scaling processing (scaling). A detailed description thereof is given below. Search is performed in the order A0 and A1. The coding control unit 108 sets flag availableLXA to 1 if search succeeds. In addition, the coding control unit 108 adds a motion vector of the block obtained in the search to the candidate list mvpListLX.

In step S420, the coding control unit 108 determines whether availableLXA is 0 (whether the search has failed).

If the search fails (true in S420), the coding control unit 108 searches the block group A (A0, A1) for a block having an available motion vector. The search is performed in the order A0 and A1. If the search has succeeded, the coding control unit 108 executes scaling processing on the motion vector of the block obtained in the search, and adds the motion vector on which scaling processing has been performed to the candidate list mvpListLx. Furthermore, the coding control unit 108 sets flag isScaled to 1. Flag isScaled is a flag indicating whether scaling processing has been performed on the block group A. Scaling processing is processing of increasing and decreasing the magnitude of a motion vector. It should be noted that Expressions 8-130 to 8-134 (see FIG. 23(A)) in NPL 2 can be utilized for scaling processing.

Next, the coding control unit 108 performs processing of generating the second candidate for mvpListLX (S500). In step S500, the coding control unit 108 executes processing for deriving a candidate from the block group B (B0, B1, B2). It should be noted that a candidate may not be able to be derived from the block group B if intra prediction is used for all the blocks B0, B1, and B2, for instance.

Specifically, in step S510, the coding control unit 108 searches the block group B for a block having a motion vector which is available without scaling. The search is performed in the order B0, B1, and B2. The coding control unit 108 sets flag availableFlagLXB to 1 if the search succeeds. The coding control unit 108 adds the motion vector of block obtained in the search to the candidate list mvpListLX.

In step S420, the coding control unit 108 determines whether availableLXA==0, availableLXB==0, and furthermore isScaled==0.

If the determination result of step S420 is "true", the coding control unit 108 searches the block group B (B0, B1, B2) for a block having an available motion vector. The search is performed in the order B0, B1, and B2. If the search succeeds, the coding control unit 108 executes scaling processing on the motion vector of the block obtained in the search, and adds the motion vector on which scaling processing has been performed to the candidate list mvpListLx. It should be noted that, for example, Expressions 8-135 to 8-139 (see FIG. 23(B)) in NPL 2 can be utilized for scaling processing.

It should be noted that it is determined in step S420 whether scaling processing has already been performed on the block group A (isScaled==0). This is for reducing the number of times scaling processing is performed. It is preferable to reduce the number of times scaling processing is performed because scaling processing requires great load. Here, the number of times scaling processing is performed is set to 1. If scaling processing is performed on the block group A, an available candidate has already been added to the candidate lists, and thus scaling processing is not to be performed on the block group B.

<Block Group A (A0, A1)>

First is a description of step S410 in FIG. 8 (step of searching the block group A for a block having a motion vector which is available without scaling processing), based on FIG. 9A. FIG. 9A is a flowchart showing the detailed procedure of step S410 in FIG. 8.

In FIG. 9A, A[k] (k=0, 1) is a value indicating a block included in the block group A. Specifically, A[0] indicates block A0, and A[1] indicates block A1. In FIG. 9A, processing from step S412 to step S415 is executed for the blocks A0 and A1 (steps S411 and S416).

In step S412, the coding control unit 108 determines whether a motion vector in the prediction direction 0 of a prediction block unit PU which includes A[k] is a motion vector which is available without scaling processing.

Specifically, the coding control unit 108 determines whether a prediction block unit PU which includes A[k] satisfies all the followings:

(i) the prediction block unit PU is "available",
(ii) the prediction mode thereof is not MODE_INTRA,
(iii) predFlagL0 thereof is 1, and
(iv) refIdx thereof is equal to refIdx of PU of a current block.

Here, "available" in (i) indicates that the prediction block unit PU corresponding to A[k] can be utilized. It should be noted that "not available" indicates that the prediction block unit PU corresponding to A[k] cannot be utilized. Here, the case where "not available" is indicated is the case where the prediction block unit PU does not have information such as a motion vector, examples of which include the case where the prediction block unit PU is a block located, for instance, outside the boundary of a picture or a slice, and the case where the prediction block unit PU is a block which has not been coded yet, and the like. "MODE_INTRA" in (ii) indicates intra prediction is used. In the case of intra prediction, the prediction block unit PU cannot be utilized as a candidate for a motion vector predictor. "predFlagL0" in (iii) is a flag indicating whether a motion vector predictor in the prediction direction 0 is to be used, and indicates that a motion vector predictor in the prediction direction 0 is to be used in the case of "1". The determination in (iv) is, in other words, a determination as to whether a reference picture of the prediction block unit PU corresponding to A[k] is the same as a reference picture of a current block to be coded (decoded). This is equivalent to the determination as to whether the block has a motion vector which is available without performing scaling.

If the determination result of step S412 is not true (in the case of "otherwise"), the determination in step S413 is made.

In step S413, the coding control unit 108 determines a motion vector in the prediction direction 1 of a prediction block unit PU which includes A[k] is a motion vector which is available without scaling processing. This means that a determination made for motion data of block A[k] in the prediction direction 0 (a motion vector and a reference index, which also applies in the following) is also made for motion data of A[k] in the prediction direction 1.

If the determination result of step S412 or the determination result of step S413 is true, or in other words if a motion vector which is available without scaling processing is obtained in the search, the coding control unit 108 sets availableFlagLXA to 1 in step S414, and in step A307, adds, to the candidate list mvpListLX, the value of mvLX of block A[k] as it is without performing scaling processing. After that, the processing of the coding control unit 108 proceeds to step S416.

If the determination result of step S413 is not true (if the determination results of steps S412 and S413 are both "otherwise") or in other words, if a motion vector which is available without scaling processing is not obtained in the search, the processing of the coding control unit 108 proceeds to step S416.

In step S416, if availableFlagLXA==1 or k==1, the coding control unit 108 ends processing of step S410.

Next is a description of a processing procedure of step S430 (step of performing scaling processing on a motion vector of the block group A) in FIG. 8, based on FIG. 9B. FIG. 9B is a flowchart showing a detailed processing procedure of step S430 in FIG. 8. In FIG. 9B, processing of steps S432 to S437 is executed on the blocks A0 and A1 (steps S431 and S438).

In step S432, the coding control unit 108 determines whether a motion vector in the prediction direction 0 of the prediction block unit PU which includes A[k] is a motion vector on which scaling processing can be performed.

More specifically, the coding control unit 108 makes determinations (i) to (iii) of the determinations (i) to (iv) of step S412. This processing is scaling processing, and thus the condition (iv) is not necessary. Therefore, the coding control unit 108 determines whether the prediction block unit PU which includes A[k] is "available" (i), the prediction mode thereof is not MODE_INTRA (ii), and prefFlagL0 thereof is 1 (iii).

If the determination result of step S432 is not true (in the case of "otherwise"), the determination of step S433 is made.

In step S433, the coding control unit 108 determines whether a motion vector in the prediction direction 1 of a prediction block unit PU which includes A[k] is a motion vector on which scaling processing can be performed. In step S433, the determination made on motion data in step S432 is also performed on motion data of A[k] in the prediction direction 1.

If the determination result of step S432 or the determination result of step S433 is true, or in other words, if a motion vector on which scaling processing can be performed is obtained in the search, the coding control unit 108 obtains information for deriving a scaling ratio (such as refIdx and List) (S434). Furthermore, the coding control unit 108 sets mvLXA to the value of a motion vector mvLX of A[k], and sets refIdxLX to the reference picture index of A[k].

In step S435, the coding control unit 108 derives a scaling ratio, and performs scaling processing. In step S436, the coding control unit 108 sets flag isScaled to 1 which indicates that scaling processing has been performed in the processing on the block group A. In step S437, the coding control unit 108 sets availableFlagLXA to 1. After that, the processing of the coding control unit 108 proceeds to step S438.

On the other hand, if the determination result of step S433 is not true (if the determination results of steps S432 and S433 are both otherwise), or in other words, if a motion vector on which scaling processing can be performed is not obtained in the search, the processing of the coding control unit 108 proceeds to step S438.

In step S438, if availableFlagLXA==1 or k==1, the coding control unit 108 ends processing of step S430.

<Block Group B (B0, B1, B2)>

Figure 10A:
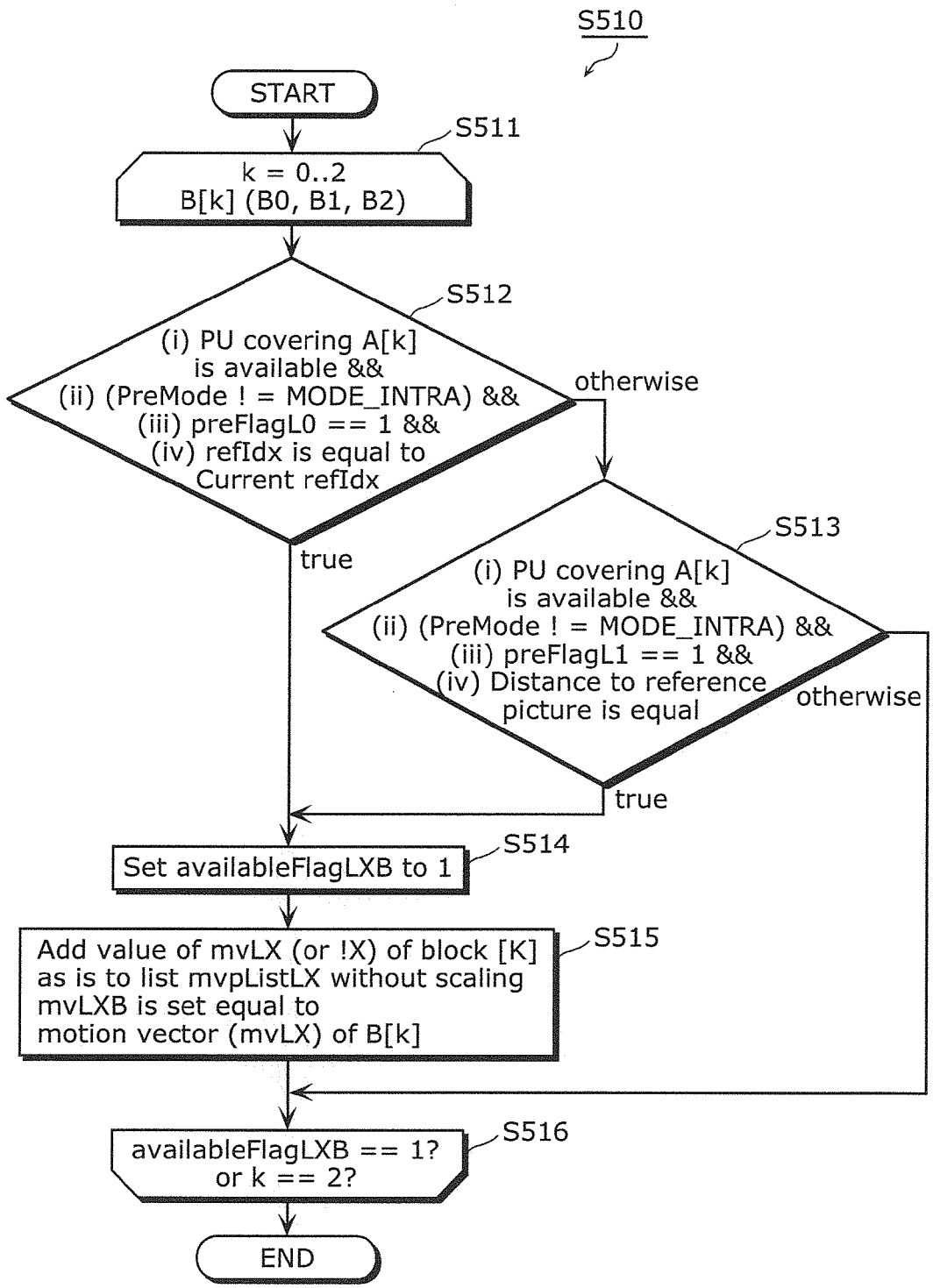
FIG. 10A is a flowchart illustrating a detailed procedure of step S510 in FIG. 8.

First is a description of step S510 in FIG. 8 (a step of searching the block group B for a block having a motion vector which is available without scaling processing), based on FIG. 10A. FIG. 10A is a flowchart showing a detailed procedure of step S510 in FIG. 8.

It should be noted that processing shown in FIG. 9A and processing shown in FIG. 10A are the same except the point that blocks to be processed are different. Blocks to be processed are A0 and A1 in FIG. 9A, whereas blocks to be processed are B0, B1, and B2 in FIG. 10A. Steps S512 to S515 in FIG. 10A correspond to steps S412 to S415 in FIG. 9A, respectively.

Next is a description of a processing procedure of step S530 in FIG. 8 (step of performing scaling processing on a motion vector of the block group B), based on FIG. 10B. FIG. 10B is a flowchart showing a detailed processing procedure of step S530 in FIG. 8.

It should be noted that processing shown in FIG. 9B and processing shown in FIG. 10B are the same except the point that blocks to be processed are different, and the point that the isScaled flag is not recorded in step S436. Blocks to be processed are A0 and A1 in FIG. 9B, whereas blocks to be processed are B0, B1, and B2 in FIG. 10B. Steps S532 to S536 in FIG. 10B correspond to steps S432 to S435 and S437 in FIG. 9B, respectively.

EX2-2

Determination of Coding Control Information

FIG. 11 is a flowchart showing a detailed processing procedure of step S240 in FIG. 3 which is a step of determining coding control information. In step S240 in FIG. 3, the coding control unit 108 calculates coding efficiency achieved by using each motion vector predictor candidate, determines a motion vector predictor candidate with which coding efficiency is high, as a motion vector to be used for inter prediction. Accordingly, a value of mvp_idx_l0 used for inter prediction and a value of mvp_idx_l1 are determined.

Specifically, in step S301, the coding control unit 108 sets mvp_idx_l0 to 0. Furthermore, the coding control unit 108 increments mvp_idx_l0 by 1 after executing steps S302 to S308 described below. The coding control unit 108 repeatedly executes steps S302 to S308.

In step S302, the coding control unit 108 determines whether availableFlagL0 [mvp_idx_l0] is 1.

If availableFlagL0 [mvp_idx_l0] is not 1 in step S302 (false in S302), the processing of the coding control unit 108 proceeds to step S309.

If availableFlagL0 [mvp_idx_l0] is 1 in step S302 (true in S302), the processing of the coding control unit 108 proceeds to step S303.

In step S303, the coding control unit 108 sets mvp_idx_l1 to 0. Furthermore, the coding control unit 108 increments mvp_idx_l1 by 1 after executing steps S304 and S305 described below. The coding control unit 108 repeatedly executes steps S304 and S305.

In step S304, the coding control unit 108 determines whether availableFlagL1 [mvp_idx_l1] is 1.

If availableFlagL1 [mvp_idx_l1] is not 1 in step S304 (false in S304), the processing of the coding control unit 108 proceeds to step S308.

If availableFlagL1 [mvp_idx_l1] is 1 in step S304 (true in S304), the processing of the coding control unit 108 proceeds to step S305.

In step S305, the coding control unit 108 performs, as a trial, inter coding using a set of motion vector predictor candidates (mvpListL0 [mvp_idx_l0], mvpListL1 [mvp_idx_l1]) indicated by a set of current motion vector predictor indexes (mvp_idx_l0, mvp_idx_l1) (hereinafter, referred to as "a set of current motion vector predictor candidates", as necessary).

In step S306, the coding control unit 108 compares coding efficiency achieved by using a set of motion vector predictor candidates indicated by the values of a set of motion vector predictor indexes temporarily set as mvp_idx_lx (mvpListL0 [mvp_idx_l0], mvpListL1 [mvp_idx_l1]) (hereinafter, referred to as "a set of motion vector predictor candidates temporarily set", as necessary) with coding efficiency achieved by using a set of current motion vector predictor candidates.

In step S306, if the coding efficiency achieved using the set of motion vector predictor candidates temporarily set is higher than the coding efficiency achieved using the set of current motion vector predictor candidates (N in S306), the processing of the coding control unit 108 proceeds to step S308.

In step S306, if the coding efficiency achieved using the set of current motion vector predictor candidates is higher than the coding efficiency achieved using the set of motion vector predictor candidates temporarily set (Y in S306), the processing of the coding control unit 108 proceeds to step S307, and the coding control unit 108 sets the set of motion vector predictor indexes mvp_idx_lx (mvp_idx_l0, mvp_idx_l1) to the values of the current set (mvp_idx_l0, mvp_idx_l1). It should be noted that if no value is set in the set mvp_idx_lx of motion vector predictor indexes (mvp_idx_l0, mvp_idx_l1), the coding control unit 108 sets mvp_idx_lx to the values of the current set (mvp_idx_l0, mvp_idx_l1).

In step S308, the coding control unit 108 determines whether mvpListL1 [mvp_idx_l1] is the last candidate of the candidate list (FIG. 11 shows "Processing for mvp_idx_l1 is completed?). For example, in the case of the candidate list mvpListL1 illustrated in FIG. 6B, the size of the candidate list is 2, and thus it is determined that mvpListL1 [mvp_idx_l1] is the last candidate if mvp_idx_l1==1 (=candidate list size−1). If it is determined that mvpListL1 [mvp_idx_l1] is not the last candidate of the candidate list, the processing of the coding control unit 108 returns to step S303, and the coding control unit 108 increments mvp_idx_l1 by 1 (S303).

If it is determined in step S308 that mvpListL1 [mvp_idx_l1] is the last candidate of the candidate list, the processing of the coding control unit 108 proceeds to step S309.

In step S309, the coding control unit 108 determines whether mvpListL0 [mvp_idx_l0] is the last candidate of the candidate list ("Processing for mvp_idx_l0 is completed?). For example, in the case of the candidate list mvpListL0 illustrated in FIG. 6A, the size of the candidate list is 2, and thus if mvp_idx_l0==1 (=candidate list size−1), the coding control unit 108 determines that mvpListL0 [mvp_idx_l0] is the last candidate. If the coding control unit 108 determines that mvpListL0 [mvp_idx_l0] is not the last candidate of the candidate list, the processing of the coding control unit 108 returns to step S301, and the coding control unit 108 increments mvp_idx_l0 by 1 (S301).

In step S309, if the coding control unit 108 determines that mvpListL0 [mvp_idx_l0] is the last candidate of the candidate list, the processing thereof proceeds to step S310.

In step S310, the coding control unit 108 determines mvp_idx_lx (mvp_idx_l0, mvp_idx_l1) as a set of motion vector predictor indexes.

The following is a brief description of the case of FIGS. 6A and 6B.

The coding control unit 108 sets mvp_idx_l0 to 0 when step S301 is executed in the first loop. In step S302, as illustrated in FIG. 6A, the coding control unit 108 determines that availableFlagLXA is 1, and the processing thereof proceeds to step S303.

The coding control unit 108 sets mvp_idx_l1 to 0 when step S303 is executed in the first loop. In step S304, the processing of the coding control unit 108 proceeds to step S305 since availableFlagLXB is 1 as illustrated in FIG. 6B.

In step S305, the coding control unit 108 performs, as a trial, inter coding using a current set (mvpListL0 [0], mvpListL0 [0]). In step S306, the coding control unit 108 has not executed inter coding as a trail before, and thus the processing thereof proceeds to step S307, and the coding control unit 108 sets mvp_idx_lx to (0, 0).

In step S308, the processing of the coding control unit 108 proceeds to step S309 since there is only one mvp_idx_l1 as illustrated in FIG. 6B, and thus processing is completed. In step S309 in the first loop, the coding control unit 108 determines that processing is not completed since mvp_idx_l0 takes two values, namely, 0 and 1 as illustrated in FIG. 6A. The processing of the coding control unit 108 returns to step S301, and the coding control unit 108 sets mvp_idx_l0 to 1 and starts the second loop.

When step S301 is executed in the second loop, the coding control unit 108 sets mvp_idx_l0 to 1. In step S302, as illustrated in FIG. 6A, the coding control unit 108 determines that availableFlagLXB is 1, and the processing thereof proceeds to step S303.

When step S303 which is the first step in the second loop is executed, the coding control unit 108 sets mvp_idx_l1 to 0. In step S304, the processing of the coding control unit 108 proceeds to step S305 since availableFlagLXB is 1 as illustrated in FIG. 6B.

In step S305, the coding control unit 108 performs inter coding as a trial, using a current set (mvpListL0 [1], mvpListL0 [0]). In step S306, the coding control unit 108 compares coding efficiency achieved using (mvpListL0 [0], mvpListL0 [0]) which have been used to perform inter coding as a trial before with coding efficiency achieved using the current set (mvpListL0 [1], mvpListL0 [0]). Here, if coding efficiency achieved using (mvpListL0 [0], mvpListL0 [0]) used before is higher, the processing of the coding control unit 108 proceeds to step S308.

In step S308, the processing of the coding control unit 108 proceeds to step S309 since there is only one mvp_idx_l1 as illustrated in FIG. 6B, and thus processing is completed. In step S309 in the second loop, mvp_idx_l0 takes two values, namely, 0 and 1 as illustrated in FIG. 6A, and processing has been executed for each, the coding control unit 108 determines that processing is completed, and the processing thereof proceeds step S310.

In step S310, the coding control unit 108 determines (0, 0) to which mvp_idx_lx is set, as a set of values of mvp_idx_lx.

EX2-3

Intra Inter Coding

Figure 12:
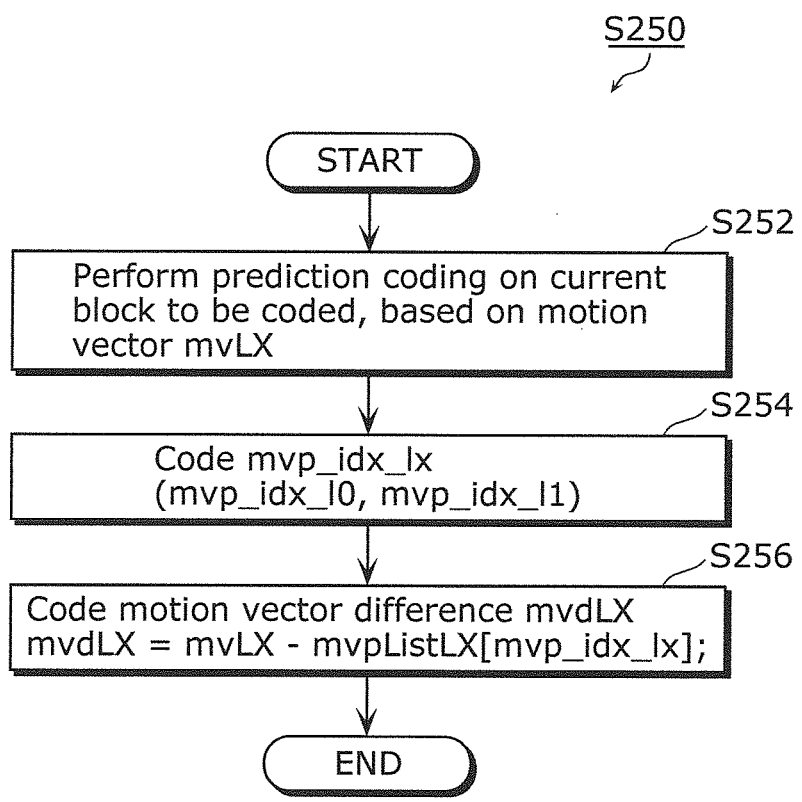
FIG. 12 is a flowchart illustrating a detailed procedure of step S250 in FIG. 3.

FIG. 12 is a flowchart illustrating a detailed processing procedure of step S250 in FIG. 3. In step S250 in FIG. 3, intra/inter coding is executed on a moving picture indicated by an input image signal, using coding control information, decoding control information, and the like obtained by the coding control unit 108.

Specifically, in step S252, the intra/inter prediction unit 107 generates a predicted image of a current block to be coded, based on motion vector mvLX, and outputs a predicted image signal indicating the generated predicted image. The difference unit 101 subtracts the predicted image signal from an input image signal to generate a residual signal. The transform unit 102 converts the residual signal from an image domain into a frequency domain, and the quantization unit 103 quantizes the residual signal converted into the frequency domain to generate a quantized residual signal. The entropy coding unit 110 codes the quantized residual signal.

In step S254, the entropy coding unit 110 codes a set of motion vector predictor indexes mvp_idx_lx (mvp_idx_l0, mvp_idx_l1). The entropy coding unit 110 codes mvp_idx_lx (0, 0) in the case of FIGS. 6A and 6B described in EX2-2, for example.

In step S256, the entropy coding unit 110 codes a motion vector difference mvdLX.

The entropy coding unit 110 generates and outputs a coded bitstream which includes the quantized residual signal, the set mvp_idx_lx of motion vector predictor indexes (mvp_idx_l0, mvp_idx_l1), and the motion vector difference mvdLX which have been coded.

Figure 13:
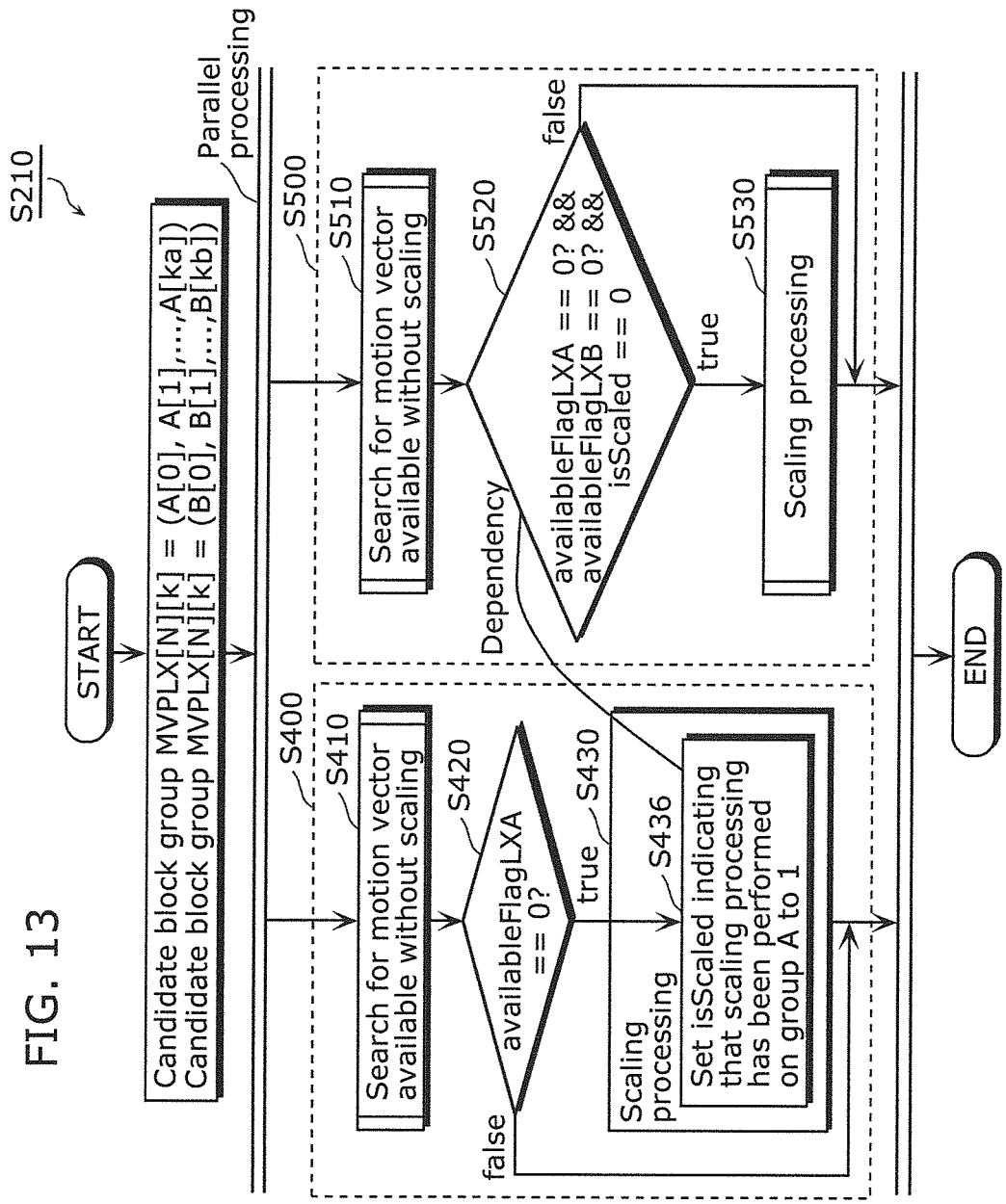
FIG. 13 illustrates a problem of mvpListLX generation processing.

FIG. 13 illustrates a problem of mvpListLX generation processing (see FIGS. 8 to 10B, and EX 2-1) in Comparative Example.

In FIG. 13, the horizontal double line is a symbol representing parallel processing, and processing between the horizontal double lines is parallel processing.

In Comparative Example above, as illustrated in FIG. 13, it is possible to shorten a processing time period by performing processing of obtaining a motion vector predictor candidate from the block group A (step S400 in FIG. 8) and processing of obtaining a motion vector predictor candidate from the block group B (step S500 in FIG. 8) in parallel.

Here, in Comparative Example above, as illustrated in FIG. 13, whether scaling processing has been executed on the block group A in S436 in step S430 is one determination condition in step S520.

This is to prevent scaling processing from being executed on the block group B if scaling processing is already executed on the block group A, in order that scaling processing which requires great processing load is to be performed once, as mentioned above.

Accordingly, in Comparative Example above, step S500 which is processing on the block group B has a problem that it is necessary to wait for the completion of step S400 which is processing on the block group A (in particular, S436), in order to execute processing of step S520.

In view of this, an image decoding method according to one aspect of the present disclosure is a moving picture decoding method for decoding a current block included in a bitstream, using a motion vector predictor used when decoding a motion vector of the current block, the method including: (a) obtaining one or more motion vector predictor candidates which are candidates for the motion vector predictor; (b) decoding a coded index for identifying one of the one or more motion vector predictor candidates, the coded index being added to the bitstream; and (c) selecting, based on the decoded index, the motion vector predictor to be used for decoding the current block from among the one or more motion vector predictor candidates, wherein step (a) includes: (a1) generating a motion vector predictor candidate, based on plural motion vectors of plural first adjacent blocks adjacent to the current block in a first direction; and (a2) generating a motion vector predictor candidate, based on plural motion vectors of plural second adjacent blocks adjacent to the current block in a second direction, and step (a2) includes: (i) determining whether the plural first adjacent blocks include one or more inter-predicted blocks; and (ii) searching for a motion vector to be made available by scaling processing from among the plural motion vectors of the plural second adjacent blocks when it is determined in step (i) that the plural first adjacent blocks do not include an inter-predicted block, and generating, when the motion vector is obtained in the search, one of the one or more motion vector predictor candidates by executing scaling processing on the motion vector obtained in the search.

In addition, for example, in step (a2), when it is determined in step (i) that the plural first adjacent blocks include one or more inter-predicted blocks, it may be determined whether all the one or more of the plural first adjacent blocks determined to be inter-predicted blocks are blocks each located at a picture boundary or a slice boundary, and step (ii) may be executed when all the one or more of the plural first adjacent blocks determined to be inter-predicted blocks are blocks each located at the picture boundary or the slice boundary.

In addition, for example, step (a2) may further include (iii) searching for a motion vector available without scaling processing from among the plural motion vectors of the plural second adjacent blocks, and determining, when a motion vector available without scaling processing is obtained in the search, the motion vector obtained in the search as one of the one or more motion vector predictor candidates, and step (i) may be executed when a motion vector available without scaling processing is not obtained in the search.

In addition, for example, in step (iii), it may be determined whether a reference picture of the current block is the same as a reference picture of each of the plural second adjacent blocks, and among the plural second adjacent blocks, a second adjacent block determined to have the same reference picture may be obtained in the search as a motion vector available without scaling processing.

In addition, for example, step (a1) may include: (i) searching for a motion vector available without scaling processing from among the plural motion vectors of the plural first adjacent blocks, and determining, when a motion vector available without scaling processing is obtained in the search, the motion vector obtained in the search as one of the one or more motion vector predictor candidates; (ii) determining whether a motion vector available without scaling processing is obtained in the search from the plural first adjacent blocks; and (iii) searching, when it is determined that a motion vector available without scaling processing is not obtained in the search from the plural first adjacent blocks, for a motion vector to be made available by scaling processing from among the plural motion vectors of the plural first adjacent blocks, and generating, when the motion vector is obtained in the search, one of the one or more motion vector predictor candidates by executing scaling processing on the motion vector obtained in the search.

In addition, for example, step (a1) and step (a2) may be executed in parallel.

An image coding method according to one aspect of the present disclosure is a moving picture coding method for coding a current block to generate a bitstream, using a motion vector predictor used when coding a motion vector of the current block, the method including: (a) obtaining one or more motion vector predictor candidates which are candidates for the motion vector predictor; (b) selecting the motion vector predictor to be used for coding the motion vector of the current block from among the one or more motion vector predictor candidates; and (c) coding an index for identifying the selected motion vector predictor, and adding the coded index to the bitstream, wherein step (a) includes: (a1) generating a motion vector predictor candidate, based on plural motion vectors of plural first adjacent blocks adjacent to the current block in a first direction; and (a2) generating a motion vector predictor candidate, based on plural motion vectors of plural second adjacent blocks adjacent to the current block in a second direction, and step (a2) includes: (i) determining whether the plural first adjacent blocks include one or more inter-predicted blocks; and (ii) searching for a motion vector to be made available by scaling processing from among the plural motion vectors of the plural second adjacent blocks when it is determined in step (i) that the plural first adjacent blocks do not include an inter-predicted block, and generating, when the motion vector is obtained in the search, one of the one or more motion vector predictor candidates by executing scaling processing on the motion vector obtained in the search.

In addition, for example, in step (a2), when it is determined in step (i) that the plural first adjacent blocks include one or more inter-predicted blocks, it may be determined whether all the one or more of the plural first adjacent blocks determined to be inter-predicted blocks are blocks each located at a picture boundary or a slice boundary, and step (ii) may be executed when all the one or more of the plural first adjacent blocks determined to be inter-predicted blocks are blocks each located at the picture boundary or the slice boundary.

In addition, for example, step (a2) may further include (iii) searching for a motion vector available without scaling processing from among the plural motion vectors of the plural second adjacent blocks, and determining, when a motion vector available without scaling processing is obtained in the search, the motion vector obtained in the search as one of the one or more motion vector predictor candidates, and step (i) may be executed when a motion vector available without scaling processing is not obtained in the search.

In addition, for example, in step (iii), it may be determined whether a reference picture of the current block is the same as a reference picture of each of the plural second adjacent blocks, and among the plural second adjacent blocks, a second adjacent block determined to have the same reference picture may be obtained in the search as a motion vector available without scaling processing.

In addition, for example, step (a1) may include: (i) searching for a motion vector available without scaling processing from among the plural motion vectors of the plural first adjacent blocks, and determining, when a motion vector available without scaling processing is obtained in the search, the motion vector obtained in the search as one of the one or more motion vector predictor candidates; (ii) determining whether a motion vector available without scaling processing is obtained in the search from the plural first adjacent blocks; and (iii) searching, when it is determined that a motion vector available without scaling processing is not obtained in the search from the plural first adjacent blocks, for a motion vector to be made available by scaling processing from among the plural motion vectors of the plural first adjacent blocks, and generating, when the motion vector is obtained in the search, one of the one or more motion vector predictor candidates by executing scaling processing on the motion vector obtained in the search.

In addition, for example, step (a1) and step (a2) may be executed in parallel.

An image decoding apparatus according to one aspect of the present disclosure is a moving picture decoding apparatus which decodes a current block included in a bitstream, using a motion vector predictor used when decoding a motion vector of the current block, the apparatus including: a motion vector predictor candidate obtaining unit configured to obtain one or more motion vector predictor candidates which are candidates for the motion vector predictor; a decoding unit configured to decode a coded index for identifying one of the one or more motion vector predictor candidates, the coded index being added to the bitstream; and a selection unit configured to select, based on the decoded index, the motion vector predictor to be used for decoding the current block from among the one or more motion vector predictor candidates, wherein the motion vector predictor candidate obtaining unit is configured to execute: first candidate generation processing of generating a motion vector predictor candidate, based on plural motion vectors of plural first adjacent blocks adjacent to the current block in a first direction; and second candidate generation processing of generating a motion vector predictor candidate, based on plural motion vectors of plural second adjacent blocks adjacent to the current block in a second direction, and in the second candidate generation processing, the motion vector predictor candidate obtaining unit is configured to: determine whether the plural first adjacent blocks include one or more inter-predicted blocks; and search for a motion vector to be made available by scaling processing from among the plural motion vectors of the plural second adjacent blocks when the motion vector predictor candidate obtaining unit determines that the plural first adjacent blocks do not include an inter-predicted block, and generate, when the motion vector predictor candidate obtaining unit obtains the motion vector in the search, one of the one or more motion vector predictor candidates by executing scaling processing on the motion vector obtained in the search.

An image coding apparatus according to one aspect of the present disclosure is a moving picture coding apparatus which codes a current block to generate a bitstream, using a motion vector predictor used when coding a motion vector of the current block, the apparatus including: a motion vector predictor candidate obtaining unit configured to obtain one or more motion vector predictor candidates which are candidates for the motion vector predictor; a selection unit configured to select the motion vector predictor to be used for coding the motion vector of the current block from among the one or more motion vector predictor candidates; and a coding unit configured to code an index for identifying the selected motion vector predictor, and add the coded index to the bitstream, wherein the motion vector predictor candidate obtaining unit is configured to execute: first candidate generation processing of generating a motion vector predictor candidate, based on plural motion vectors of plural first adjacent blocks adjacent to the current block in a first direction; and second candidate generation processing of generating a motion vector predictor candidate, based on plural motion vectors of plural second adjacent blocks adjacent to the current block in a second direction, and in the second candidate generation processing, the motion vector predictor candidate obtaining unit is configured to: determine whether the plural first adjacent blocks include one or more inter-predicted blocks; and search for a motion vector to be made available by scaling processing from among the plural motion vectors of the plural second adjacent blocks when the motion vector predictor candidate obtaining unit determines that the plural first adjacent blocks do not include an inter-predicted block, and generate, when the motion vector predictor candidate obtaining unit obtains the motion vector in the search, one of the one or more motion vector predictor candidates by executing scaling processing on the motion vector obtained in the search.

An image coding and decoding apparatus according to one aspect of the present disclosure includes the above moving picture decoding apparatus and the above moving picture coding apparatus.

It should be noted that these general and specific aspects may be implemented using a system, a method, an integrated circuit, a computer program, a computer-readable recording medium such as a CD-ROM, or any combination of systems, methods, integrated circuits, computer programs or recording media.

The following is a specific description of a moving picture coding apparatus and a moving picture decoding apparatus according to an aspect of the present disclosure, with reference to the drawings.

Each of the exemplary embodiments described below shows a specific example of the present disclosure. Numerical values, shapes, material, constituent elements, the arranged positions and connection configuration of the constituent elements, steps, the order of the steps, and so on described in the following embodiments are mere examples. Therefore, among the constituent elements in the following exemplary embodiments, constituent elements not recited in any one of the independent claims are described as arbitrary constituent elements.

Embodiment 1

Figure 14:
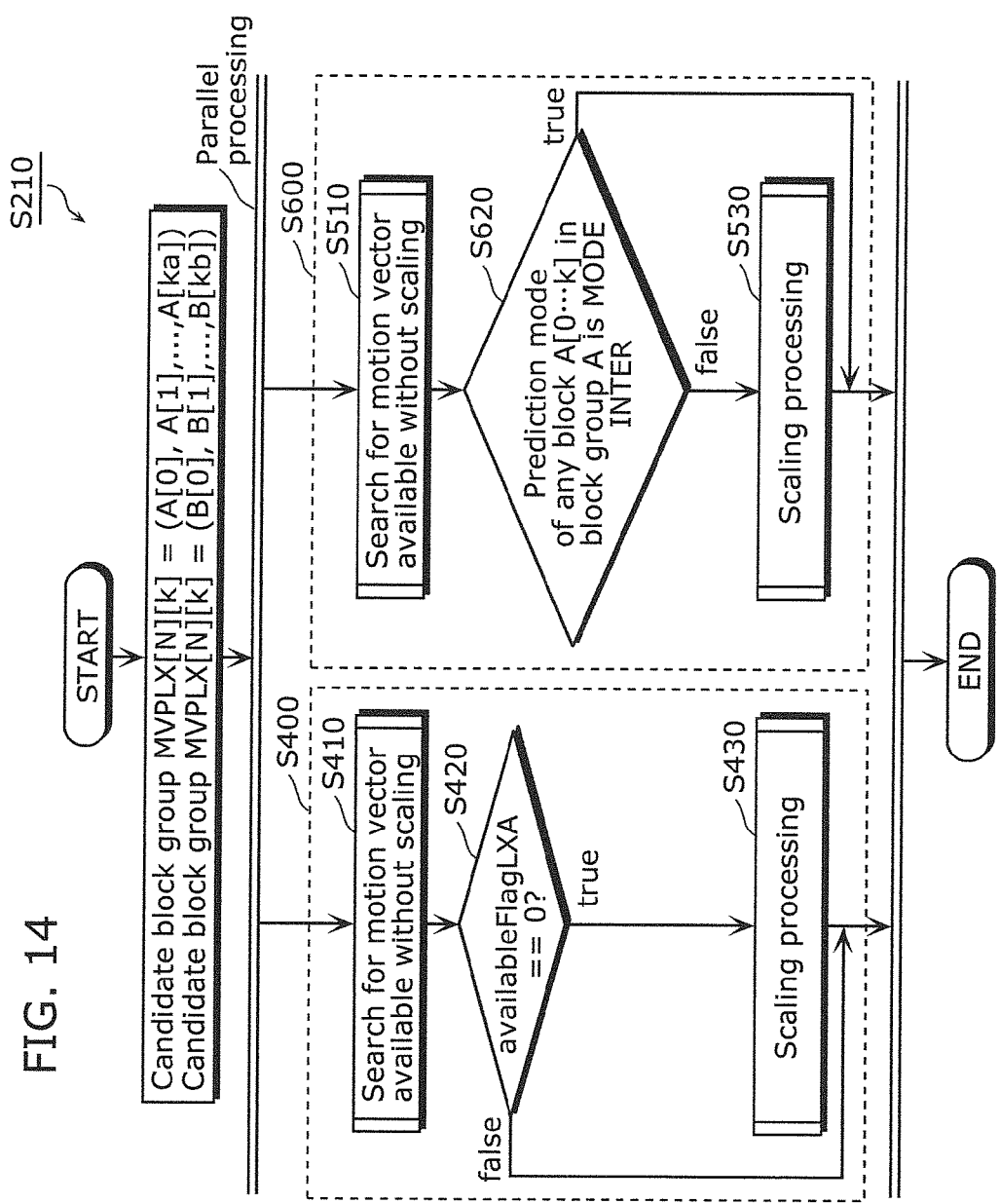
FIG. 14 illustrates a method for generating mvpListLX used by a moving picture coding apparatus according to Embodiment 1.

A description is given of a moving picture coding apparatus and a moving picture coding method according to the present embodiment, based on FIG. 14.

It should be noted that the configuration of the moving picture coding apparatus according to the present embodiment is the same as the configuration of the moving picture coding apparatus 100 according to Comparative Example illustrated in FIG. 2.

In addition, the present embodiment describes the case using an example in which the relationship between a coding block unit CU and a prediction block unit PU is the same as the relationship between the coding block unit CU and the prediction block unit PU in Comparative Example illustrated in FIG. 4A, to facilitate description.

[1-1: Moving Picture Coding Method According to Embodiment 1]

A description is given of processing operation (moving picture coding method) of the moving picture coding apparatus 100 according to the present embodiment, based on FIG. 14. FIG. 6 illustrates a processing procedure of the moving picture coding apparatus 100 according to the present embodiment.

It should be noted that in FIG. 14, processing of steps S410 and S430 on a block group A, and steps S510 and S530 on a block group B are the same as processing in Comparative Example above (see FIGS. 8 to 10B).

It should be noted that in the present embodiment, a predicted image is generated per prediction block unit PU, as with Comparative Example. In addition, the present embodiment describes the case as an example in which the size of prediction block unit PU is smaller than that of the coding block unit CU as with Comparative Example. In addition, the relationship between the coding block unit CU and the prediction block unit PU in the present embodiment is the same as the relationship between the coding block unit CU and the prediction block unit PU in Comparative Example illustrated in FIGS. 4A to 4C.

In the moving picture coding method according to the present embodiment illustrated in FIG. 14, determination processing of step S620 is executed, instead of determination processing of step S520, in contrast to Comparative Example illustrated in FIG. 13.

Specifically, as illustrated in FIG. 14, in step S400, a coding control unit 108 executes processing of searching the block group A for a motion vector which is available without scaling processing (S410), and executes scaling processing (S430) on a block included in the block group A if a motion vector which is available without scaling processing is not obtained in the search (true in S420).

Furthermore, the coding control unit 108 executes step S600 in parallel with step S400 described above, as illustrated in FIG. 14. In step S600, first, the coding control unit 108 executes processing of searching the block group B for a motion vector which is available without scaling processing (S510).

In step S620, the coding control unit 108 determines (1) whether availableFlavLXB==0 (not shown in FIG. 14), and (2) whether "any block in the block group A (A0, A1) is an INTER block". In other words, in step S620, when (1) availableFlavLXB==0, and furthermore a block whose prediction mode is MODE_INTER is included in the block group A, the result is determined to be true.

If (1) availableFlavLXB==0, and furthermore the prediction mode of A0 (block on the bottom left of FIG. 5) or A1 (block on the left of FIG. 5) is MODE_INTER as a result of the determination (true in S620), the coding control unit 108 ends step S600 without executing processing of S530 (scaling processing on the block group B).

This is based on an assumption that "if the prediction mode of any block in the block group A adjacent on the left of a current block to be predicted is MODE_INTER, a possibility that scaling processing is used is high", and thus scaling processing is not to be performed on the block group B if the prediction mode of any block in the block group A is MODE_INTER.

In this way, the processing result of step S400 is not used in step S620. In other words, steps S400 and S600 do not depend on each other. Accordingly, the moving picture coding apparatus 100 can execute in parallel step S400 which is processing on the block group A and step S600 which is processing on the block group B, and increase the processing speed without increasing processing load (without increasing the number of times scaling processing is performed).

Embodiment 2

Figure 15:
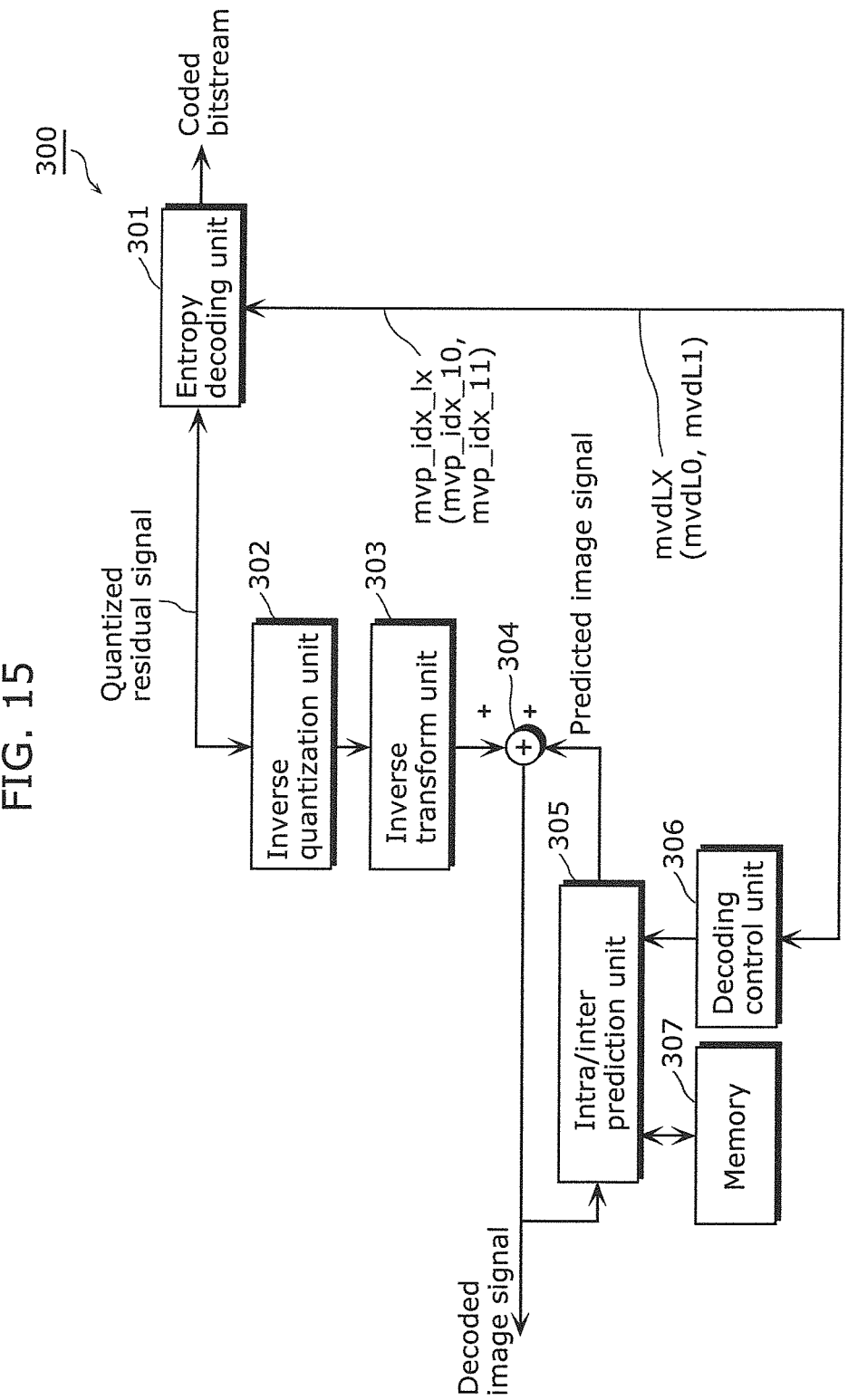
FIG. 15 is a block diagram illustrating a configuration of a moving picture decoding apparatus according to Embodiment 2.

A description is given of a moving picture decoding apparatus and a moving picture decoding method according to the present embodiment, based on FIG. 15. The moving picture decoding apparatus according to the present embodiment accepts a coded bitstream from the moving picture coding apparatus 100 according to Embodiment 1, generates decoded image signals by decoding a coded bitstream, and outputs the signals in the display order.

[2-1: Configuration of Moving Picture Decoding Apparatus According to Embodiment 2]

A description is given of a configuration of a moving picture decoding apparatus 300 according to the present embodiment, based on FIG. 15. FIG. 15 is a block diagram illustrating the configuration of the moving picture decoding apparatus 300.

As illustrated in FIG. 15, the moving picture decoding apparatus 300 includes an entropy decoding unit 301, an inverse quantization unit 302, an inverse transform unit 303, an addition unit 304, an intra/inter prediction unit 305, a decoding control unit 306, and a memory 307.

The entropy decoding unit 301 performs variable-length decoding processing on an inputted coded bitstream, and thereby generates a quantized residual signal (quantization coefficient), picture type information, a prediction direction flag, and a motion vector difference mvdLX. The entropy decoding unit 301 performs variable-length decoding processing on a motion vector predictor index. Furthermore, the entropy decoding unit 301 outputs decoding control information to the decoding control unit 306 described below. Here, decoding control information includes a motion vector predictor index mvp_idx_lx (mvp_idx_l0, mvp_idx_l1) and a motion vector difference mvdLX (mvdL0, mvdL1).

The inverse quantization unit 302 performs inverse quantization processing on a quantization coefficient (quantized residual signal) obtained by variable-length decoding processing. The inverse transform unit 303 outputs a reconstructed residual signal (prediction error data) by converting a transform coefficient obtained by inverse quantization processing from a frequency domain into an image domain.

In the memory 307, decoded image data indicated by decoded image signals outputted from the addition unit 304 described below is stored on a block-by-block basis and a frame-by-frame basis.

The intra/inter prediction unit 305 performs inter-prediction using decoded image data in a frame unit stored in the memory 307 or using decoded image data in a block unit, thereby generating a predicted image signal of a current block to be decoded.

The decoding control unit 306 derives motion vector predictor candidate lists mvpListL0 and mvpListL1, and selects, from the derived motion vector predictor candidate lists, a motion vector predictor mvLX to be used for inter prediction, based on the motion vector predictor index (mvp_idx_l0, mvp_idx_l1). Furthermore, the decoding control unit 306 calculates the motion vector mvLX of a current block to be decoded, using the motion vector predictor mvpLX and the motion vector difference mvdLX (mvdL0, mvdL1). Then, if the prediction mode of a current block to be predicted is MODE_INTER, the decoding control unit 306 causes the intra/inter prediction unit 305 to generate an inter-predicted image using the calculated motion vector mvLX.

Finally, the addition unit 304 generates a decoded image signal by adding a reconstructed residual signal and a predicted image signal.

[2-2: Moving Picture Decoding Method According to in Embodiment 2]

Figure 16:
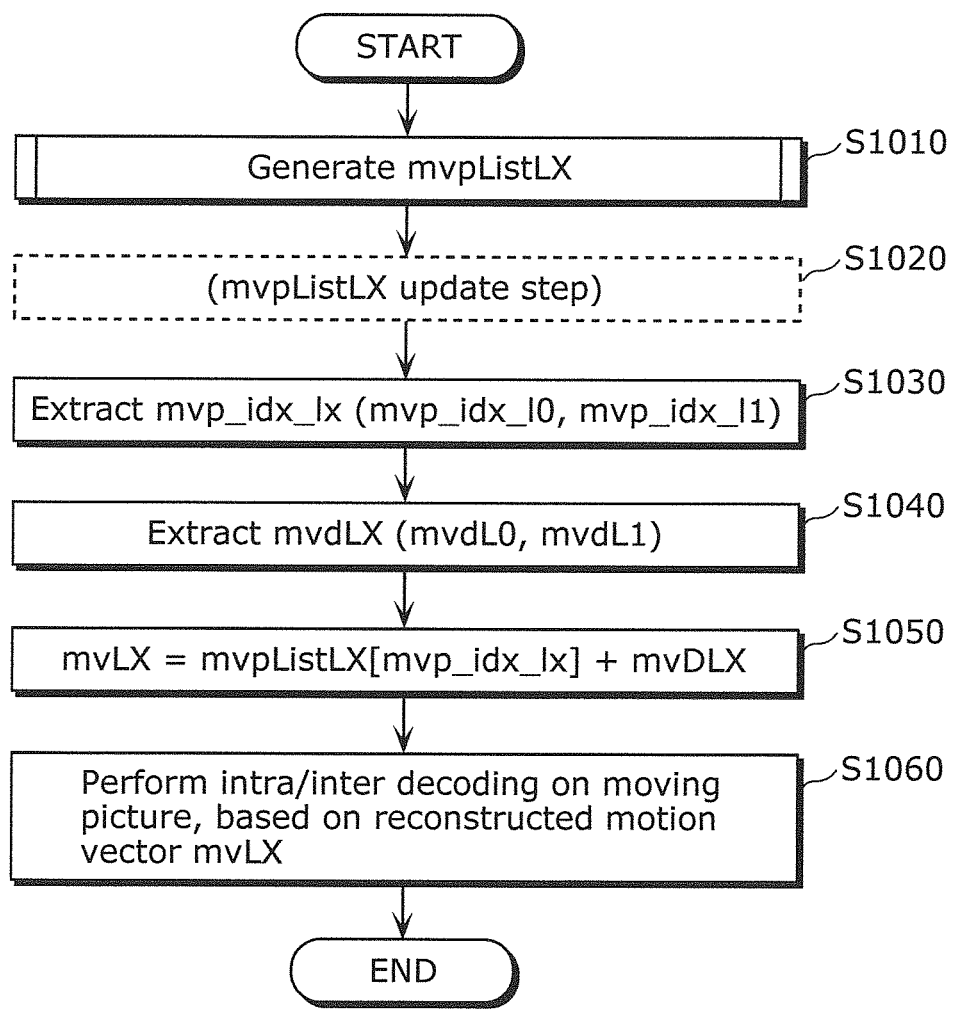
FIG. 16 is a flowchart illustrating a moving picture decoding method according to Embodiment 2.

A description is given of the processing operation (moving picture decoding method) of the moving picture decoding apparatus 300 according to the present embodiment, based on FIG. 16. FIG. 16 is a flowchart showing a processing procedure of the moving picture decoding method according to the present embodiment.

It should be noted that in the present embodiment, a predicted image is generated per prediction block PU, as with Embodiment 1. The present embodiment describes the case as an example in which the size of a prediction block unit PU is smaller than that of a coding block unit CU, as with Embodiment 1. In addition, the relationship between a coding block unit CU and a prediction block unit PU in the present embodiment is the same as that in Comparative Example illustrated in FIG. 4A.

The following is a description of the case where a current block to be decoded is CU12, as an example. As illustrated in FIGS. 4B and 4C, the prediction mode of the current block CU12 is MODE_INTER, and the current block CU12 includes two prediction block units PU, namely, PU0 and PU1 (N×2N). It should be noted that as described in Comparative Example, in FIG. 4B, the area enclosed by the one-point dashed line is an area having information which is already "available" at the point in time when coding the prediction block unit PU0 of the current block CU12. As illustrated in FIG. 4B, in Comparative Example, coding block units CU2 and CU3 are not "available" when coding the current block CU12.

Referring to FIG. 16, in step S1010, the decoding control unit 306 performs processing of generating a candidate list mvpListX of motion vector predictors. This processing corresponds to the mvpListX generation processing of step S210 illustrated in FIG. 3 performed by the moving picture coding apparatus 100 according to Embodiment 1 (Comparative Example 1). More specifically, the decoding control unit 306 performs the same processing as the processing illustrated in FIG. 14 executed by the moving picture coding apparatus 100, which will be described in detailed below.

In step S1020, the decoding control unit 306 performs update processing on mvpListLX (update step). This processing corresponds to the update processing of step S230 illustrated in FIG. 3 performed by the moving picture coding apparatus 100 according to Embodiment 1 (Comparative Example 1).

In step S1030, the entropy decoding unit 301 extracts a motion vector predictor index mvp_idx_lx from a coded bitstream.

In step S1040, the entropy decoding unit 301 extracts a motion vector difference mvdLX from the coded bitstream.

In step S1050, the decoding control unit 306 reconstructs a motion vector in the prediction direction X. Specifically, the decoding control unit 306 identifies a motion vector predictor mvpListX [mvp_idx_lx] from the candidate list mvpListX of motion vector predictors generated in step S1020, using the motion vector predictor index mvp_idx_lx extracted by the entropy decoding unit 301. As indicated by Expression 1, the decoding control unit 306 adds the motion vector difference mvdLX and the motion vector predictor mvpListX [mvp_idx_lx], thereby obtaining the motion vector mvLX.

$$mvLX = mvpListLX[mvp\_idx\_lx] + mvdLX \quad \text{(Expression 1)}$$

In step S1060, the moving picture decoding apparatus 300 generates a predicted image signal using the motion vector mvLX reconstructed by the intra/inter prediction unit 305, and generates a decoded image signal by the addition unit 304 adding a reconstructed residual signal and a predicted image signal.

Figure 17:
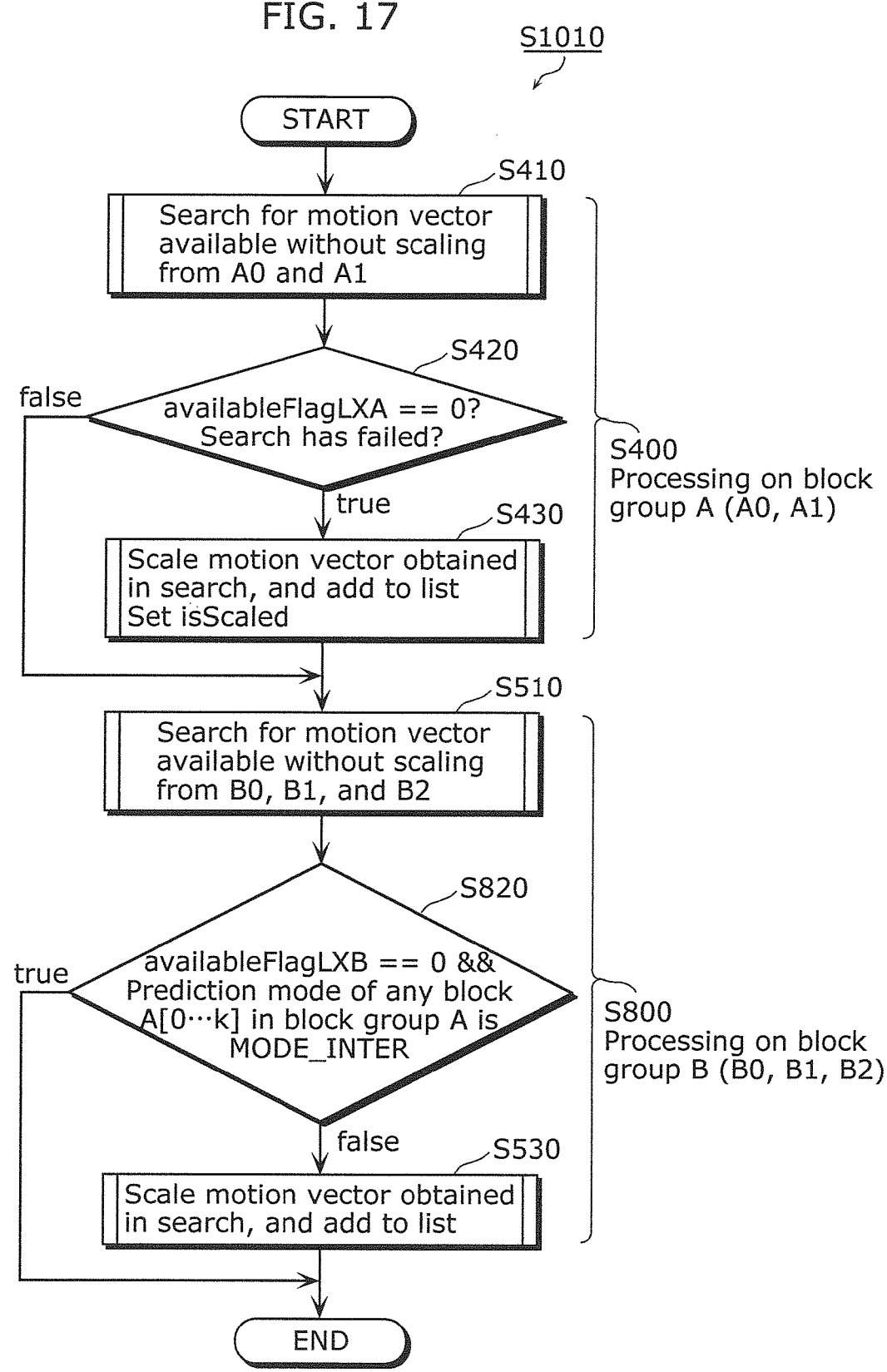
FIG. 17 is a flowchart illustrating a procedure of creating a candidate list mvpListLX in Embodiment 2.

FIG. 17 is a flowchart illustrating a detailed processing procedure of the mvpListLX creation step which is step S1010 in FIG. 16.

In step S400, the decoding control unit 306 creates an entry from a block group A (A0, A1). Specifically, in step S401, the decoding control unit 306 searches the block group A (A0, A1) for a motion vector which is available without scaling processing. If a motion vector which is available without scaling processing is not obtained in the search (true in S420), the decoding control unit 306 searches for an available motion vector, and performs scaling processing on the motion vector obtained in the search (S430). It should be noted that processing of step S400 is the same processing as step S400 performed by the coding control unit 108 of the moving picture coding apparatus 100.

In step S800, the decoding control unit 306 creates an entry from the block group B (B0, B1, B2).

Specifically, in step S510, the decoding control unit 306 searches the block group B (B0, B1, B2) for a motion vector which is available without scaling processing. Processing of step S510 is the same processing as step S510 performed by the coding control unit 108 of the moving picture coding apparatus 100.

In step S820, the decoding control unit 306 determines whether availableFlavLXB==0, and furthermore the prediction mode of any block in the block group A is MODE_INTER. More specifically, if the decoding control unit 306 executes steps S400 and S800 in parallel (sequentially), the decoding control unit 306 determines in step S510 whether availableFlag is not set (availableFlagLXB is still set to 0) and furthermore whether "the prediction mode of any of blocks A0, A1, and so on in the block group A is MODE_INTER" returns true, which is a determination condition used instead of the is Scaled determination.

If availableFlavLXB==0, and furthermore the prediction mode of any one block in the block group A is MODE_INTER (true in S820), the decoding control unit 306 ends the mvpListLX creation step without performing scaling processing.

If availableFlavLXB==0, and furthermore the prediction mode of none of the blocks in the block group A is MODE_INTER (false in S820), the decoding control unit 306 searches for an available motion vector, and performs scaling processing on the motion vector obtained in the search (S530). The processing of step S530 is the same as processing of step S530 performed by the coding control unit 108 of the moving picture coding apparatus 100.

Figure 18:
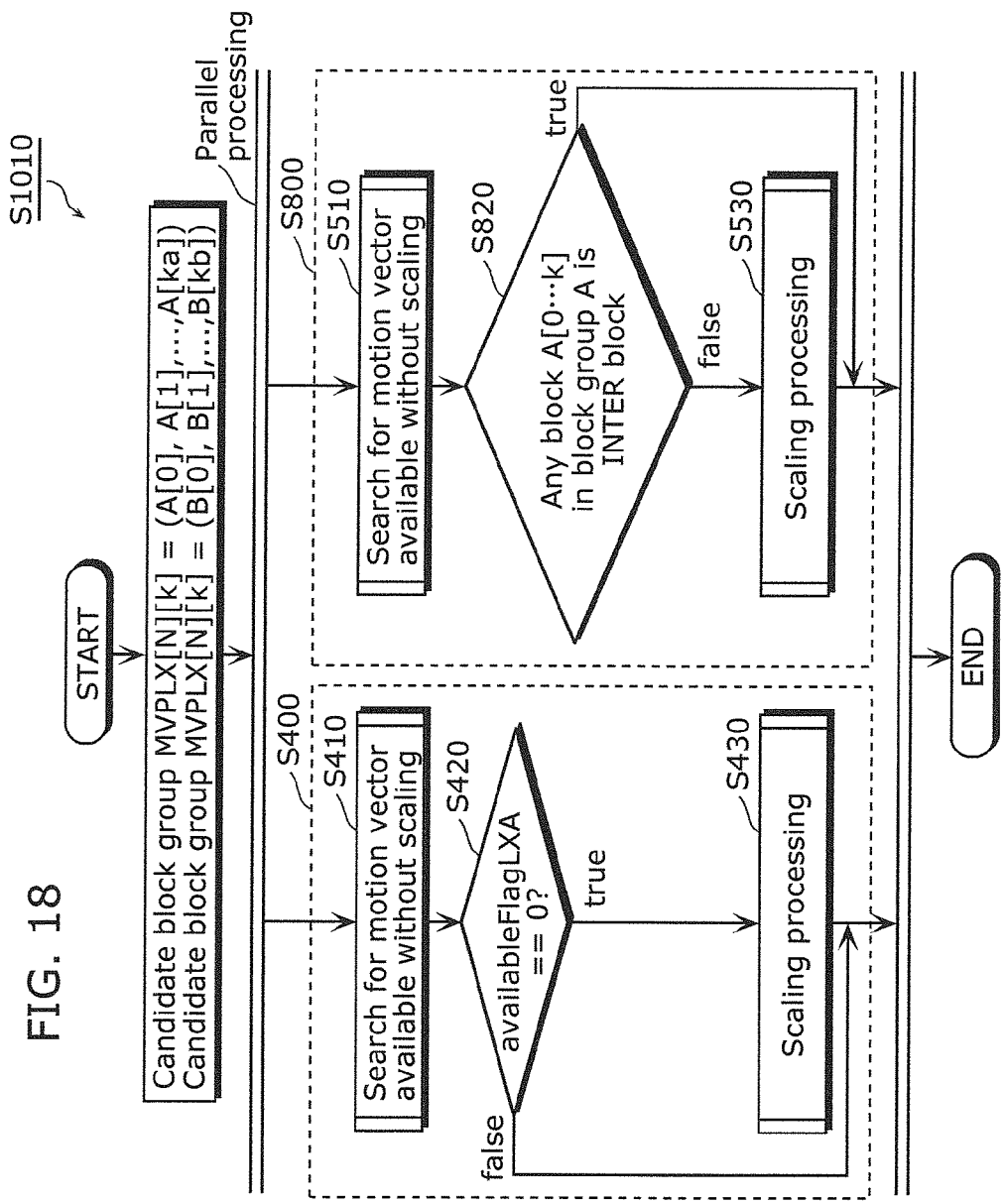
FIG. 18 sequentially illustrates a procedure of creating the candidate list mvpListLX in Embodiment 2.

FIG. 18 sequentially illustrates the mvpListLX creation step which is step S1010. It should be noted that the steps in FIG. 18 (S410, S420, S430, S510, S820, S530) are the same as the steps in FIG. 17 (S410, S420, S430, S510, S820, S530).

As is clear from FIG. 18, in the moving picture decoding apparatus 300 according to the present embodiment, what is determined in step S820 performed in the processing on the block group B does not depend on the result of processing of step S1010 on the block group A. Thus, it is possible to execute the following steps in parallel:

S400: generation of an entry based on the block group A (A0, A1); and

S800: generation of an entry based on the block group B (A0, A1).

Example 1 of Determination

Common Points of Moving Picture Coding Apparatus 100 and Moving Picture Decoding Apparatus 300

Figure 19:
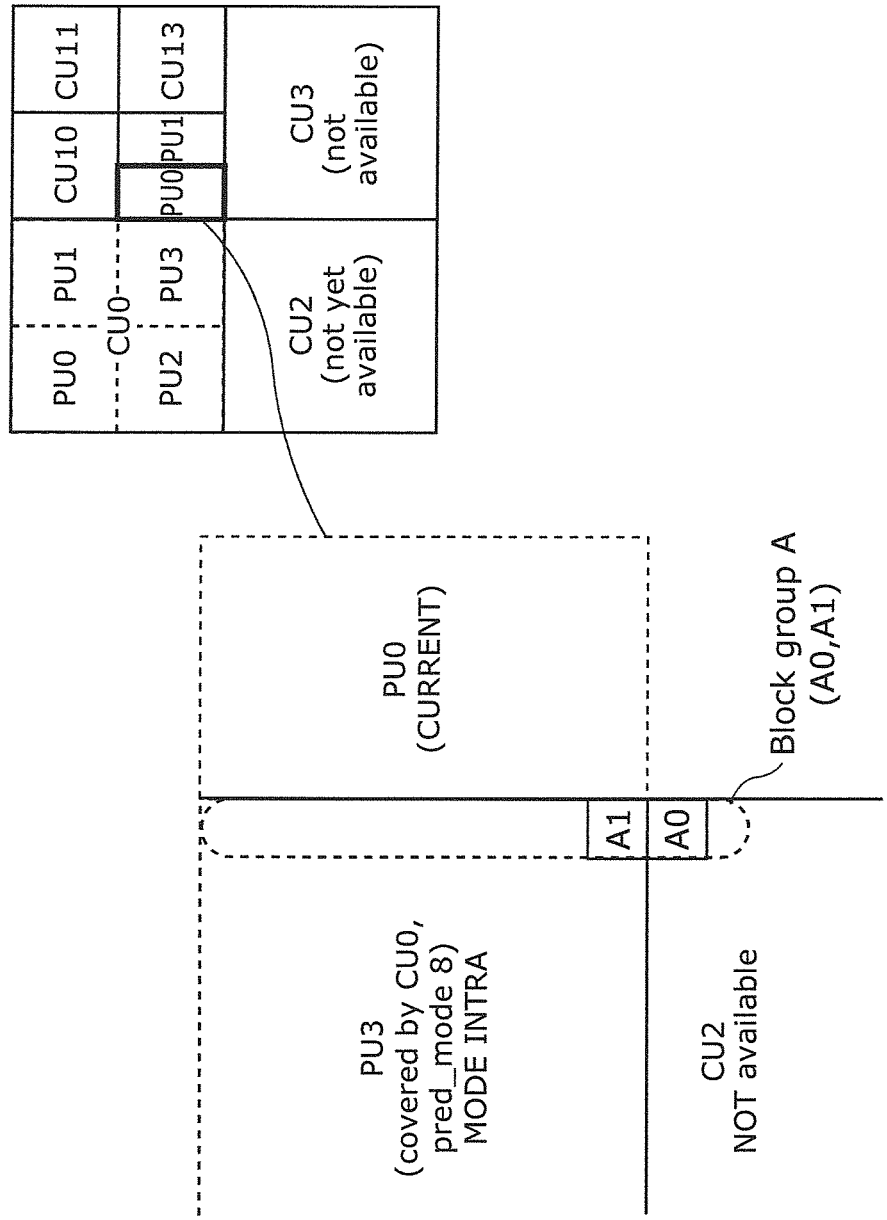
FIG. 19 illustrates a determination result obtained in steps S620 and S820 when a current block to be predicted is PU0.

FIG. 19 illustrates the determination results of step S620 in FIG. 14 and step S820 in FIG. 18 obtained when a current block to be predicted (a current block to be coded, a current block to be decoded) is PU0 (see FIG. 4A). As described above, it is determined in step S620 in FIG. 14 and step S820 in FIG. 18 whether any of the blocks A0 and A1 in the block group A is an INTER block.

In the case of FIG. 19, an adjacent block A0 is not available, and the prediction mode thereof is not MODE_INTER. In addition, although an adjacent block A1 is available, the prediction mode thereof is MODE_INTRA and not MODE_INTER.

Therefore, in the above determination step, the result is determined to be false since the prediction mode of both the adjacent blocks A0 and A0 is not MODE_INTER in the case of FIG. 19.

Example 2 of Determination

Common Points of Moving Picture Coding Apparatus 100 and Moving Picture Decoding Apparatus 300

Figure 20:
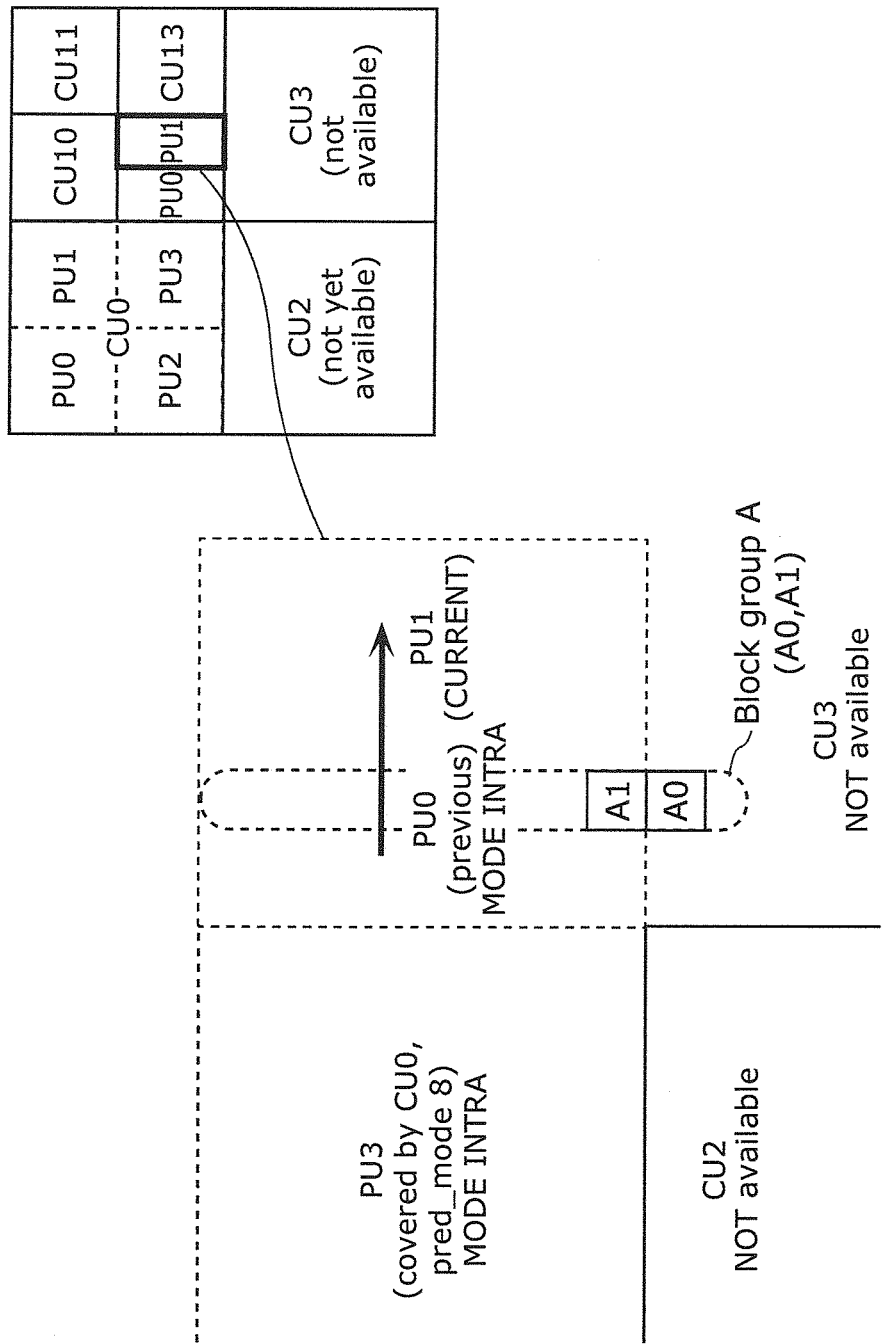
FIG. 20 illustrates a determination result obtained in steps S620 and S820 when a current block to be predicted is PU1.

FIG. 20 illustrates the determination results of step S620 in FIG. 14 and step S820 in FIG. 18 obtained when a current block to be predicted is PU1.

In the case of FIG. 20, in regard with the adjacent block A0, CU3 is still not available. In addition, the prediction mode of the adjacent block A1 is MODE_INTER.

Therefore, in the above determination step, the result is determined to be true since the prediction mode of the adjacent block A1 is MODE_INTER in the case of FIG. 20.

(Effects and Others)

According to the moving picture coding method and the coding apparatus according to Embodiment 1 and the moving picture decoding method and the moving picture decoding apparatus according to Embodiment 2, when generating mvpListLX (step S620 in FIG. 14, step S820 in FIG. 18), the determination as to whether scaling calculation has been performed on the block group A can be omitted in the determination as to whether scaling processing is to be performed on the block group B. In other words, the coding control unit 108 and the decoding control unit 306 can determine whether to perform scaling processing on the block group B, without using the result of processing on the block group A.

In addition, before creating the candidate list mvpListLX, if a determination is just made as to whether the block group A includes an INTER block, motion vector predictor candidates can be calculated from the block groups A and B in parallel (FIGS. 14 and 18).

It should be noted that although it is determined in steps S620 and S820 whether the prediction mode of any one of blocks A0 and A1 in the block group A is MODE_INTER, the embodiments are not limited to this. In steps S620 and S820, for example, a determination may be made as to whether none of the followings are satisfied: (1) the prediction mode of a block is MODE_INTRA, (2) a block is at a slice or picture boundary, and (3) a block is an unprocessed block (uncoded block or undecoded block).

Figure 21:
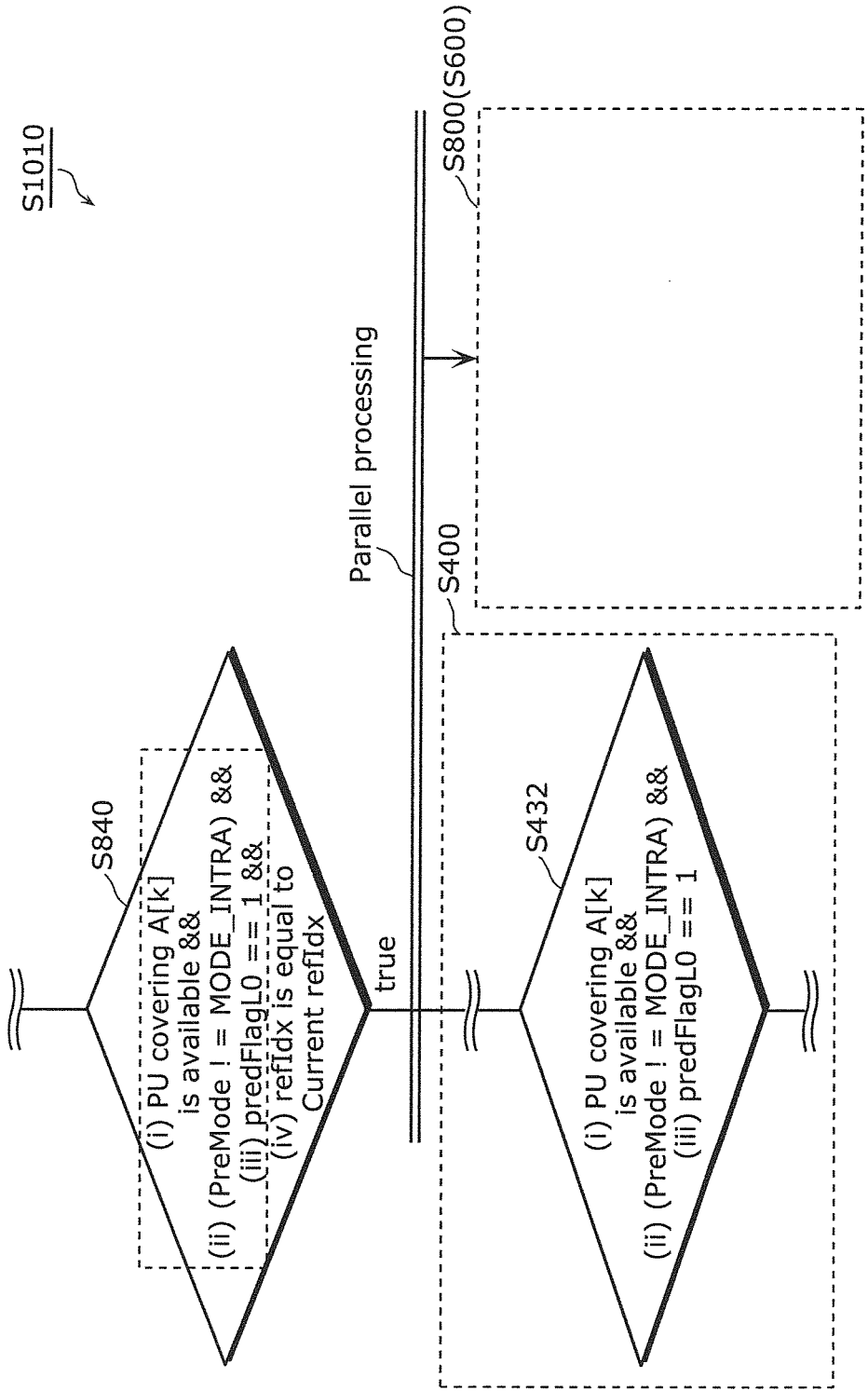
FIG. 21 is a partial flowchart illustrating a procedure of creating the candidate list mvpListLX in Variation 1.
Figure 22:
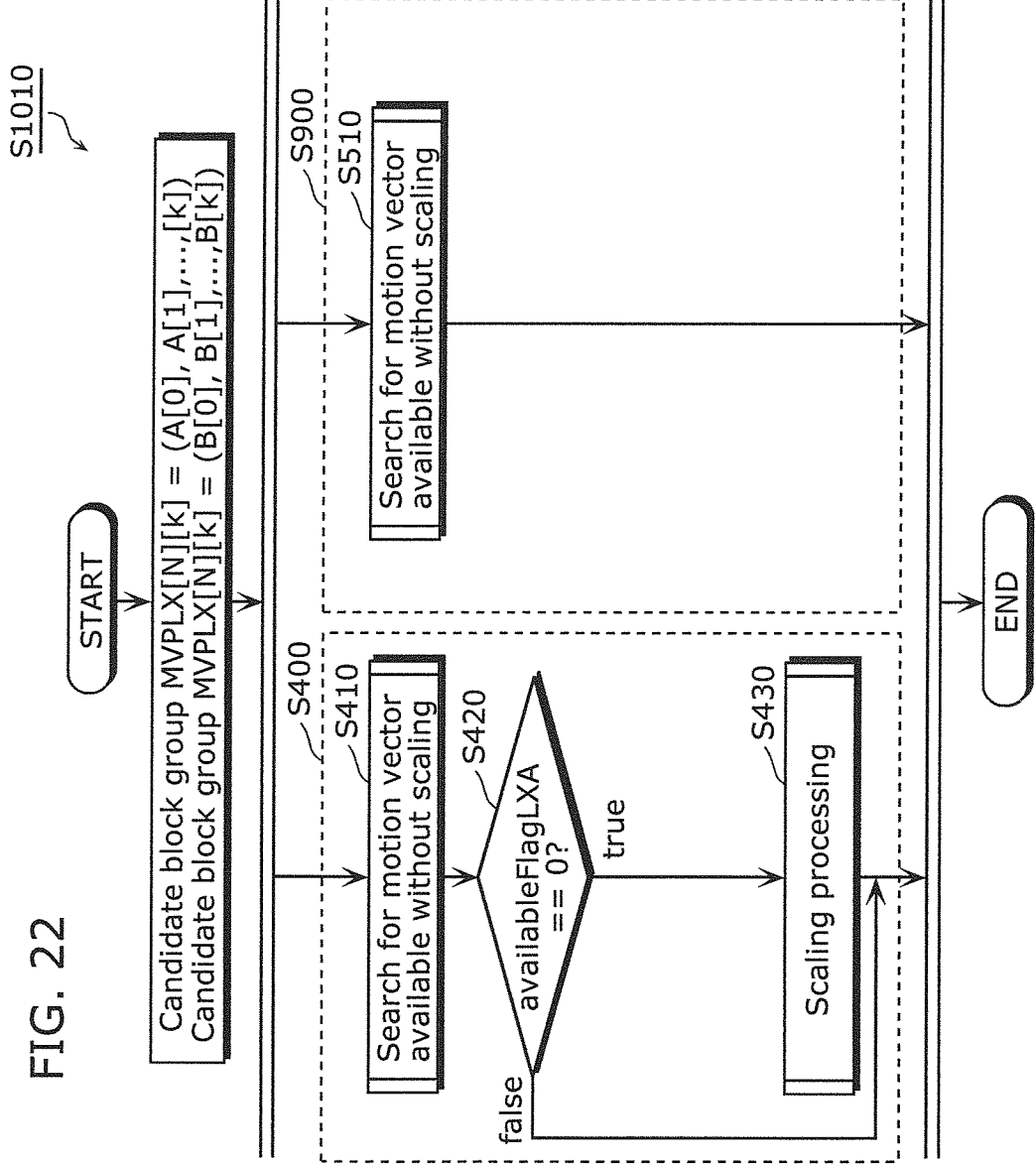
FIG. 22 is a flowchart illustrating a procedure of creating the candidate list mvpListLX in Variation 2.

In addition, in Embodiments 1 and 2, although steps S620 and S820 are executed after step S510, the embodiments are not limited to this. Steps S620 and S820 may be executed, as step S840, before executing the processing in parallel, or specifically, before executing steps S410 and S510, as illustrated in FIG. 21, for example. It should be noted that the order of determination (order of an AND operation and an OR operation) is not limited to Embodiments 1 and 2 above and the order of logical operation according to which the result of determination is equal is included in the present disclosure.

As described above, according to the moving picture coding method according to Embodiment 1 and the moving picture decoding method according to Embodiment 2, in steps S620 and S820, processing on the block group B can be executed without using the result of processing on the block group A, and processing on the block group A and processing on the block group B can be performed in parallel.

Embodiment 3

Figure 23:
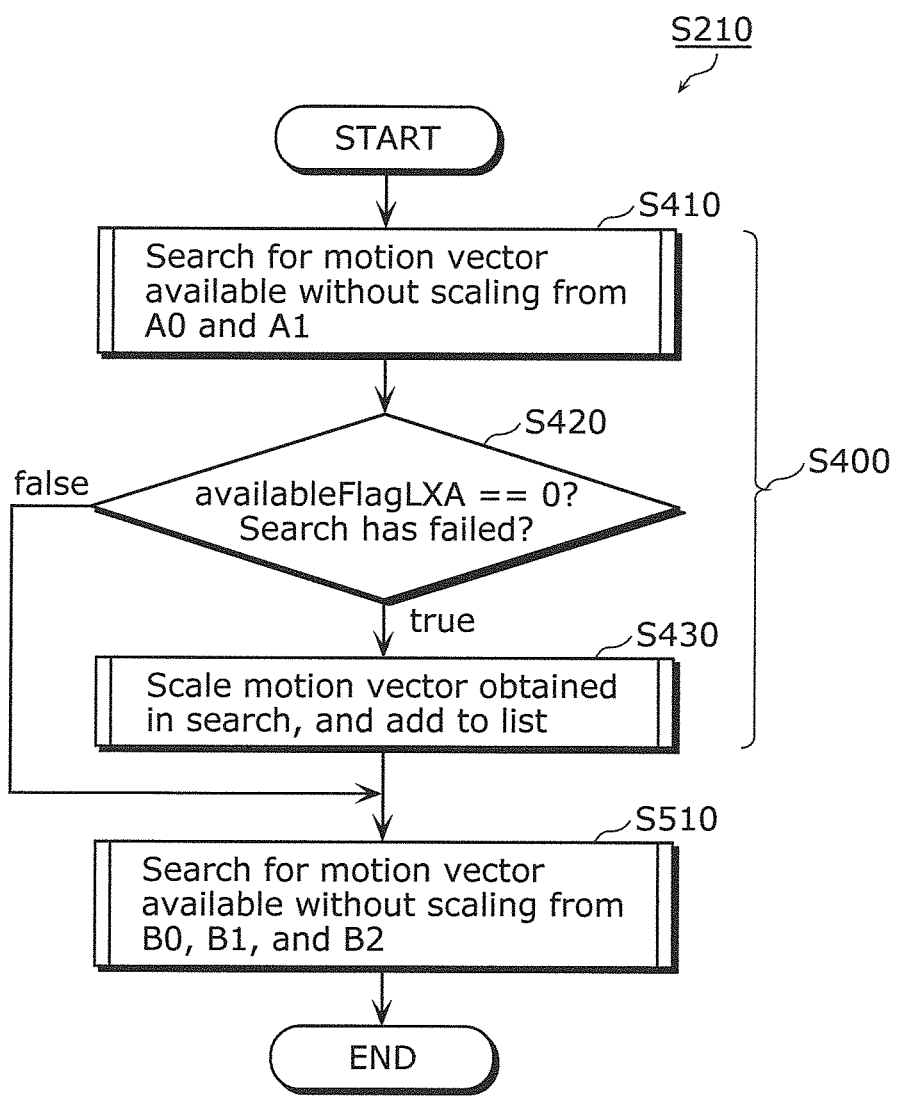
FIG. 23 sequentially illustrates a procedure of creating the candidate list mvpListLX in Variation 2.

FIG. 23 is a flowchart illustrating another embodiment of the moving picture coding method according to Embodiment 1 and the moving picture decoding method according to Embodiment 2.

Although in Embodiments 1 and 2, it is determined whether scaling processing is to be allowed in the processing on the block group B, based on the result of determination as to whether any of the blocks (A0, A1) in the block group A is an INTER block, scaling processing on the block group B is completely inhibited in the present embodiment.

In this way, it is also possible to resolve dependency by not performing steps S620, S820, and S530.

Embodiment 4

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 24:
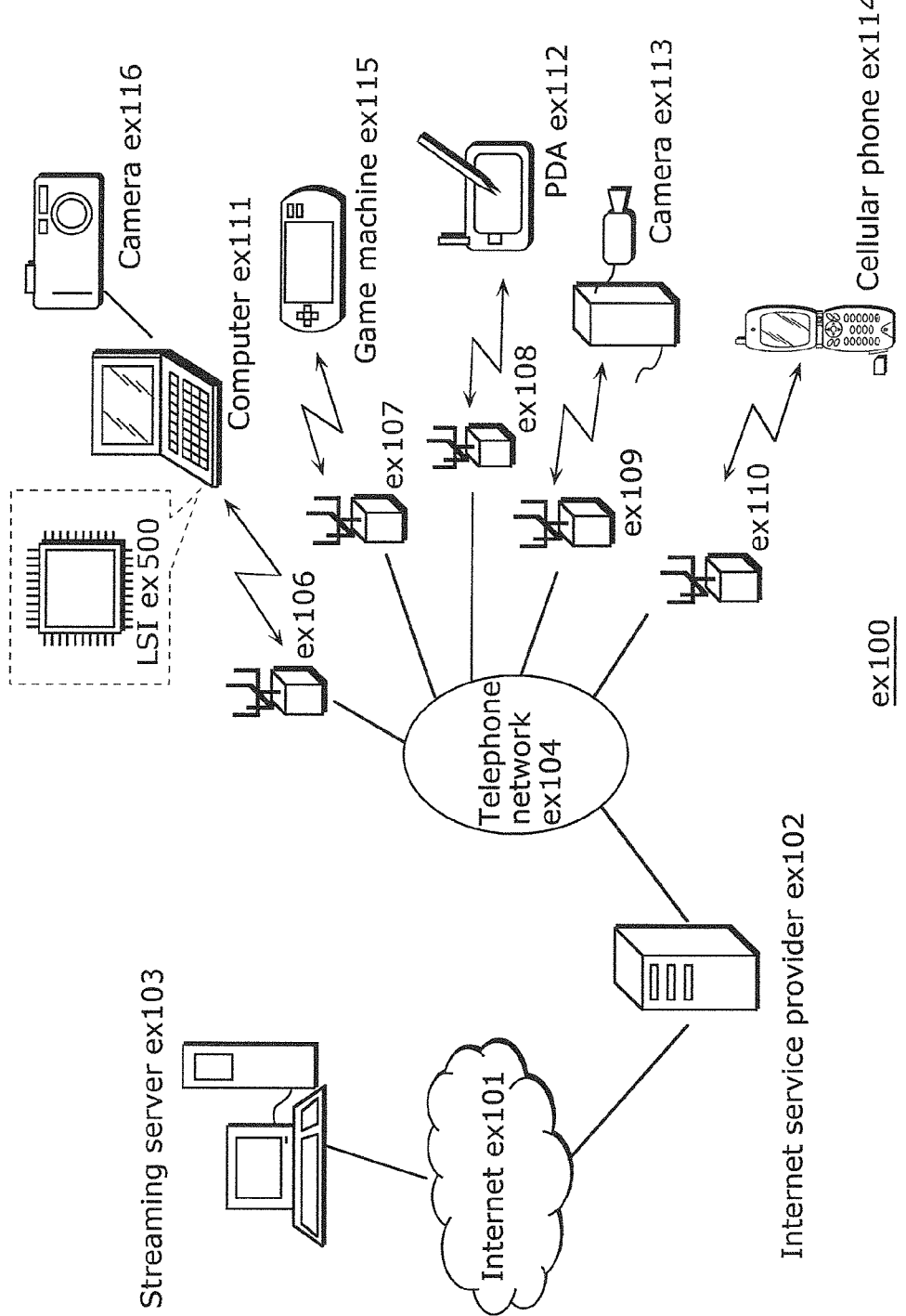
FIG. 24 shows an overall configuration of a content providing system for implementing content distribution services.

FIG. 24 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 24, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 25:
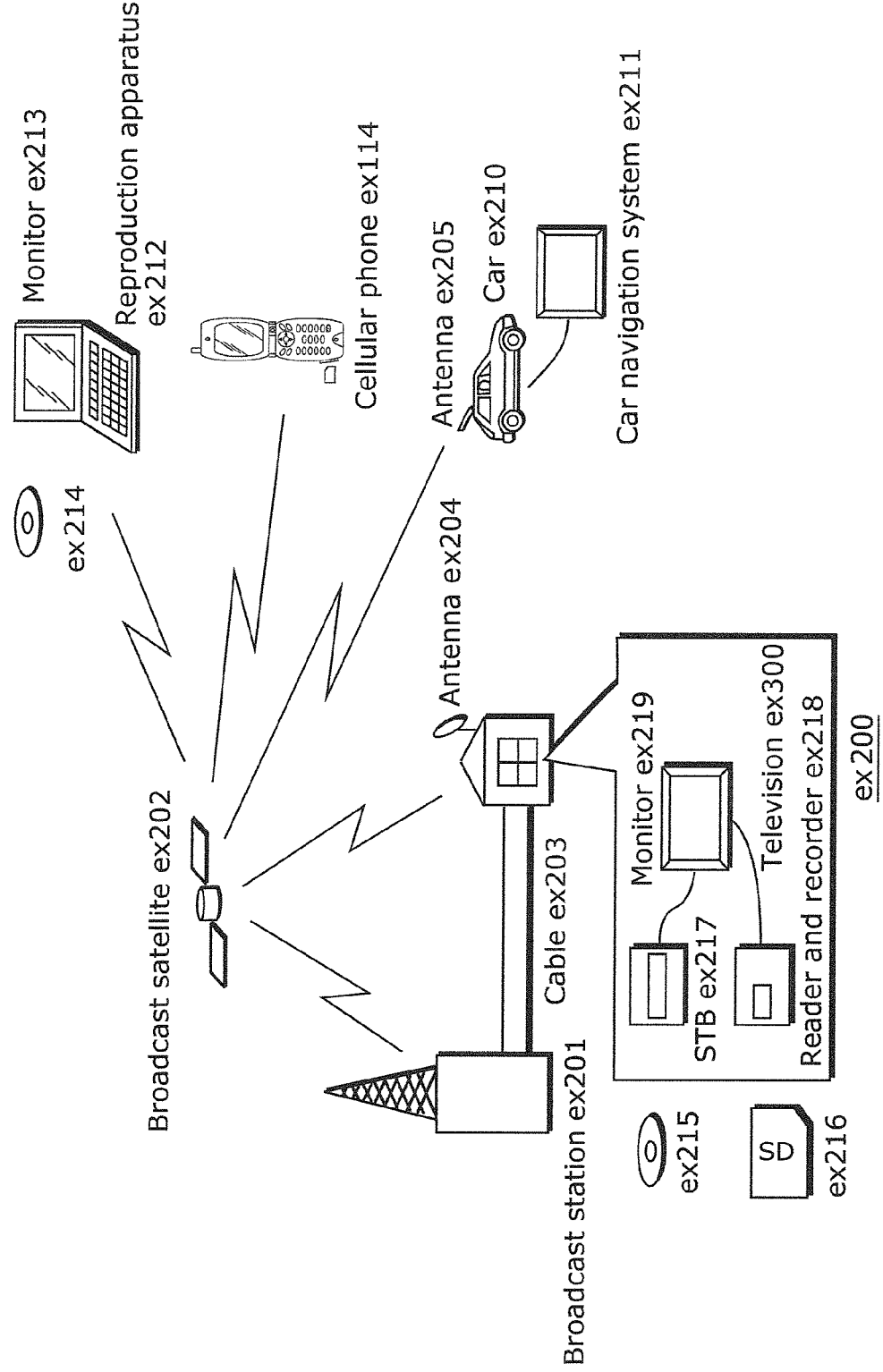
FIG. 25 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 25. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 26:
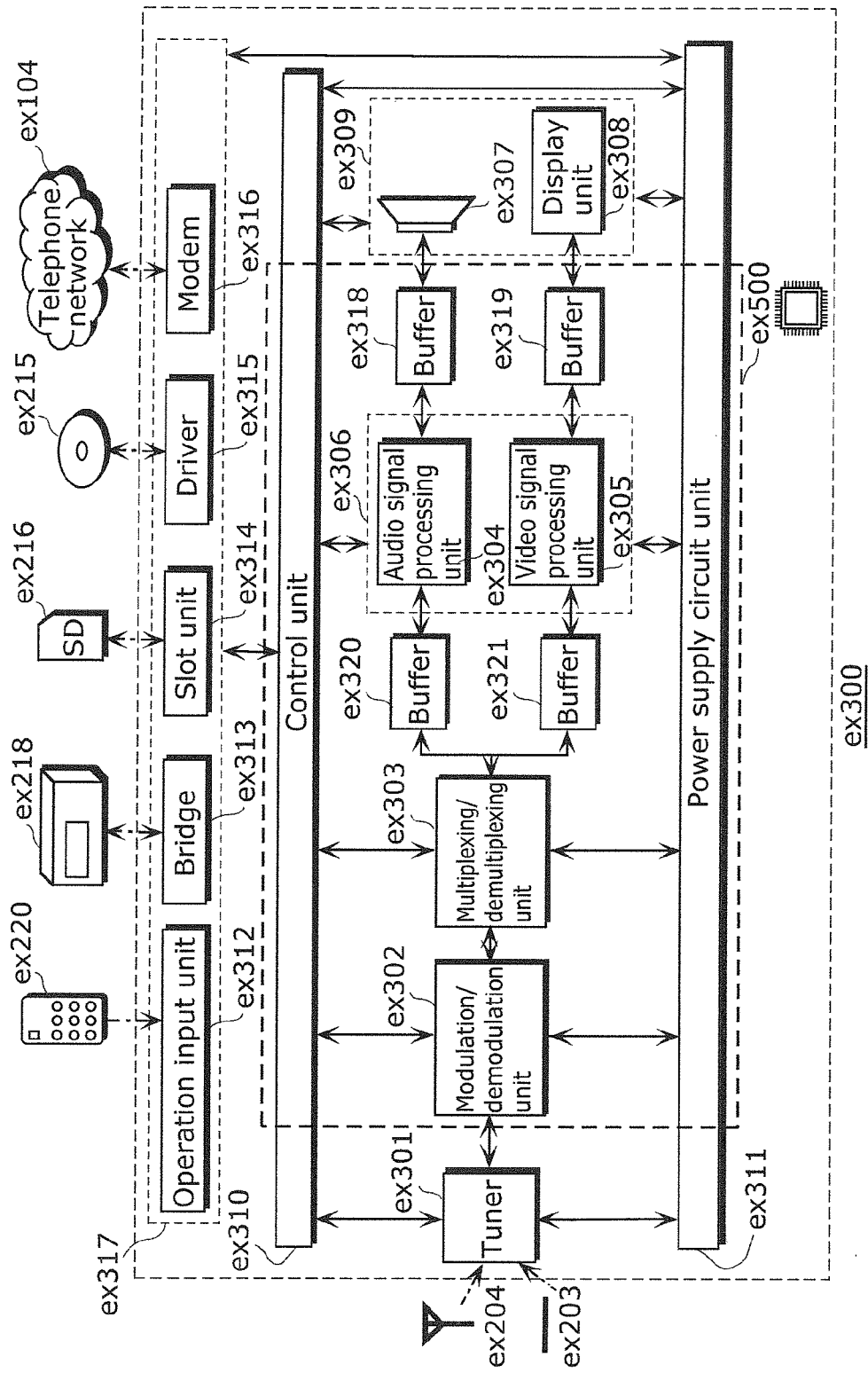
FIG. 26 shows a block diagram illustrating an example of a configuration of a television.

FIG. 26 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other.

Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 27:
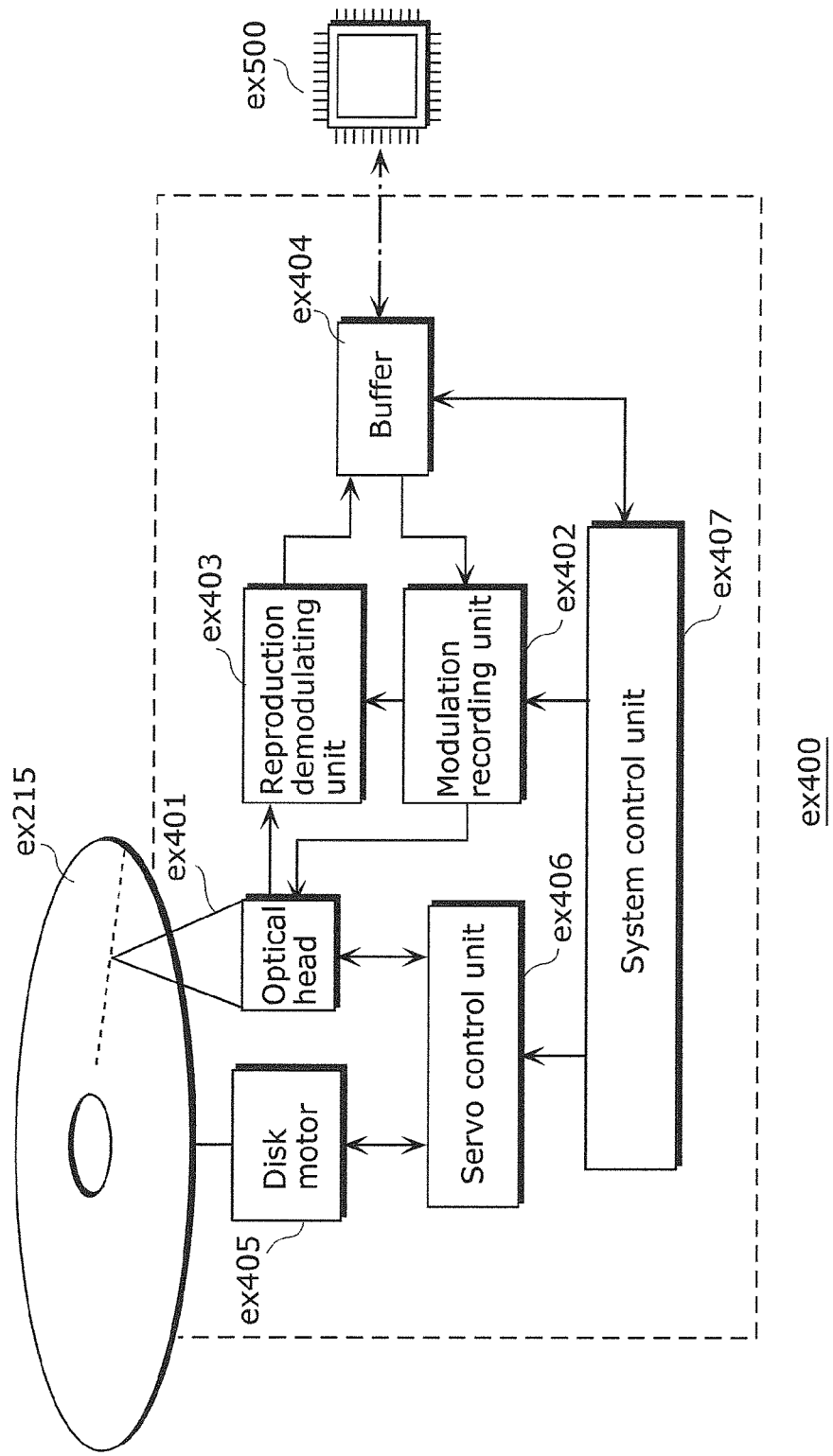
FIG. 27 shows a block diagram illustrating an example of a configuration of an information reproducing/recording unit that reads and writes information from and on a recording medium that is an optical disk.

As an example, FIG. 27 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 28:
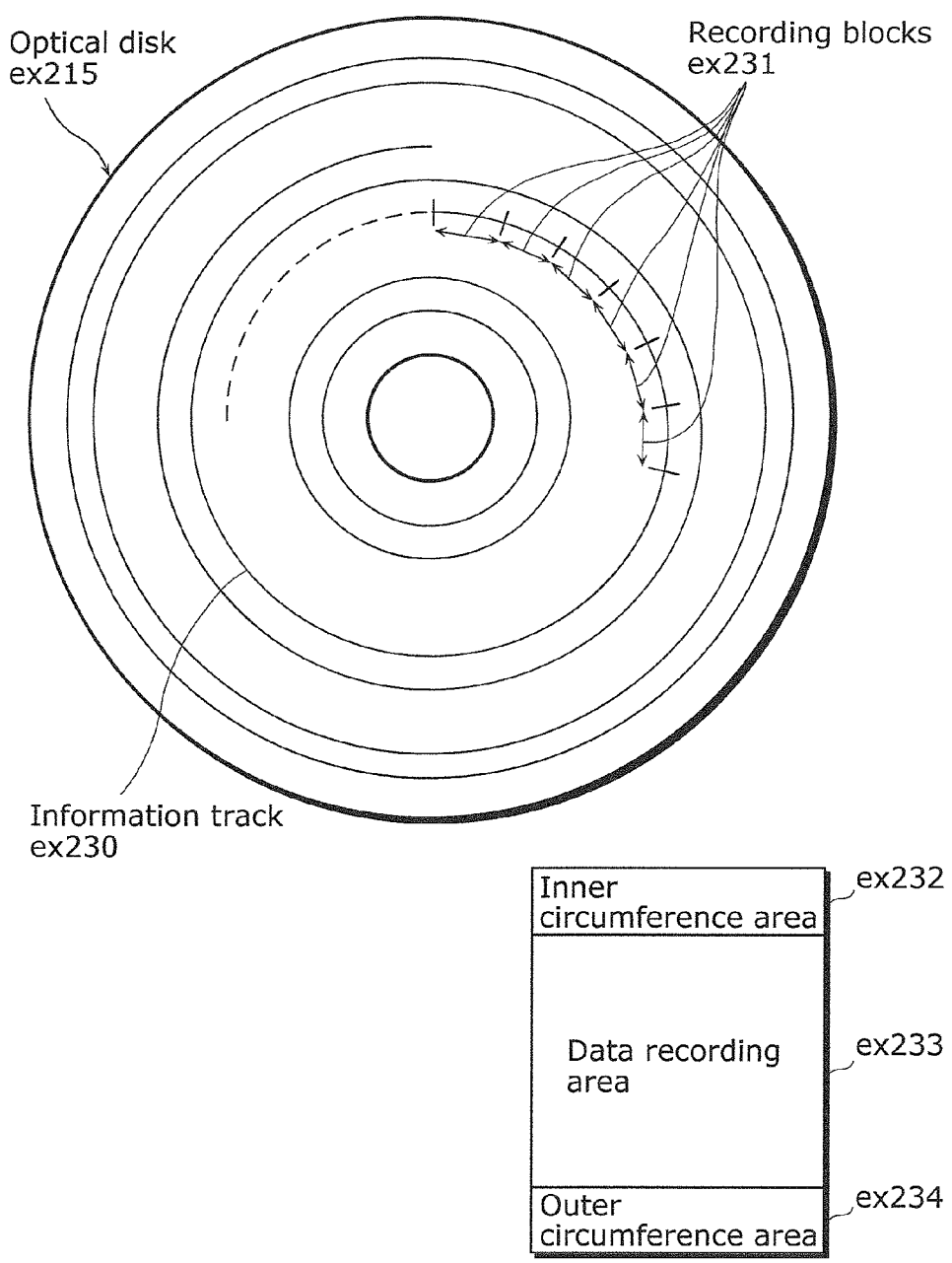
FIG. 28 shows an example of a configuration of a recording medium that is an optical disk.

FIG. 28 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 26. The same will be true for the configuration of the computer ex111, the cellular phone ex114, and others.

Figure 29A:
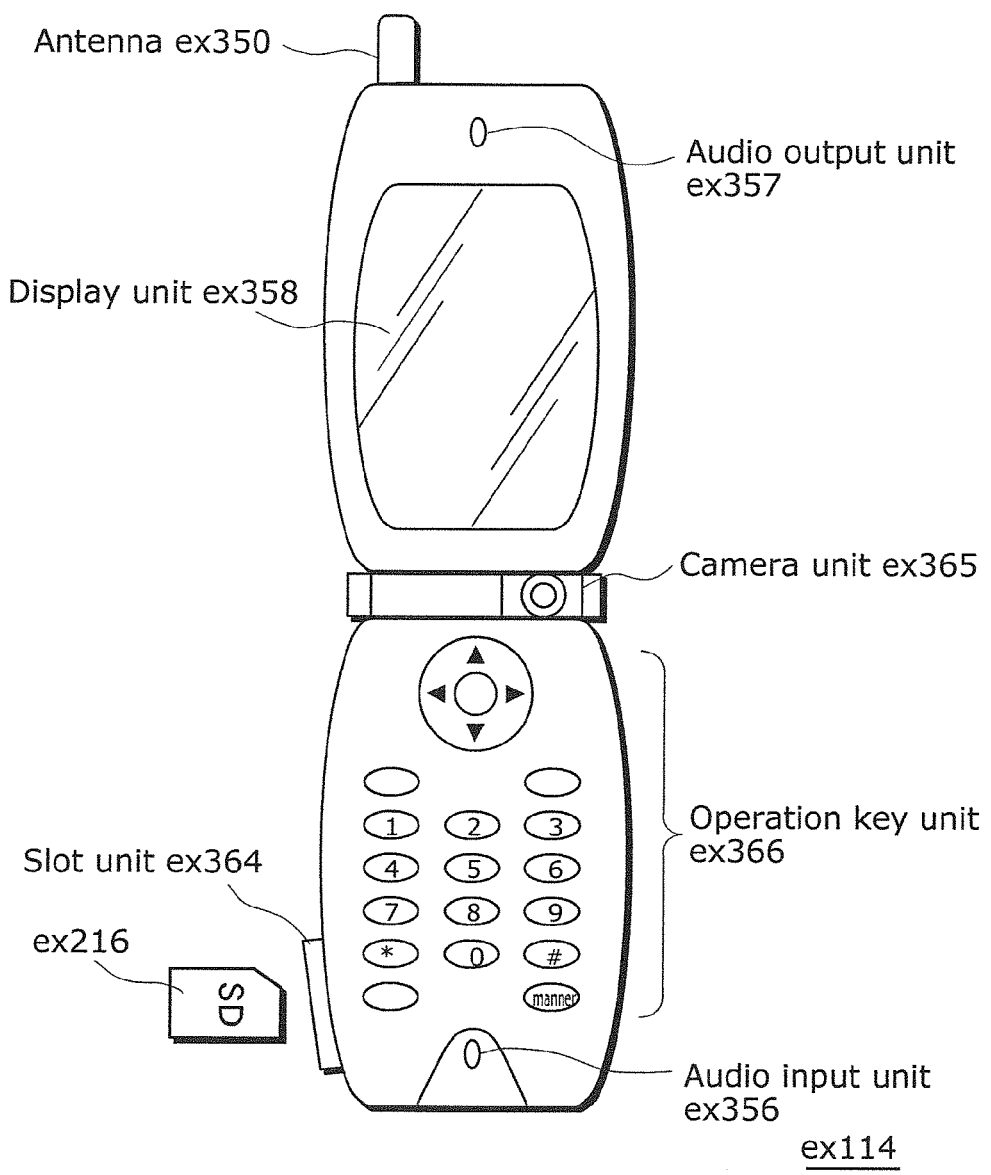
FIG. 29A shows an example of a cellular phone.

FIG. 29A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 29B:
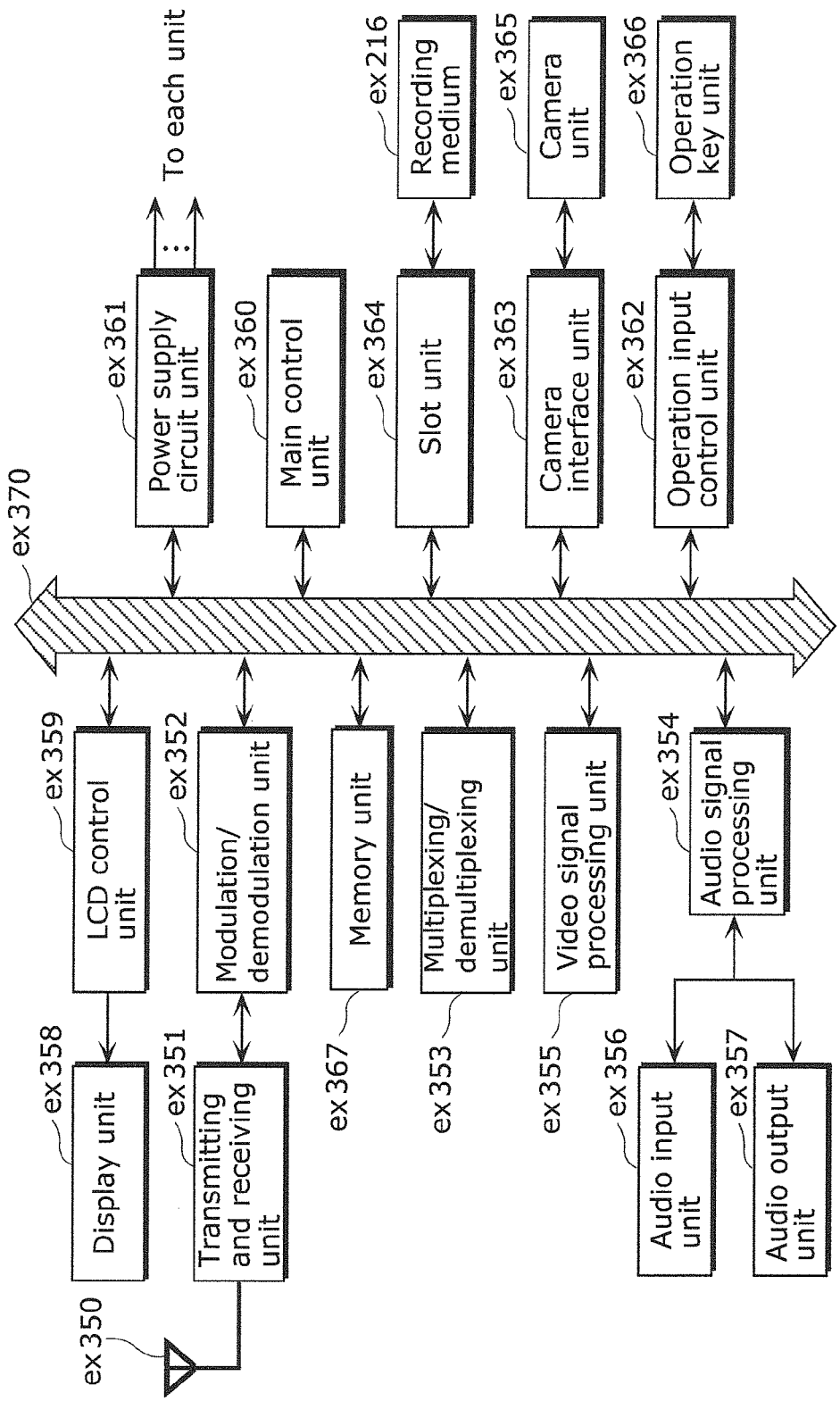
FIG. 29B is a block diagram showing an example of a configuration of a cellular phone.

Next, an example of a configuration of the cellular phone ex114 will be described with reference to FIG. 29B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to the above embodiments, and various modifications and revisions are possible without departing from the scope of the present disclosure.

Embodiment 5

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 30 illustrates a structure of the multiplexed data. As illustrated in FIG. 30, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 31:
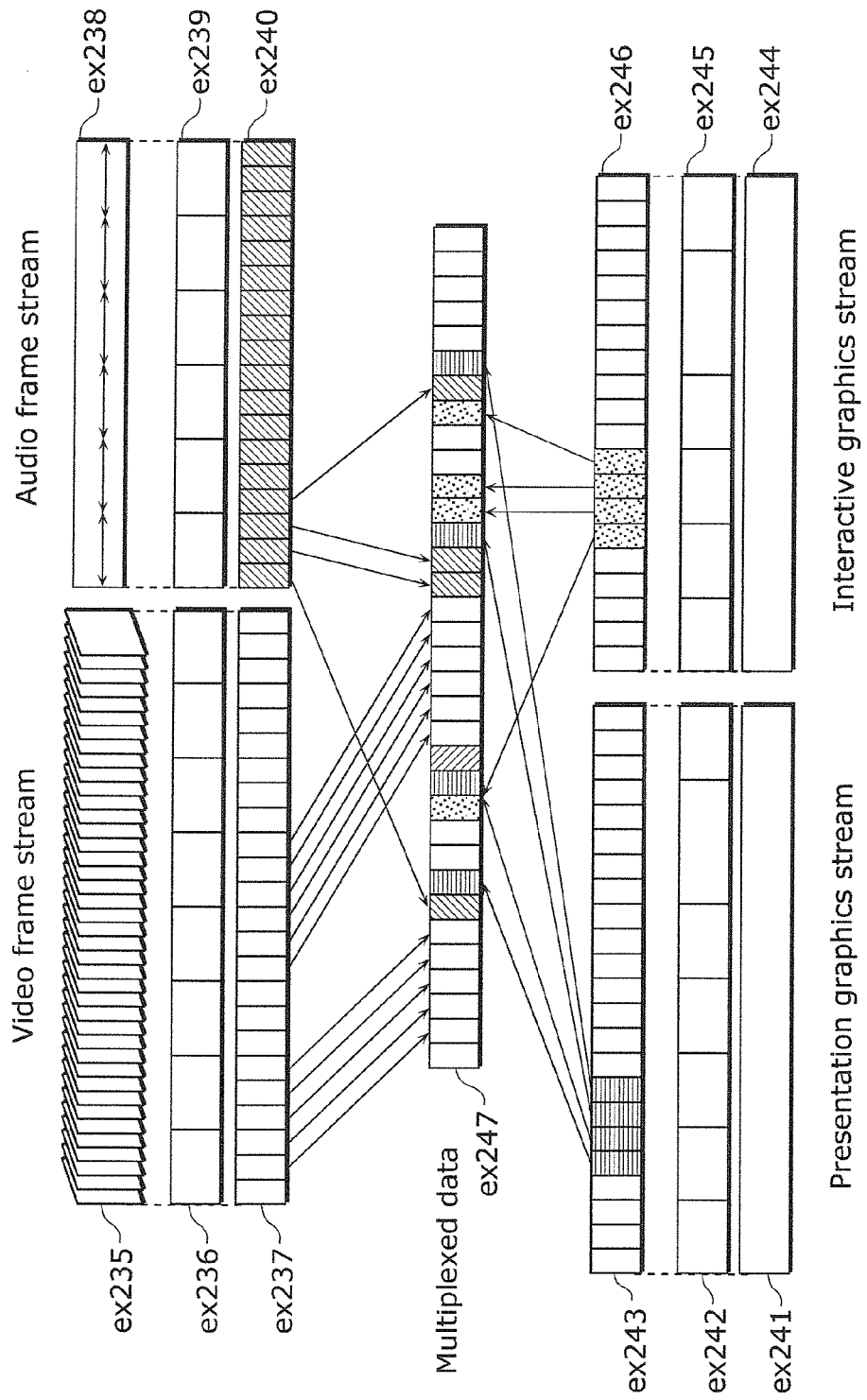
FIG. 31 schematically shows how each stream is multiplexed in multiplexed data.

FIG. 31 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 32:
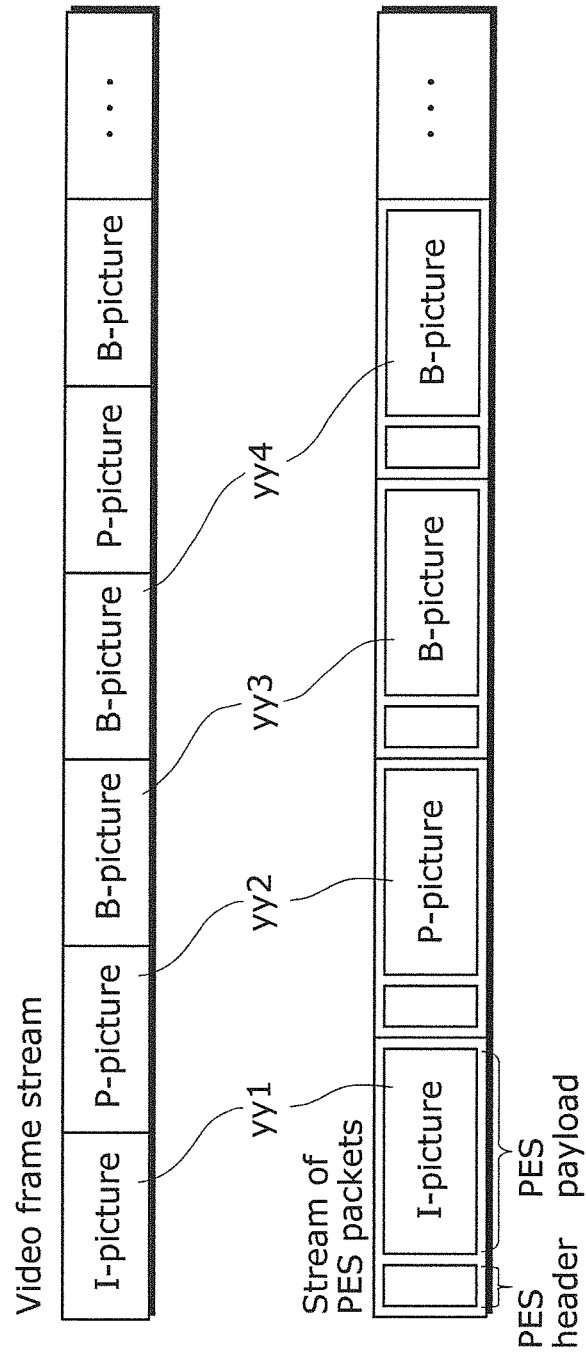
FIG. 32 shows how a video stream is stored in a stream of PES packets in more detail.

FIG. 32 illustrates how a video stream is stored in a stream of PES packets in more detail. The first bar in FIG. 32 shows a video frame stream in a video stream. The second bar shows the stream of PES packets. As indicated by arrows denoted as yy1, yy2, yy3, and yy4 in FIG. 32, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 33 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 33. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 34:
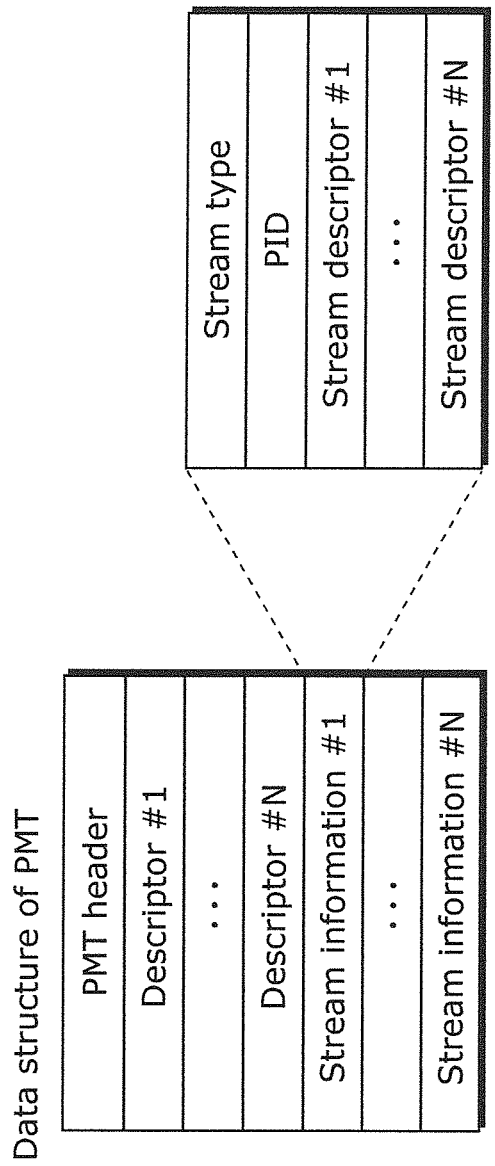
FIG. 34 shows a data structure of a PMT.

FIG. 34 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 35:
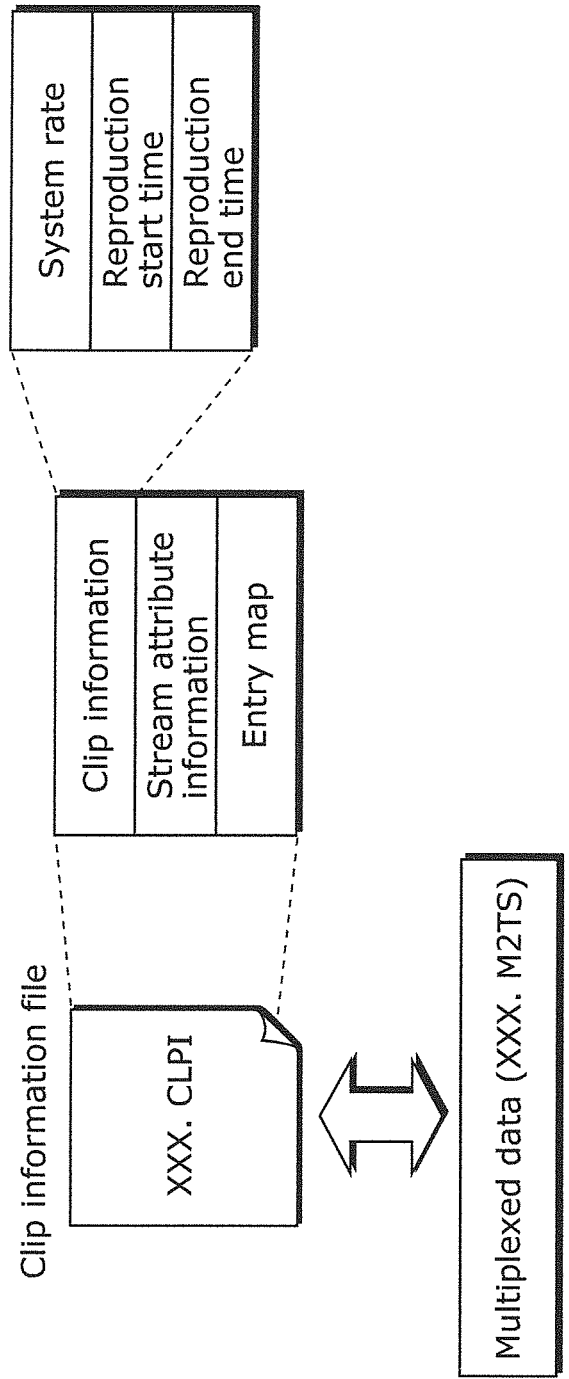
FIG. 35 shows an internal structure of multiplexed data information.

Each of the multiplexed data information files is management information of the multiplexed data as shown in FIG. 35. The multiplexed data information files are in one to one correspondence with the multiplexed data, and each of the files includes multiplexed data information, stream attribute information, and an entry map.

As illustrated in FIG. 35, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 36:
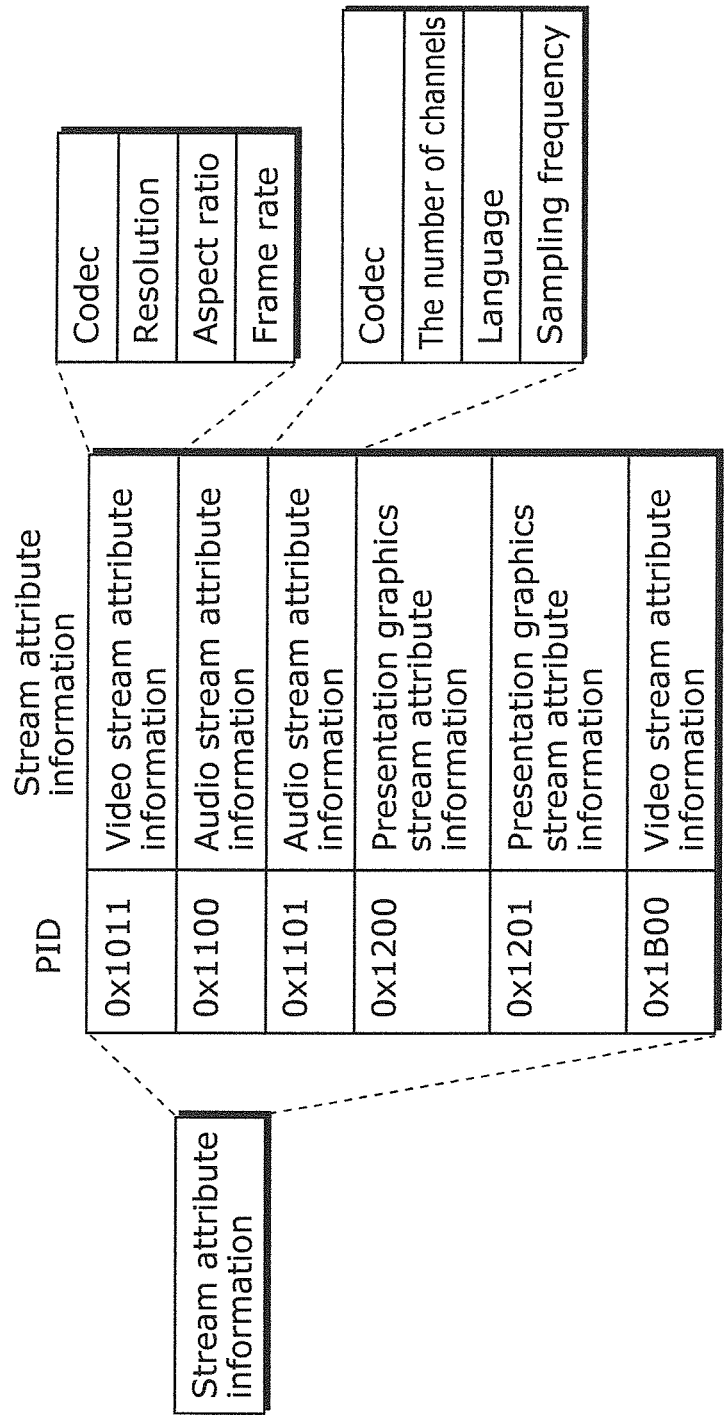
FIG. 36 shows an internal structure of stream attribute information.

As shown in FIG. 36, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 37:
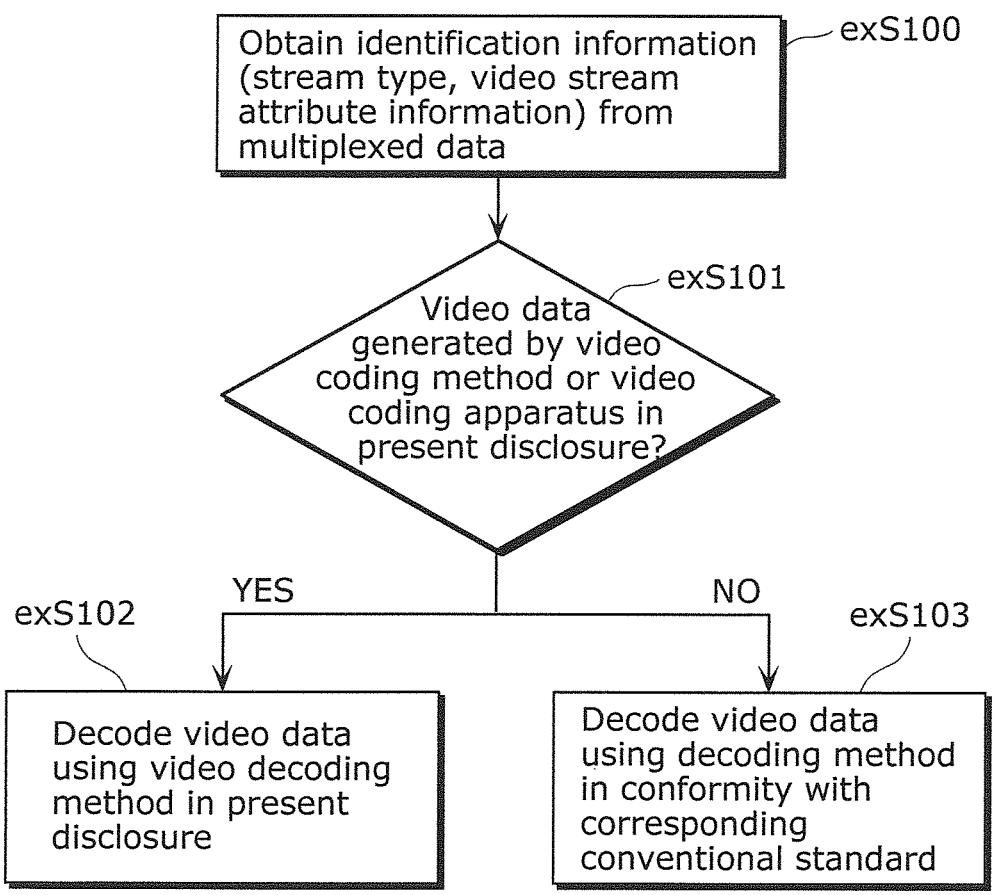
FIG. 37 shows steps for identifying video data.

Furthermore, FIG. 37 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected.

Thus, it becomes possible to decode information without any error. Furthermore, the moving picture coding method or apparatus, or the moving picture decoding method or apparatus in the present embodiment can be used in the devices and systems described above.

Embodiment 6

Figure 38:
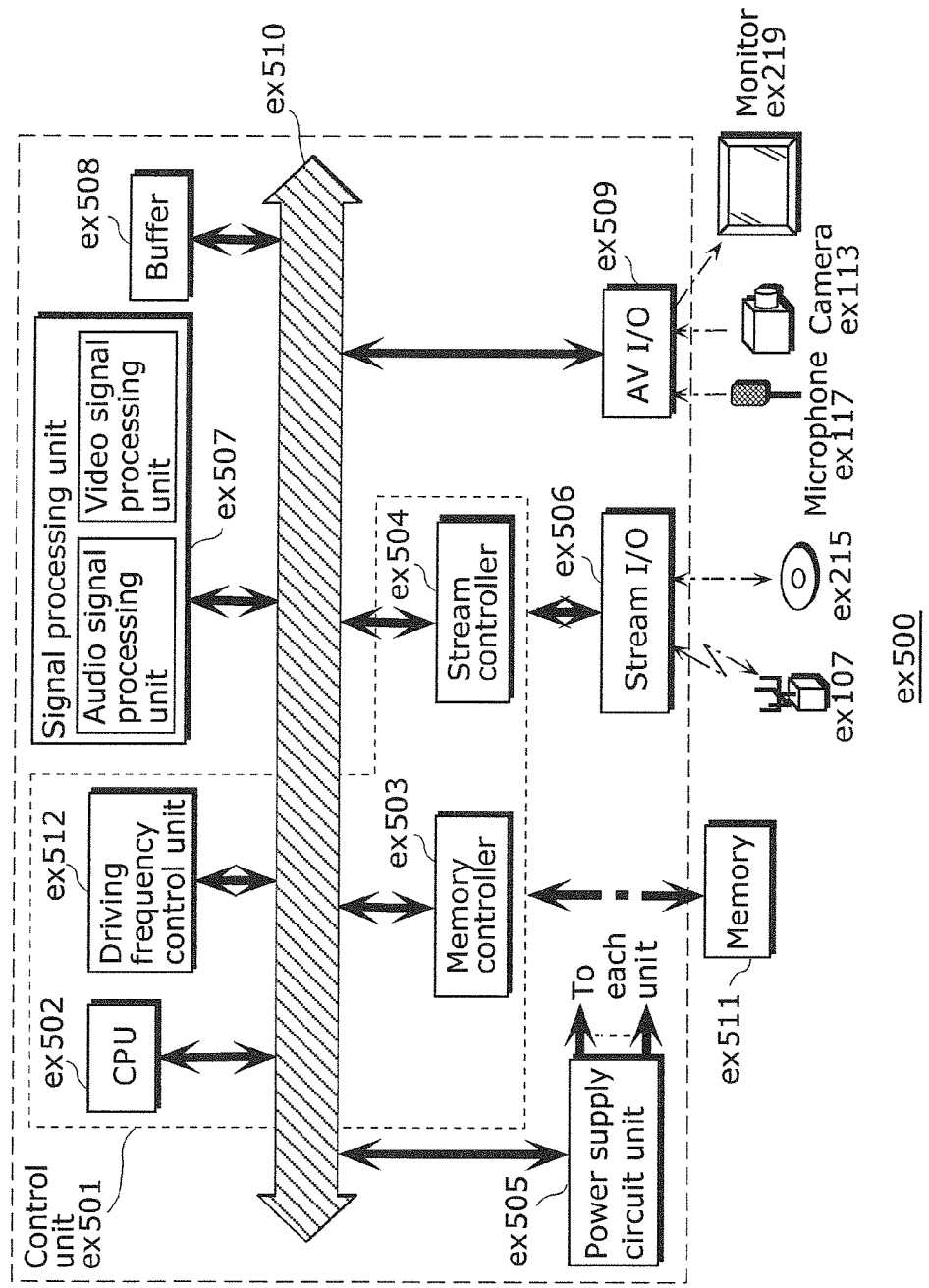
FIG. 38 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 38 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 7

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 39:
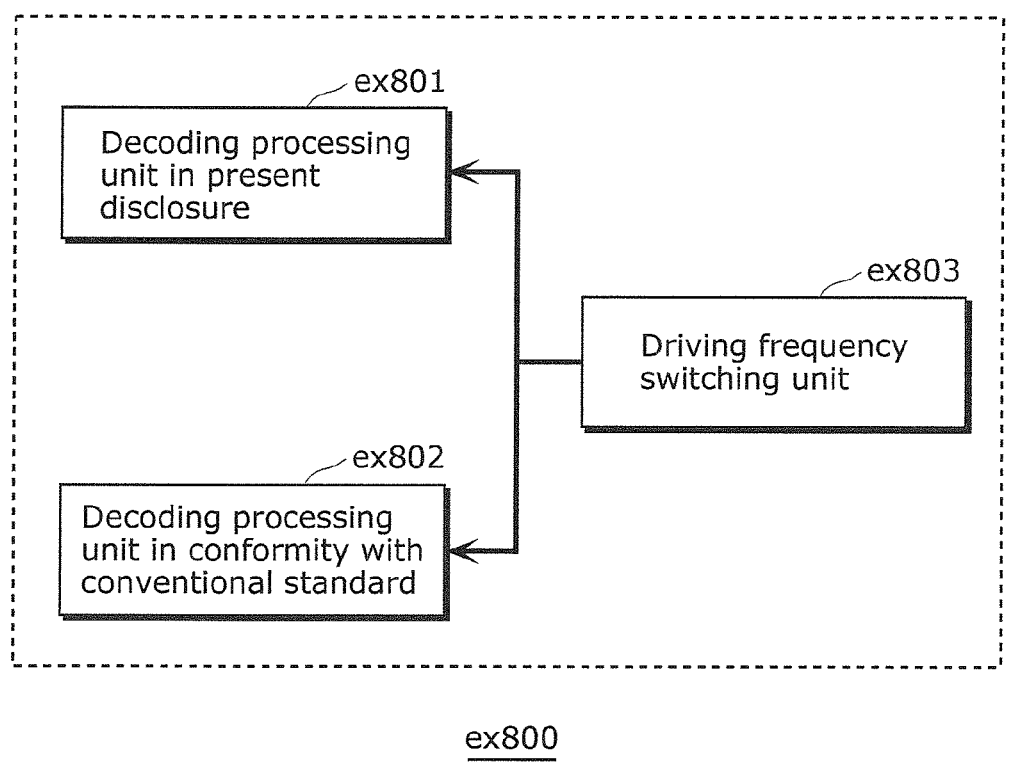
FIG. 39 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 39 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 38. Here, each of the decoding processing unit ex801 that executes the moving picture decoding method described in each of embodiments and the decoding processing unit ex802 that conforms to the conventional standard corresponds to the signal processing unit ex507 in FIG. 38. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 127. The driving frequency can be selected by storing the look-up table in the buffer ex508 and in an internal memory of an LSI, and with reference to the look-up table by the CPU ex502.

Figure 40:
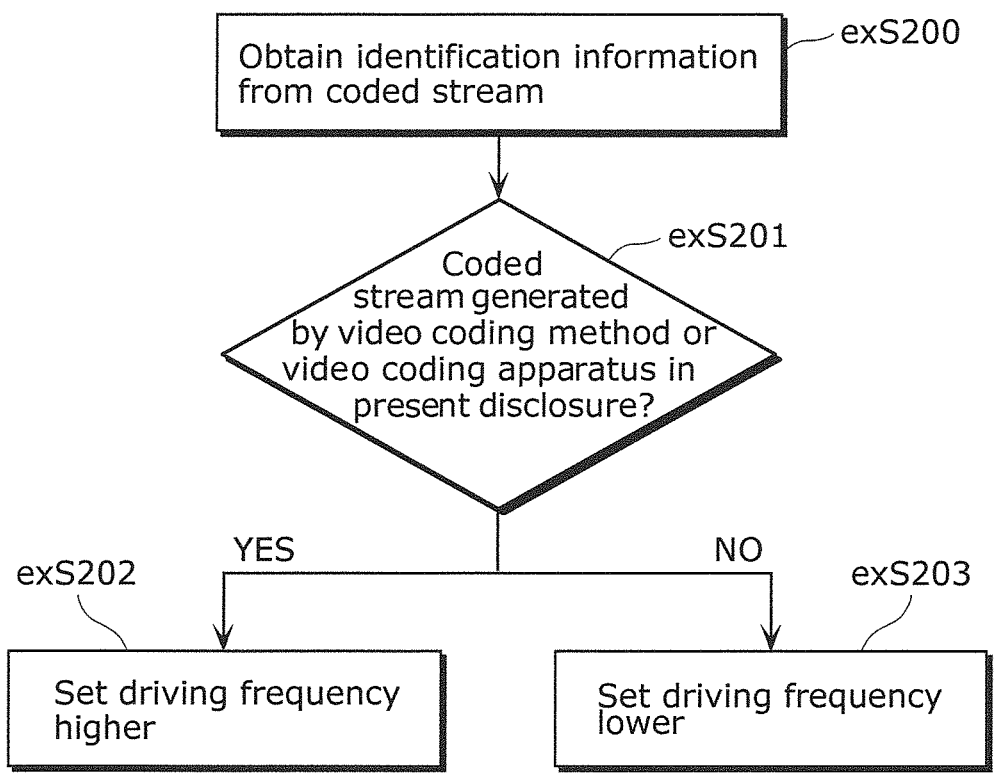
FIG. 40 shows steps for identifying video data and switching between driving frequencies.

FIG. 40 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 42A:
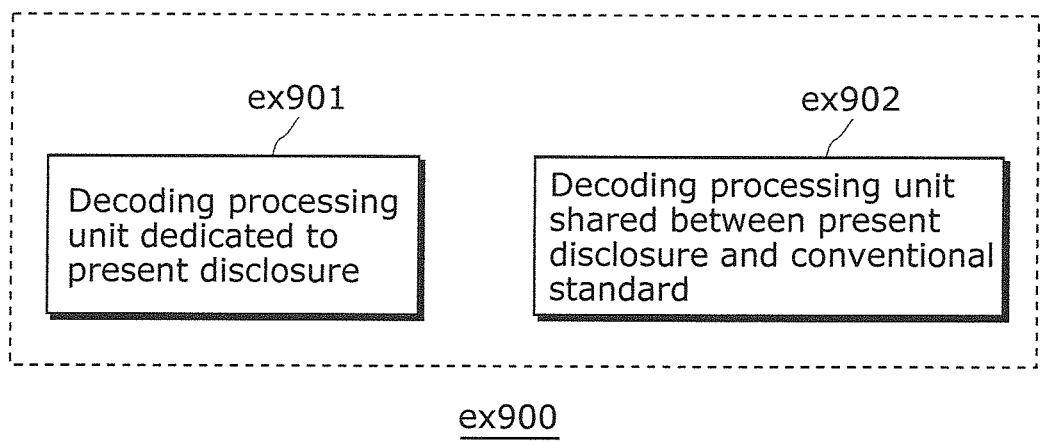
FIG. 42A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 42A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. The decoding processing unit for implementing the moving picture decoding method described in each of embodiments may be shared for the processing to be shared, and a dedicated decoding processing unit may be used for processing unique to that of MPEG-4 AVC.

Figure 42B:
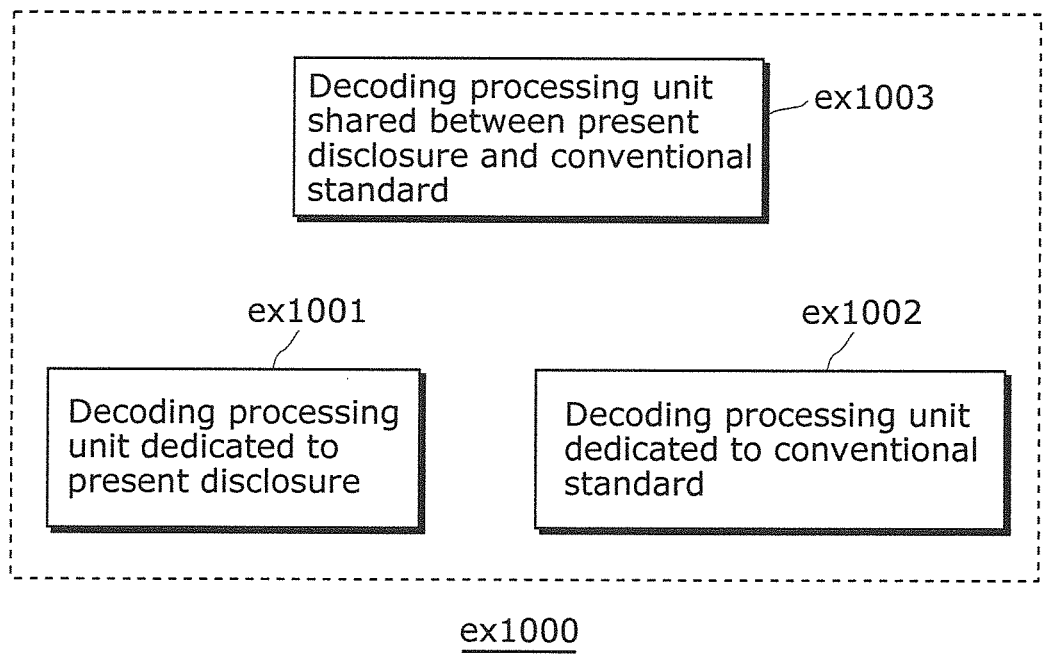
FIG. 42B is a diagram showing another example of a configuration for sharing a module of the signal processing unit.

Furthermore, ex1000 in FIG. 42B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although the above is a description of exemplary embodiments, the scope of the claims of the present application is not limited to those embodiments. Without departing from novel teaching and advantages of a subject matter described in the appended claims, various modifications may be made to the above embodiments, and constituent elements in the above embodiments may be arbitrarily combined to achieve another embodiment, which is understood by a person skilled in the art with ease. Therefore, such modifications and other embodiments are also included in the present disclosure.

INDUSTRIAL APPLICABILITY

The moving picture coding method and the moving picture decoding method according to the present disclosure is applicable to any multimedia data, and can increase the processing speed of coding and decoding moving pictures without increasing the processing load. The moving picture coding method and the moving picture decoding method according to the present disclosure are useful as a moving picture coding method and a moving picture decoding method in the storage, transmission, communication, and the like using mobile phones, DVD devices, personal computers, and the like, for example.

The invention claimed is:

1. An encoding method for encoding an image into a bitstream, the encoding method comprising:
    deriving one or more candidates for a motion vector predictor used to encode a motion vector of a current block in the image;
    selecting the motion vector predictor out of the one or more candidates; and
    encoding an index for identifying the selected motion vector predictor into the bitstream,
    wherein the deriving includes:
    generating a first candidate for the motion vector predictor from a first motion vector of each of one or more first adjacent blocks that are adjacent to the current block in a first direction; and
    generating a second candidate for the motion vector predictor from a second motion vector of each of one or more second adjacent blocks that are adjacent to the current block in a second direction, the second direction being different from the first direction, and
    wherein the generating of the second candidate includes:
    determining for each of the one or more first adjacent blocks whether or not the first adjacent block is inter-predicted; and
    scaling a scalable second motion vector to generate the second candidate, the scalable second motion vector belonging to one of the one or more second adjacent blocks, only when any of the one or more first adjacent blocks are not inter-predicted.

2. An encoding apparatus for encoding an image into a bitstream, the encoding apparatus comprising:
    a derivation unit configured to derive one or more candidates for a motion vector predictor used to encode a motion vector of a current block in the image;
    a selection unit configured to select the motion vector predictor out of the one or more candidates; and
    an encoding unit configured to encode an index for identifying the selected motion vector predictor into the bitstream,
    wherein the derivation unit includes:
    a first candidate generation unit configured to generate a first candidate for the motion vector predictor from a first motion vector of each of one or more first adjacent blocks that are adjacent to the current block in a first direction; and
    a second candidate generation unit configured to generate a second candidate for the motion vector predictor from a second motion vector of each of one or more second adjacent blocks that are adjacent to the current block in a second direction, the second direction being different from the first direction, and
    wherein the second candidate generation unit includes:
    a determination unit configured to determine for each of the one or more first adjacent blocks whether or not the first adjacent block is inter-predicted; and
    a scaling unit configured to scale a scalable second motion vector to generate the second candidate, the scalable second motion vector belonging to one of the one or more second adjacent blocks, only when any of the one or more first adjacent blocks are not inter-predicted.

3. An encoding apparatus for encoding an image into a bitstream, the encoding apparatus comprising:
    processing circuitry; and
    storage coupled to the processing circuitry,
    the processing circuitry being configured to, using the storage:
    derive one or more candidates for a motion vector predictor used to encode a motion vector of a current block in the image;
    select the motion vector predictor out of the one or more candidates; and
    encode an index for identifying the selected motion vector predictor into the bitstream,
    wherein when deriving the one or more candidates,
    the processing circuitry is configured to:
    generate a first candidate for the motion vector predictor from a first motion vector of each of one or more first adjacent blocks that are adjacent to the current block in a first direction; and
    generate a second candidate for the motion vector predictor from a second motion vector of each of one or more second adjacent blocks that are adjacent to the current block in a second direction, the second direction being different from the first direction, and
    wherein when generating the second candidate,
    the processing circuitry is configured to:
    determine for each of the one or more first adjacent blocks whether or not the first adjacent block is inter-predicted; and
    scale a scalable second motion vector to generate the second candidate, the scalable second motion vector belonging to one of the one or more second adjacent blocks, only when any of the one or more first adjacent blocks are not inter-predicted.

* * * * *